(12) United States Patent
Hiramoto et al.

(10) Patent No.: US 9,380,055 B2
(45) Date of Patent: Jun. 28, 2016

(54) DEVICE CONTROL METHOD, DEVICE MANAGEMENT SYSTEM, AND IN-HOUSE SERVER APPARATUS CONNECTED TO DEVICE MANAGEMENT SYSTEM

(71) Applicant: PANASONIC INTELLECTUAL PROPERTY CORPORATION OF AMERICA, Torrance, CA (US)

(72) Inventors: Takuji Hiramoto, Osaka (JP); Takamitsu Sasaki, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/919,106

(22) Filed: Oct. 21, 2015

(65) Prior Publication Data
US 2016/0105415 A1 Apr. 14, 2016

Related U.S. Application Data

(63) Continuation of application No. PCT/JP2014/001790, filed on Mar. 27, 2014.

(60) Provisional application No. 61/948,766, filed on Mar. 6, 2014.

(51) Int. Cl.
G06F 7/04 (2006.01)
H04L 29/06 (2006.01)
H04L 29/08 (2006.01)

(52) U.S. Cl.
CPC ............ *H04L 63/083* (2013.01); *H04L 67/306* (2013.01)

(58) Field of Classification Search
CPC .................................................. H04L 63/083
USPC ............................................................ 726/7
See application file for complete search history.

(56) References Cited

U.S. PATENT DOCUMENTS

2002/0087892 A1 7/2002 Imazu
2005/0044225 A1 2/2005 Ota et al.
(Continued)

FOREIGN PATENT DOCUMENTS

JP 2002-215582 8/2002
JP 2004-192451 7/2004
(Continued)

OTHER PUBLICATIONS

Kumar et al., Ubiquitous Smart Home System using Android Application, Jan. 2014, International Journal Computer Networks & Communications, vol. 6, No. 1, pp. 33-43.*
(Continued)

*Primary Examiner* — Peter Shaw
(74) *Attorney, Agent, or Firm* — Greenblum & Bernstein, P.L.C.

(57) ABSTRACT

A method in the disclosure includes: receiving, from an information device, a device password which is used for controlling a target device via an in-house server apparatus and which is input on the information device using a setting screen; managing a device ID of the in-house server apparatus, a user ID, and the device password in association with one another; transmitting the device password to the in-house server apparatus to cause the in-house server apparatus to manage the device ID and the device password; transmitting, when login to an out-of-house server apparatus is authenticated, an authentication screen to the information device; receiving, from the information device, an input password that is input on the information device using the authentication screen; and when the received input password is identical to the device password that is associated with the user ID, approving a control of a target device by the information device.

11 Claims, 51 Drawing Sheets

(56) References Cited

U.S. PATENT DOCUMENTS

| | | |
|---|---|---|
| 2005/0210395 A1 | 9/2005 | Wakita et al. |
| 2006/0149970 A1 | 7/2006 | Imazu |
| 2009/0070477 A1* | 3/2009 | Baum ................ H04N 21/2187 709/231 |
| 2010/0306404 A1 | 12/2010 | Wakita et al. |
| 2013/0067356 A1 | 3/2013 | Wakita et al. |

FOREIGN PATENT DOCUMENTS

| | | |
|---|---|---|
| JP | 2004-310372 | 11/2004 |
| JP | 2005-056207 | 3/2005 |
| JP | 2005-086473 | 3/2005 |

OTHER PUBLICATIONS

International Search Report (ISR) from the International Searching Authority (Japan Patent Office) in International Pat. Appl. No. PCT/JP2014/001790, dated Dec. 9, 2014.

Written Opinion (WO) from the International Searching Authority (Japan Patent Office) in International Pat. Appl. No. PCT/JP2014/001790, dated Dec. 9, 2014, together with an English language translation.

* cited by examiner

FIG. 7

| | LOGIN AUTHENTICATION INFORMATION 701 | | | | SECOND STAGE AUTHENTICATION INFORMATION 702 | | | DEVICE ASSOCIATION INFORMATION 703 | |
|---|---|---|---|---|---|---|---|---|---|
| LOGIN ID (USER ID) 711 | LOGIN PASSWORD (USER PASSWORD) 712 | LOGIN AUTHENTICATION SKIP SETTING 713 | LOGIN AUTHENTICATION SKIP TIME LIMIT 714 | | SECOND STAGE AUTHENTICATION USAGE 721 | SECOND STAGE AUTHENTICATION SKIP SETTING 722 | SECOND STAGE AUTHENTICATION SKIP TIME LIMIT 723 | DEVICE ID 731 | DEVICE PASSWORD 732 |
| USER1@hoge.com | 1234 | ENABLED | 2014/4/1 | | ENABLED | ENABLED | 2014/4/30 | HC-001 | hoge123 |
| USER2@hoge.com | 111111 | DISABLED | n/a | | DISABLED | DISABLED | n/a | HC-002 | abcdef |
| USER3@hoge.com | abcd1234 | ENABLED | 2014/3/24 | | DISABLED | DISABLED | n/a | UNSET | UNSET |
| ... | ... | ... | ... | | ... | ... | ... | ... | ... |

| HOME CONTROLLER DEVICE ID | HOME CONTROLLER CONNECTION STATE | CONNECTED DEVICE ID | DEVICE TYPE | INSTALLATION LOCATION |
|---|---|---|---|---|
| HC-001 | CONNECTED | devId-aircon-0001 | AIR CONDITIONER | LIVING ROOM |
| | | devId-aircon-0002 | AIR CONDITIONER | BEDROOM |
| | | devId-led-0001 | ILLUMINATION DEVICE | LIVING ROOM |
| HC-002 | DISCONNECTED | devId-aircon-0003 | AIR CONDITIONER | LIVING ROOM |
| | | devId-led-0002 | ILLUMINATION DEVICE | 1ST FLOOR HALLWAY |
| HC-003 | CONNECTED | devId-aircon-0004 | AIR CONDITIONER | LIVING ROOM |
| | | devId-aircon-0005 | AIR CONDITIONER | BEDROOM |
| | | devId-led-0003 | ILLUMINATION DEVICE | 1ST FLOOR HALLWAY |
| | | devId-led-0004 | ILLUMINATION DEVICE | 2ND FLOOR HALLWAY |
| ... | | ... | | |

FIG. 10A

| DEVICE ID | DEVICE PASSWORD | DEVICE PASSWORD STANDBY STATE | STANDBY TIME |
|---|---|---|---|
| HC-001 | hoge123 | DISABLED | UNSET |

FIG. 10B

| DEVICE ID | DEVICE PASSWORD | DEVICE PASSWORD STANDBY STATE | STANDBY TIME |
|---|---|---|---|
| HC-002 | UNSET | ENABLED | 10 MINUTES |

FIG. 10C

| DEVICE ID | DEVICE PASSWORD | DEVICE PASSWORD STANDBY STATE | STANDBY TIME |
|---|---|---|---|
| HC-003 | abcdef | ENABLED | 3 MINUTES |

| ITEM (1110) | VALUE (1120) |
|---|---|
| TARGET DEVICE ID (1111) | HC-001 |
| COMMAND TYPE (1112) | setPassword |
| DEVICE PASSWORD (1113) | hoge123 |

| ITEM (1110) | | VALUE (1120) |
|---|---|---|
| TARGET DEVICE ID (1111) | | devId-aircon-0001 |
| COMMAND TYPE (1112) | | control |
| DEVICE PASSWORD (1113) | | hoge123 |
| CONTROL ITEM (1114) | | |
| | POWER | ON |
| | ROOM TEMPERATURE | 28 |
| | MODE | HEATER |
| | ⋮ | ⋮ |

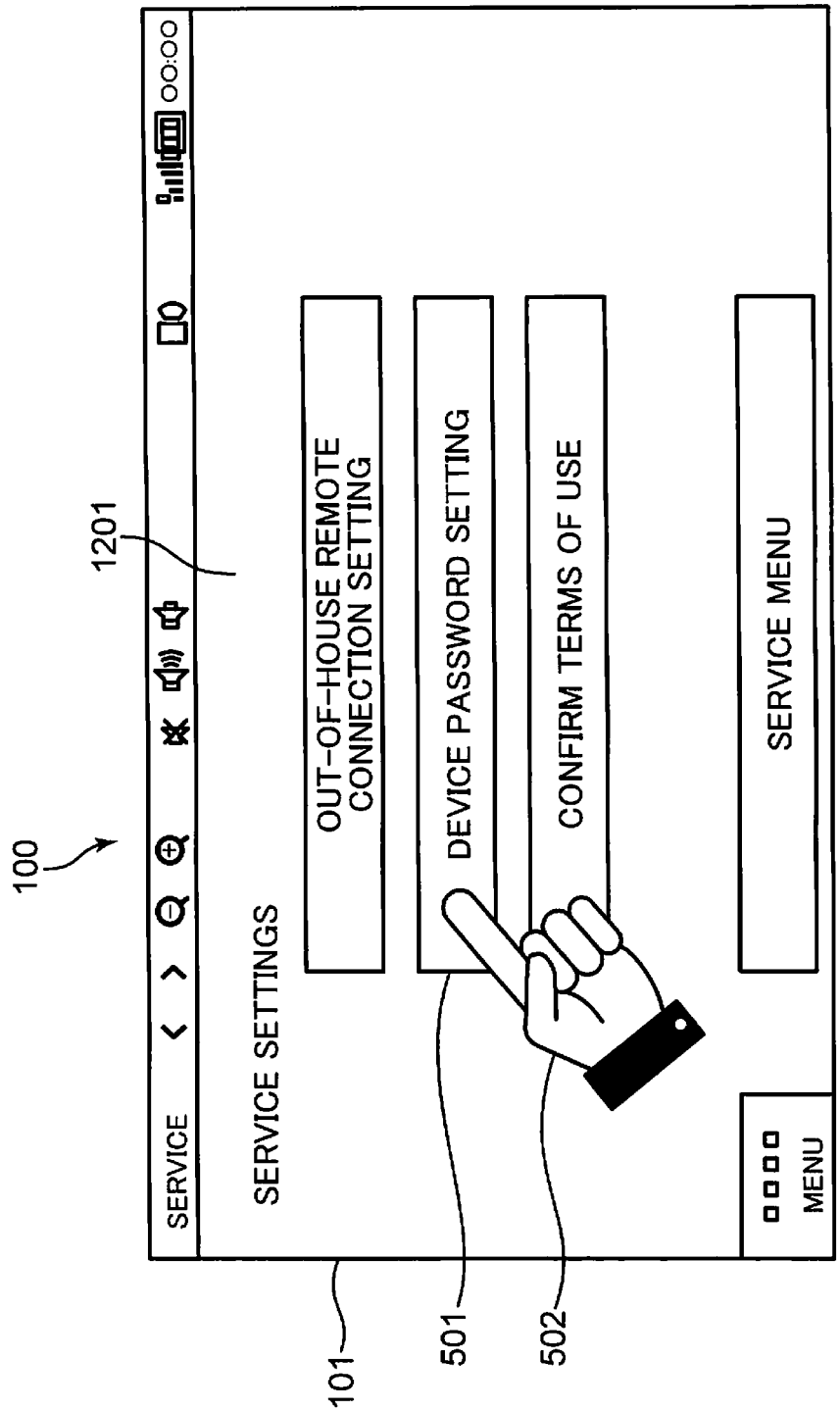

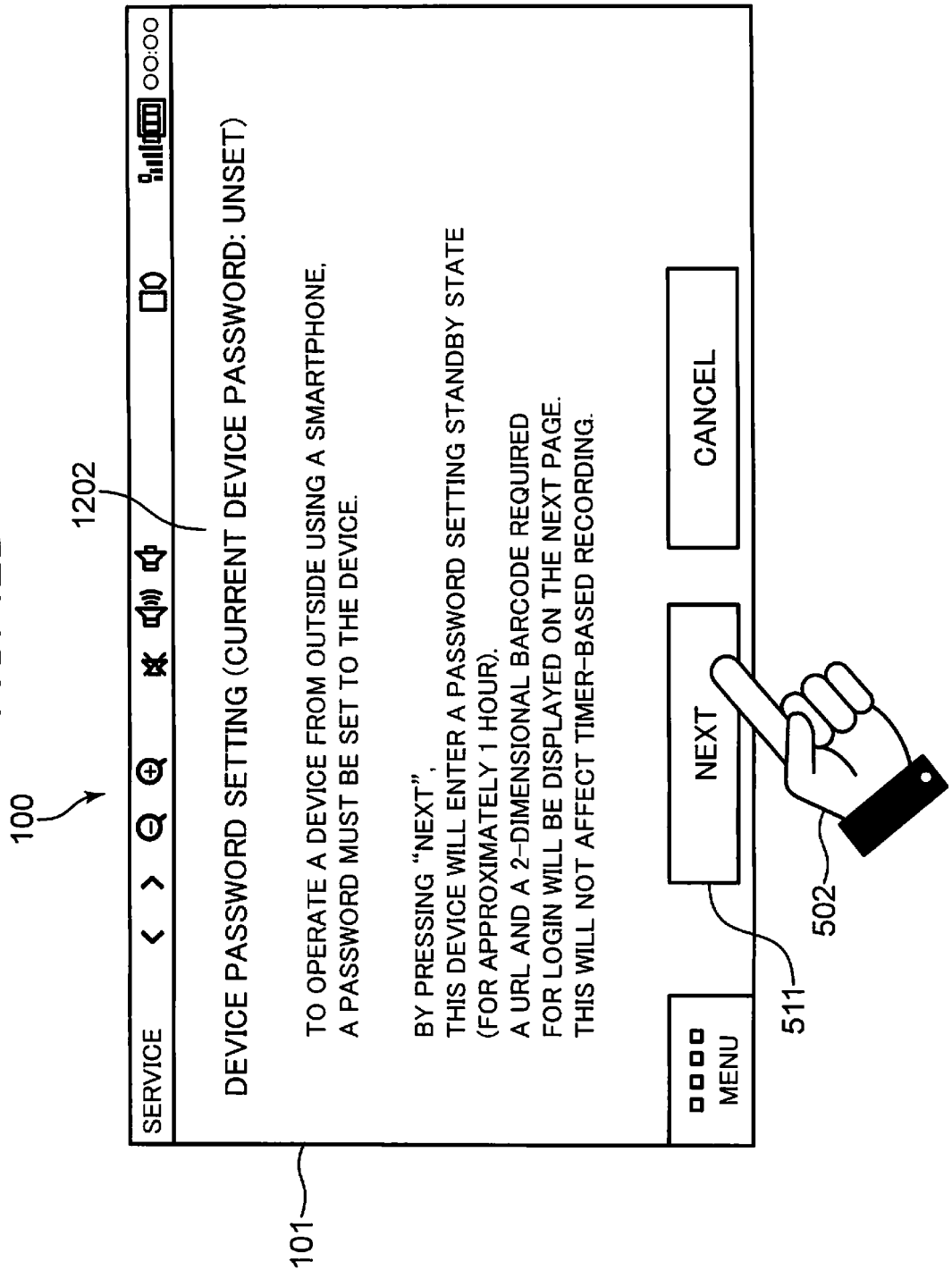

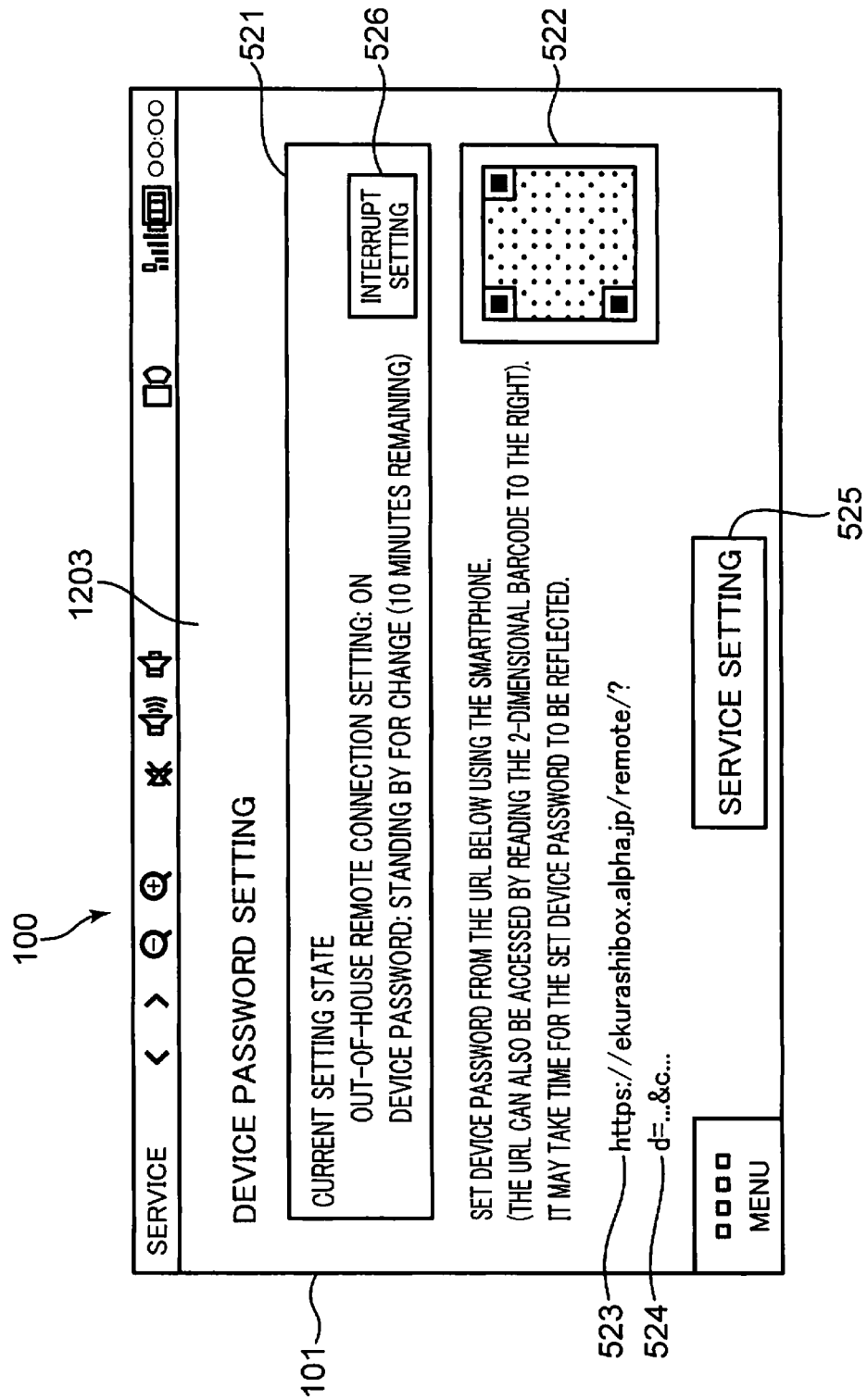

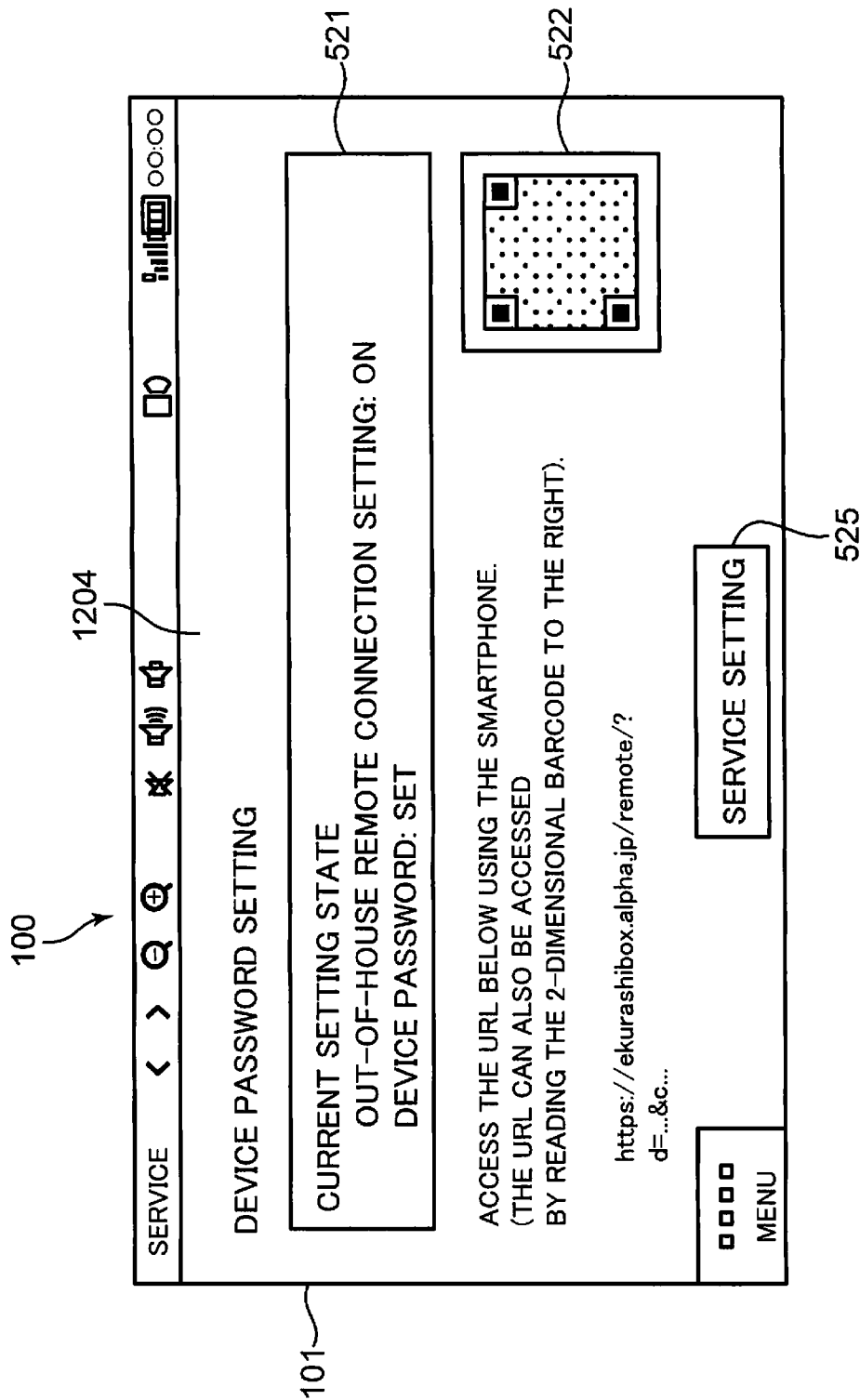

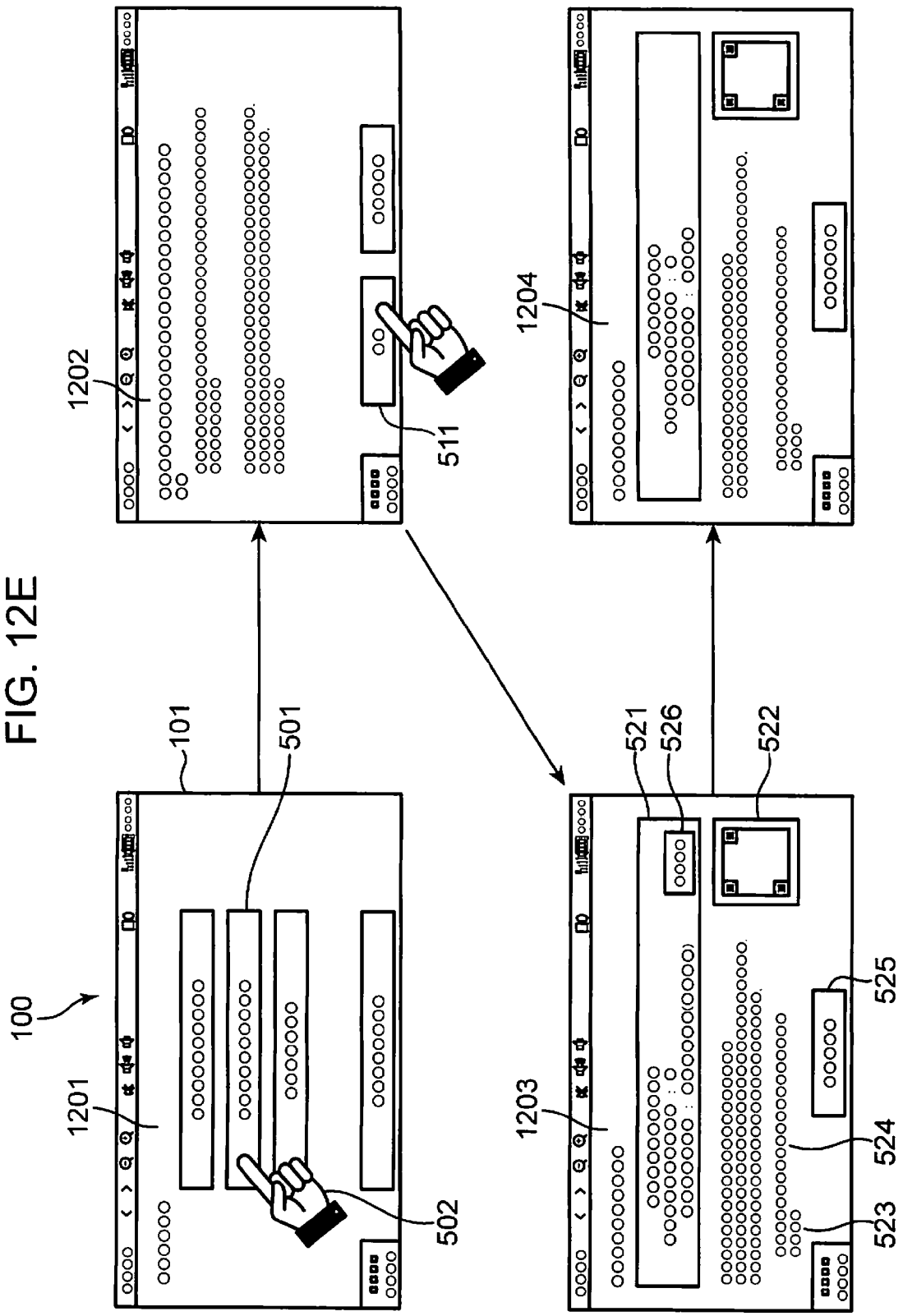

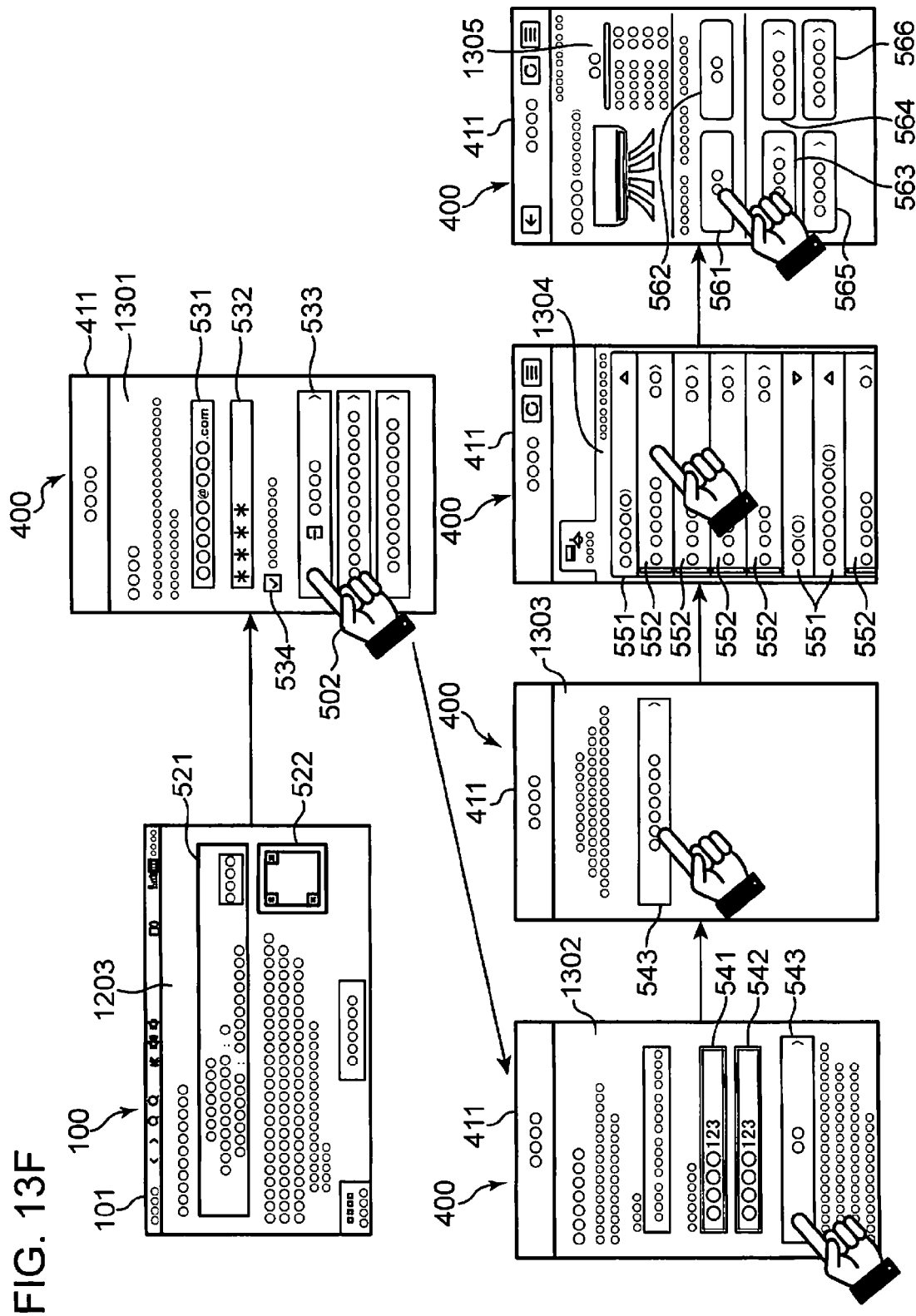

US 9,380,055 B2

DEVICE CONTROL METHOD, DEVICE MANAGEMENT SYSTEM, AND IN-HOUSE SERVER APPARATUS CONNECTED TO DEVICE MANAGEMENT SYSTEM

RELATED APPLICATIONS

This application is a Continuation application of International Application No. PCT/JP2014/001790, filed Mar. 27, 2014, which claims the benefit of U.S. Provisional application No. 61/948,766, filed Mar. 6, 2014, the disclosures of which are incorporated by reference herein in their entireties.

TECHNICAL FIELD

The present disclosure relates to a device control method, a device management system, and an in-house server apparatus that is connected to the device management system.

BACKGROUND ART

Patent Literature 1 relates to an authentication method in which, upon user registration, an authenticating apparatus transmits an address for a registration screen to a communicating apparatus of a user. The address for a registration screen includes a registration identifier that identifies the user and/or the communicating apparatus. When the communicating apparatus transmits a first password that is input to the registration screen to the authenticating apparatus, the authenticating apparatus authenticates a user based on the registration identifier and the first password. When the authentication is successful, the authenticating apparatus transmits a login screen to the communicating apparatus. The login screen includes a login identifier that identifies the user and/or the communicating apparatus. The communicating apparatus transmits a second password that is input to the login screen to the authenticating apparatus. The authenticating apparatus authenticates the user based on the login identifier and the second password.

However, Patent Literature 1 conceivably requires further improvements.

CITATION LIST

Patent Literature

Patent Literature 1: Japanese Unexamined Patent Publication No. 2002-215582

In one general aspect, the techniques disclosed here feature a method for controlling a target device in a device management system comprising: receiving, from an information device, a device password which is used for controlling the target device via an in-house server apparatus and which is input on the information device using a setting screen; managing a device ID of the in-house server apparatus, a user ID, and the device password in association with one another; transmitting the device password to the in-house server apparatus to cause the in-house server apparatus to manage the device ID and the device password in association with each other; transmitting, when login to an out-of-house server apparatus is authenticated, an authentication screen to the information device; receiving, from the information device, an input password that is input on the information device using the authentication screen; and when the received input password is identical to the device password that is associated with the user ID, approving a control of the target device by the information device.

According to the aspect described above, further improvements can be achieved. These general and specific aspects may be implemented using a system, a method, and a computer program, and any combination of systems, methods, and computer programs.

BRIEF DESCRIPTION OF DRAWINGS

FIG. 7 is a diagram schematically showing an example of a data structure of authentication setting information that is managed by an authentication setting manager of a server.

FIG. 9 is a diagram schematically showing an example of a data structure of home controller connection management information that is managed by a connected device manager of a server.

FIG. 10A is a diagram schematically showing an example of a data structure of device authentication information that is managed by an authenticator of a home controller.

FIG. 10B is a diagram schematically showing an example of a data structure of device authentication information that is managed by the authenticator of a home controller.

FIG. 10C is a diagram schematically showing an example of a data structure of device authentication information that is managed by the authenticator of a home controller.

FIG. 11A is a diagram schematically showing an example of a data structure of a control command that is transmitted from a server to a home controller.

FIG. 11B is a diagram schematically showing an example of a data structure of a control command that is transmitted from a server to a home controller.

FIG. 12A is a diagram schematically showing an example of a display screen of a display when causing a home controller to make a transition to a device password standby state.

FIG. 12B is a diagram schematically showing an example of a display screen of a display when causing a home controller to make a transition to a device password standby state.

FIG. 12C is a diagram schematically showing an example of a display screen of a display when causing a home controller to make a transition to a device password standby state.

FIG. 12D is a diagram schematically showing an example of a display screen of a display when causing a home controller to make a transition to a device password standby state.

FIG. 12E is a diagram schematically showing a transition example of a display screen of a display when causing a home controller to make a transition to a device password standby state.

FIG. 13F is a diagram schematically showing a transition example of a display screen of a mobile terminal in a login process.

Figure 1:
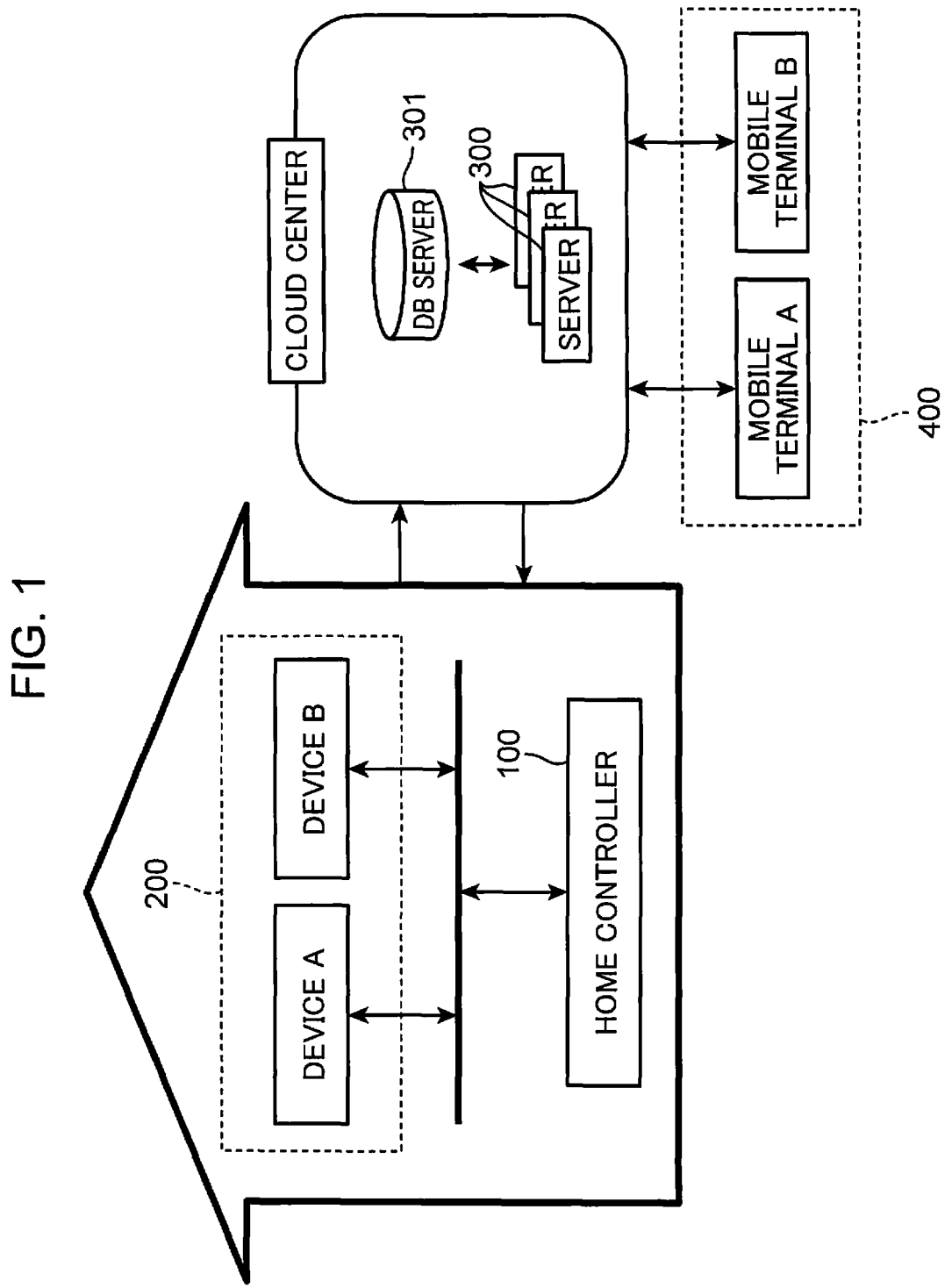
FIG. 1 is a diagram schematically showing an overall configuration of a device management system according to a present embodiment.

DETAILED DESCRIPTION (Circumstances Leading to the Invention of an Aspect of the Present Disclosure)

First, viewpoints of an aspect according to the present disclosure will be described.

As disclosed in Patent Literature 1 described earlier, techniques are available which involve, in a first user registration stage, requesting a registration identifier that identifies the user and/or the communicating apparatus and a first password and, in a next login stage, requesting a login identifier that identifies the user and/or the communicating apparatus and a second password.

In light thereof, the system described below is considered.

A home controller (in-house server apparatus) is, for example, connected to a target device (for example, an air conditioner or an illumination device or the like) inside a house and manages the target device. Inside the house, for example, an information device such as a smartphone or a tablet terminal transmits an instruction command for operating the target device. The home controller receives the instruction command. The home controller controls the target device based on the received instruction command.

In the considered system described above, when operating the target device via the home controller based on the instruction from the information device, the home controller and a user who uses the home controller must be registered in advance in association with each other. This is to prevent someone other than the registered user from operating the target device.

In doing so, the home controller may conceivably be provided with a function of the authenticating apparatus according to Patent Literature 1 described earlier in order to request authentication when accessing the home controller.

However, in the considered system described above, the target device is desirably operated from outside of the house in addition to being operated inside the house. In this case, an out-of-house server apparatus which accepts an instruction command from the information device outside of the house is necessary in addition to the home controller. When the information device transmits the instruction command outside of the house, the out-of-house server apparatus is to receive the instruction command and control the target device.

Even when adopting a system in which the out-of-house server apparatus is provided, a load on the out-of-house server apparatus can be reduced by providing the home controller in each house and having the home controller manage target devices for each house. Therefore, in the considered system described above, both the home controller and the out-of-house server apparatus are provided.

In a system in which the out-of-house server apparatus is provided in addition to the home controller as described above, authentication is not only requested when accessing the home controller but is also requested when accessing the out-of-house server apparatus.

In this case, a request for the registration identifier and the first password in a user registration stage and a request for the login identifier and the second password in a login stage as in the case of Patent Literature 1 described above are respectively required when both accessing the home controller and accessing the out-of-house server apparatus. Therefore, the target device cannot be operated by a common procedure and steps required to operate the target device become complicated.

In addition, the identifier and the password that are required to access the home controller are independent of the identifier and the password that are required to access the out-of-house server apparatus. Therefore, when the password required to access the home controller is leaked together with a corresponding identifier, anyone other than the registered user will be able to operate the target device from inside the house. In a similar manner, when the password required to access the out-of-house server apparatus is leaked together with a corresponding identifier, anyone other than the registered user will be able to operate the target device from outside of the house.

Therefore, not only a procedure for operating the target device becomes complicated but security levels for both accessing the home controller and accessing the out-of-house server apparatus must also be respectively improved.

Based on the considerations given above, the present inventors have arrived at an invention represented by the respective aspects of the present disclosure as described below.

An aspect of the present disclosure is a method for controlling a target device in a device management system including i) an in-house server apparatus connectable to the target device, ii) an information device which outputs an instruction command to control the target device, and iii) an out-of-house server apparatus which receives the instruction command from the information device and which transmits the instruction command to the in-house server apparatus to control the target device, the method comprising:

receiving, from the information device via an out-of-house network, a first request for providing the information device with a setting screen for a communication using the in-house server apparatus, by using access information which is provided by the in-house server apparatus and which includes a device ID of the in-house server apparatus;

receiving, from the information device via the out-of-house network, a user ID and a user password which are input at the information device using the setting screen;

receiving, from the information device via the out-of-house network, a device password which is used for controlling the target device via the in-house server apparatus and which is input at the information device using the setting screen;

managing the device ID, the user ID, and the device password in association with one another;

transmitting the device password to the in-house server apparatus to cause the in-house server apparatus to manage the device password and the device ID of the in-house server apparatus in association with each other, whereafter a communication corresponding to the first request is completed;

receiving, from the information device via the out-of-house network, a second request for logging in the out-of-house server with the user ID and the user password, using a login screen for controlling the target device at the information device;

transmitting, when the login is authenticated in the device management system, an authentication screen to the information device via the out-of-house network;

receiving, from the information device via the out-of-house network, an input password which is input at the information device using the authentication screen;

approving a control of the target device by the information device and transmitting an operation screen for controlling the target device to the information device, when the received input password is identical to the device password associated with the user ID;

receiving from the information device the instruction command to the target device via the operation screen for controlling the target device, and transmitting the instruction command to the in-house server apparatus to control the target device via the in-house server apparatus.

According to the present aspect, first, the in-house server apparatus and a user of the information device are associated with each other by a device ID provided by the in-house server apparatus and the device password that is input from the information device. In the in-house server apparatus, the device ID and the device password are managed in association with each other.

The device password that is input from the information device has been set by the user. Therefore, the in-house server apparatus and the user of the information device are associated with each other. As a result, using the in-house server apparatus, the user of the information device acquires authority to operate the target device that is managed by the in-house server apparatus.

However, when the device password is leaked together with the device ID, there is a risk that anyone other than the user can operate the target device using the device password.

In order to prevent leakage of the device password together with a device ID, the system may conceivably impose strict control over persons who can access the device ID in addition to having the user strictly manage the device password.

However, the device ID is provided by the in-house server apparatus. When an information device which operates the target device is a smartphone for example, there may be cases where a user of the information device changes a model of the information device to a different model. In addition, there may be cases where the target device is operated from respective smartphones of members of a family.

Therefore, the device ID that is provided by the in-house server apparatus can desirably be accessed by unspecified users. Accordingly, it is not appropriate to strictly control persons who can access the device ID for the purpose of preventing leakage of the device password together with the device ID.

As described earlier, the target device is desirably operated from outside of the house in addition to being operated inside the house.

In consideration thereof, the device management system is provided with an out-of-house server apparatus which is a third device that differs from the in-house server apparatus and the information device. In other words, in both cases of operating the target device inside the house and operating the target device from outside of the house using the information device, the out-of-house server apparatus receives an instruction command from the information device and controls the target device via the in-house server apparatus.

Specifically, the device management system receives, from the information device via an out-of-house network, a first request for providing the information device with a setting screen for a communication using the in-house server apparatus, by using access information that includes a device ID and that is provided by the in-house server apparatus.

Next, the device management system receives, from the information device via the out-of-house network, a user ID and a user password which are input on the information device using the setting screen.

Next, the device management system receives, from the information device via the out-of-house network, a device password which is used for controlling the target device via the in-house server apparatus and which is input on the information device using the setting screen.

Accordingly, the device ID, the user ID, and the device password are managed in the device management system in association with one another.

In this case, the device ID is not used to operate the target device. Specifically, the device ID appears when the device ID, the user ID, and the device password are managed in association with one another in the device management system and basically remains unused thereafter.

Therefore, even when a user who can access the device ID cannot be strictly managed, by limiting opportunities in which the device ID is required, opportunities of leakage of the device password together with the device ID can be reduced.

On the other hand, an operation of the target device is performed using the user ID and the user password which are input from the information device upon logging in to operate the target device without using the device ID that is provided by the in-house server apparatus.

However, even in this case, there is a risk that anyone can operate the target device when leakage of the user ID and the user password occurs. As a countermeasure to leakage of the user password together with the user ID, there is a method of periodically prompting the user password to be updated.

However, there is a limit to what this method can accommodate.

Therefore, when operating the target device, in addition to requesting the user ID and the user password which are input from the information device upon logging in to operate the target device, authentication of an input password that is input on the information device using the authentication screen (second stage authentication) is also requested.

Accordingly, the target device can be controlled based on an operation from the information device only by second stage authentication using the user password and the input password. Therefore, security can be improved so that only a specific person can operate the target device.

Furthermore, the input password described above which is input on the information device using the authentication screen is required to be the same as a device password that is associated with the user ID. In other words, the input password that is used when operating the target device using the device management system is the same as a device password that associates the in-house server apparatus and a user of the information device with each other.

Therefore, a password that differs from the device password that associates the in-house server apparatus and a user of the information device with each other is not requested to the user of the information device as a password for second stage authentication that is used when operating the target device using the device management system.

In other words, a procedure for requesting a device password that is used when associating the in-house server apparatus and a user of the information device with each other doubles as a procedure for requesting an input password that is used when operating the target device using the device management system.

Accordingly, by associating accessing the out-of-house server apparatus with accessing the in-house server apparatus, a procedure for requesting an input password that is used when operating the target device using the device management system can be omitted. Therefore, a procedure of an overall process can be simplified accordingly.

As described above, according to the present aspect, leakage of the device password together with the device ID can be prevented by using the user ID and the user password instead of using the device ID when operating the target device using the device management system. In addition, the security level can be improved by not only requesting the user ID and the user password but also requesting the input password.

Furthermore, by making the input password that is used when operating the target device using the device management system the same as a device password that associates the in-house server apparatus and a user of the information device with each other, accessing the out-of-house server apparatus is associated with accessing the in-house server apparatus. Therefore, a procedure of an overall process can be simplified while maintaining the improved security level.

Moreover, the device ID is included in the access information and is transmitted from the information device to the device management system. In addition, the device ID may be transmitted from the information device to the device management system together with the device password.

With cloud systems, there may be cases where an out-of-house server apparatus that receives a request for the setting screen using the access information and an out-of-house server apparatus that receives the device password using the setting screen differ from one another in the device management system. In such a case, in order to have the out-of-house server apparatus that receives the device password using the setting screen acquire the device ID, the information device must once again transmit the device ID to the device management system. In consideration thereof, the device ID may be transmitted together with the device password from the information device to the device management system in addition to being included in the access information and transmitted from the information device to the device management system.

In the aspect described above, for example, an input of the device ID of the in-house server apparatus is not required at the authentication screen.

According to the present aspect, a procedure for requesting a device password that is used when associating the in-house server apparatus and a user of the information device with each other doubles as a procedure for requesting an input password that is used when operating the target device using the device management system.

In addition, input of the device ID is not requested on the authentication screen. Specifically, the device ID appears when the device ID, the user ID, and the device password are managed in association with one another in the device management system and basically remains unused thereafter. Therefore, even if the device password doubles as the input password, leakage of the device password together with the device ID can be prevented.

In the aspect described above, for example,
the in-house server apparatus may include a display that displays the access information including the device ID of the in-house sever apparatus, and
the information device may read the access information from the display of the in-house server apparatus to obtain the access information.

In the aspect described above, for example,
only when the in-house server apparatus receives the device password before a predetermined period elapses after the access information including the device ID is displayed on the display of the in-house server apparatus, the device password may be managed by the in-house server apparatus in association with the device ID of the in-house server apparatus.

According to the present aspect, instead of strictly managing a procedure of issuing the device ID, opportunities in which anyone other than the user of the target device can set the device password is limited by limiting a period in which the in-house server apparatus determines the device password that corresponds to the device ID to be valid. Accordingly, a possibility of anyone other than the user of the target device controlling the target device using the in-house server apparatus can be reduced.

In the aspect described above, for example,
the access information may be displayed on the display of the in-house server apparatus in a format of a one-dimensional or two-dimensional code.

According to the present aspect, input of access information including the device ID on the information device is simplified.

Another aspect of the present disclosure is a device management system including:
an in-house server apparatus which is connectable to a target device;
an information device which outputs an instruction command to control the target device, and
an out-of-house server apparatus which receives the instruction command from the information device and which transmits the instruction command to the in-house server apparatus to control the target device,
wherein the out-of-house server apparatus:
receives, from the information device via an out-of-house network, a first request for providing the information device with a setting screen for using the in-house server apparatus, by using access information which is provided by the in-house server apparatus and which includes a device ID of the in-house server apparatus;
receives, from the information device via the out-of-house network, a user ID and a user password which are input at the information device using the setting screen;
receives, from the information device via the out-of-house network, a device password which is used for controlling the target device via the in-house server apparatus and which is input at the information device using the setting screen;
manages the device ID, the user ID, and the device password in association with one another;
transmits the device password to the in-house server apparatus to cause the in-house server apparatus to manage the device password and the device ID of the in-house server apparatus in association with each other, whereafter a communication corresponding to the first request is completed;

receives, from the information device via the out-of-house network, a second request for logging in the out-of-house server apparatus with the user ID and the user password, using a login screen for controlling the target device at the information device;
transmits, when the login is authenticated in the device management system, an authentication screen to the information device via the out-of-house network;
receives, from the information device via the out-of-house network, an input password which is input on the information device using the authentication screen;
approves an operation of the target device by the information device and transmits an operation screen for controlling the target device to the information device, when the received input password is identical to the device password associated with the user ID;
receives the instruction command to the target device via the operation screen for controlling the target device, and
transmits the instruction command to the in-house server apparatus to control the target device via the in-house server apparatus,
and wherein the in-house server apparatus:
receives the device password from the out-of-house server apparatus to manage the device ID and the device password in association with each other.

According to another aspect of the present disclosure, a similar effect to the device control method according to the aspect of the present disclosure described above can be obtained.

In the other aspect described above, for example,
an input of the device ID of the in-house server apparatus is not required at the authentication screen.

According to the present aspect, a procedure for requesting a device password that is used when associating the in-house server apparatus and a user of the information device with each other doubles as a procedure for requesting an input password that is used when operating the target device using the device management system.

In addition, input of the device ID is not requested on the authentication screen. Specifically, the device ID appears when the device ID, the user ID, and the device password are managed in association with one another in the device management system and basically remains unused thereafter. Therefore, even if the device password doubles as the input password, leakage of the device password together with the device ID can be prevented.

Another aspect of the present disclosure is an in-house server apparatus which is connected to the device management system of the aspect described above.

In the other aspect described above, for example,
the in-house server apparatus may include a display that displays the access information including the device ID of the in-house sever apparatus. The access information may be read by the information device from the display of the in-house server apparatus.

In the other aspect described above, for example,
only when the in-house server apparatus receives the device password before a predetermined period elapses after the access information including the device ID is displayed on the display of the in-house server apparatus, the device password may be managed by the in-house server apparatus in association with the device ID of the in-house server apparatus.

According to the present aspect, instead of strictly managing a procedure of issuing the device ID, opportunities in which anyone other than the user of the target device can set the device password is limited by limiting a period in which the in-house server apparatus determines the device password that corresponds to the device ID to be valid. Accordingly, a possibility of anyone other than the user of the target device controlling the target device using the in-house server apparatus can be reduced.

In the aspect described above, for example, the in-house server apparatus may display the access information including the device ID on the display of the in-house server apparatus in a format of a one-dimensional or two-dimensional code.

According to the present aspect, input of access information including the device ID on the information device is simplified.

(Embodiment)

Hereinafter, an embodiment of the present disclosure will be described with reference to the drawings. Moreover, in the respective drawings, same reference numerals are used to denote same components.

(Overall Configuration)

FIG. 1 is a diagram schematically showing an overall configuration of a device management system according to a present embodiment. As shown in FIG. 1, the device management system includes a home controller 100 (an example of the in-house server apparatus), a server 300 (an example of the out-of-house server apparatus), a database (DB) server 301, and a mobile terminal 400 (an example of the information device). The device management system remotely controls a device 200 (an example of the target device).

The home controller 100 and one or more devices 200 (for example, a device A 200 and a device B 200) are arranged inside a house. Examples of the device 200 include an air conditioner, an illumination device, a bath, a refrigerator, a washing machine, a toilet, an electric curtain apparatus, a camera, an electronic lock, and an electric shutter apparatus.

The server 300 and the DB server 301 are arranged in a cloud center. Moreover, the cloud center is provided with a plurality of the servers 300. The mobile terminal 400 (for example, a mobile terminal A 400 and a mobile terminal B 400) moves between inside and outside of the house together with a user who owns the mobile terminal 400.

The home controller 100, the device 200, the server 300, and the mobile terminal 400 communicate with one another via a wired or wireless network. For example, the device 200 and the home controller 100 are connected so as to be capable of communicating with each other via a wireless or wired in-house network. The home controller 100, the server 300, and the mobile terminal 400 are connected so as to be capable of communicating with each other via an out-of-house network such as the Internet.

Figure 2:
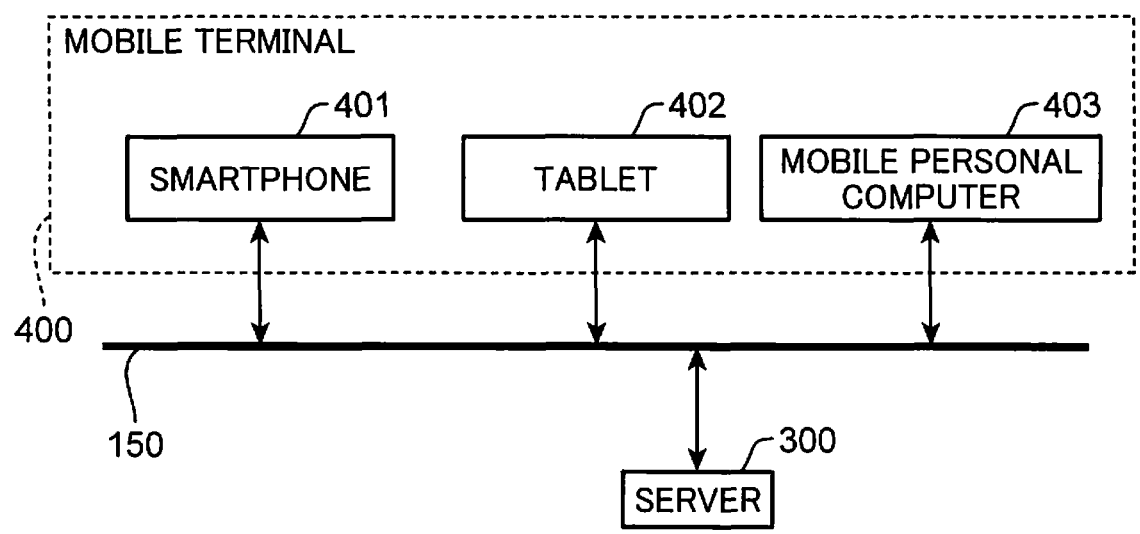
FIG. 2 is a block diagram schematically showing an example of a mobile terminal.

FIG. 2 is a block diagram schematically showing an example of the mobile terminal 400. As shown in FIG. 2, examples of the mobile terminal 400 include a smartphone 401, a tablet terminal 402, and a mobile personal computer 403. The smartphone 401, the tablet terminal 402, and the mobile personal computer 403 are respectively configured to be capable of communicating with the server 300 via an out-of-house network 150 such as the Internet. One user may operate different mobile terminals 400 from different locations. Alternatively, family members may respectively operate different mobile terminals 400.

Figure 3:
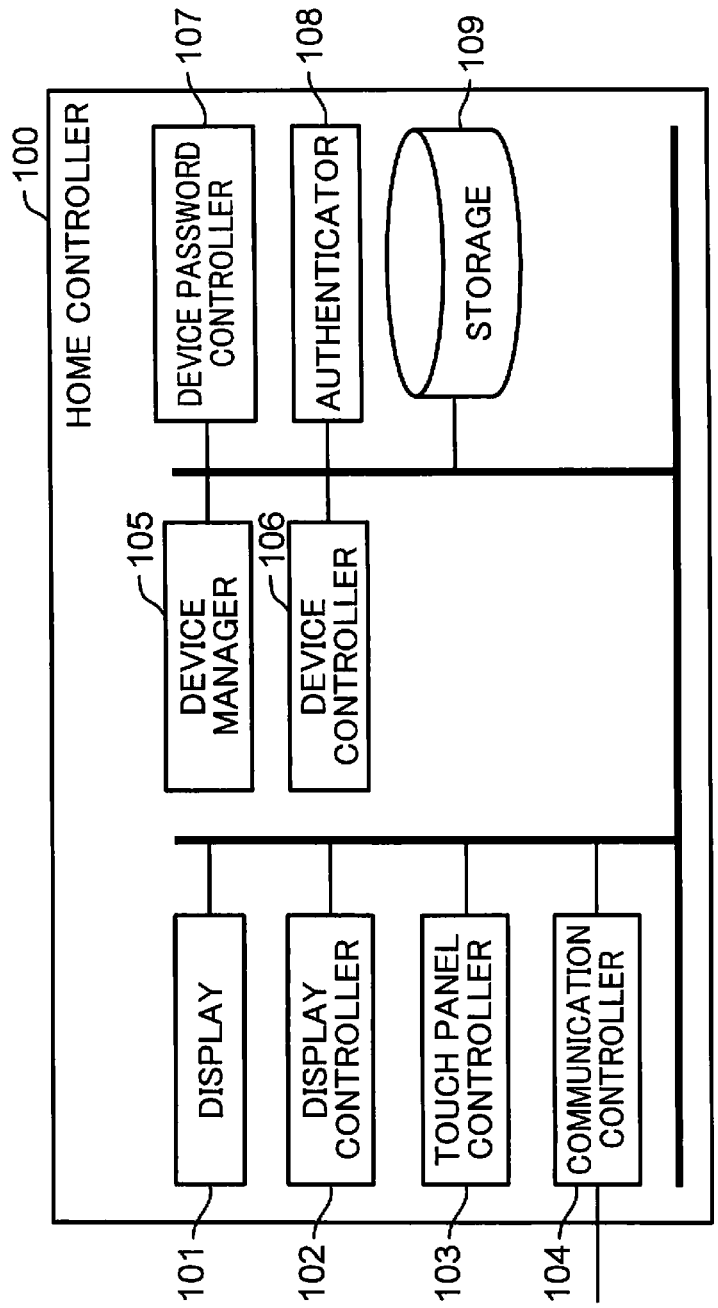
FIG. 3 is a block diagram schematically showing a configuration of a home controller.

FIG. 3 is a block diagram schematically showing a configuration of the home controller 100. The home controller 100 controls the device 200 based on a control command that is transmitted from the server 300. Basically, the home controller 100 is configured to be constantly capable of communicating with the server 300.

As shown in FIG. 3, the home controller 100 includes a display 101, a display controller 102, a touch panel controller 103, a communication controller 104, a device manager 105, a device controller 106, a device password controller 107, an authenticator 108, and a storage 109.

The display 101 is constituted by, for example, a touch panel display. The display 101 displays a user interface that enables a user to operate the home controller 100 and the like. By touching the display 101, the user can input various operations to the home controller 100. For example, the display 101 is installed on a wall inside the house. The display controller 102 generates a GUI (Graphical User Interface) of the home controller 100 and causes the GUI to be displayed on the display 101.

When the touch panel controller 103 recognizes an operation to the display 101 by the user, the touch panel controller 103 interprets contents of the operation and notifies the operation contents to other components. For example, when an object is displayed by the display controller 102 at a position on the display 101 which is tapped by the user, the touch panel controller 103 recognizes that the object is selected by the user. Various GUI parts that accept operations by the user such as a button may be adopted as the object.

The communication controller 104 controls communication between the home controller 100 and the device 200 as well as communication between the home controller 100 and the server 300. In addition, the communication controller 104 accepts transmission requests for various types of data from other blocks and transmits the transmission requests to the device 200 or the server 300. Furthermore, the communication controller 104 receives data transmitted from the device 200 or the server 300 and delivers the data to a concerned block.

The device manager 105 manages a device 200 that is a control target using information related to the device 200 that is stored in the storage 109. In addition, when a device 200 is connected to the in-house network, the device manager 105 detects the device 200. The device controller 106 controls the device 200 based on a control command for controlling the device 200 which is transmitted from the server 300. The device controller 106 issues a request to the communication controller 104 to transmit a result of control of the device 200 based on the control command to the server 300.

The device password controller 107 controls setting and initialization of a device password (described in detail later with reference to FIG. 7) using device authentication information 1000 (FIGS. 10A to 10C to be described later). When the device password controller 107 receives a device password within a predetermined period (in the present embodiment, for example, 60 minutes) from the moment the home controller 100 makes a transition to a device password standby state, the device password controller 107 saves the received device password in the device authentication information 1000.

The authenticator 108 performs authentication regarding whether or not a device password transmitted from the server 300 matches a device password that is saved in the device authentication information 1000. The storage 109 stores information necessary for operations of the home controller 100 such as information related to the device 200 that is managed by the device manager 105 and the device authentication information 1000.

Figure 4:
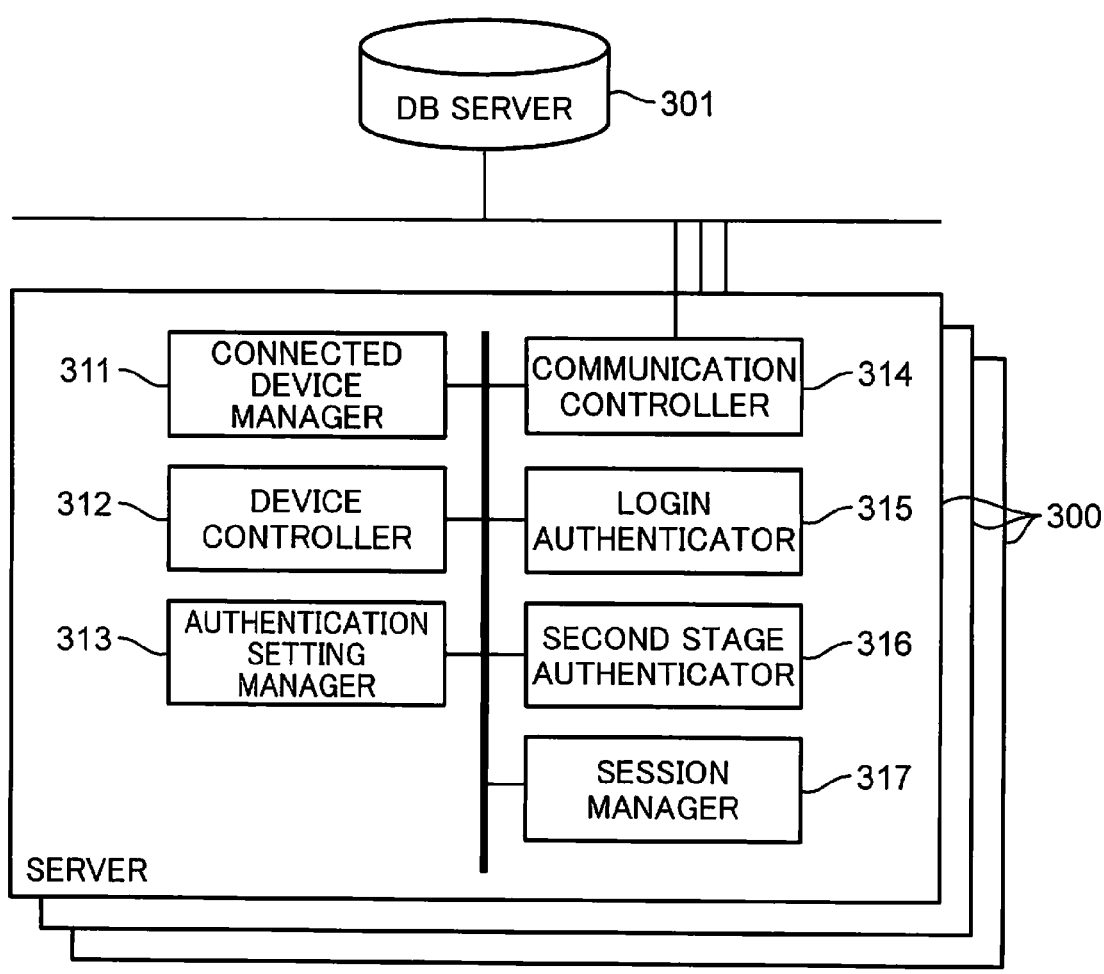
FIG. 4 is a block diagram schematically showing a configuration of a cloud center.

FIG. 4 is a block diagram schematically showing a configuration of a cloud center. The server 300 of the cloud center controls the device 200 via the home controller 100 based on an instruction transmitted from the mobile terminal 400.

The cloud center includes a plurality of the servers 300 which share the same configuration. A load balancer (not shown) is arranged at an entrance of the server 300 when the server 300 performs data transmission and reception with the home controller 100 and the mobile terminal 400. The load balancer monitors a load on each server 300 and distributes data received from the home controller 100 or the mobile terminal 400 to the server 300 with a light load.

As shown in FIG. 4, the server 300 includes a connected device manager 311, a device controller 312, an authentication setting manager 313, a communication controller 314, a login authenticator 315, a second stage authenticator 316, and a session manager 317.

For each house (in other words, for each home controller 100), the connected device manager 311 manages the device 200 connected to the home controller 100 using home controller connection management information 900 (FIG. 9 to be described later). The connected device manager 311 stores the home controller connection management information 900 in the DB server 301. The connected device manager 311 creates a device list screen (FIG. 13D to be described later) based on the home controller connection management information 900.

The device controller 312 creates a device operation screen (FIG. 13E to be described later) for operating the device 200 in response to a request from the mobile terminal 400. The device controller 312 generates a control command for controlling the device 200 in response to an instruction from the mobile terminal 400 using the device operation screen. Upon receiving a request from the device controller 312, the communication controller 314 transmits the control command generated by the device controller 312 to the home controller 100.

The authentication setting manager 313 manages information related to authentication when accessing the server 300 from the mobile terminal 400. Specifically, the authentication setting manager 313 manages data included in authentication setting information 700 (FIG. 7 to be described later). The authentication setting manager 313 stores the authentication setting information 700 in the DB server 301.

The communication controller 314 controls communication between the server 300 and the home controller 100 as well as communication between the server 300 and the mobile terminal 400. The communication controller 314 accepts transmission requests for various types of data from other blocks and transmits the transmission requests to the home controller 100 or the mobile terminal 400. The communication controller 314 receives data transmitted from the home controller 100 or the mobile terminal 400 and delivers the data to a concerned block.

The login authenticator 315 controls authentication upon login that is a first stage authentication based on a login ID, a login password (described in detail later with reference to FIG. 7), and the like which are included in the authentication setting information 700 (FIG. 7 to be described later). The second stage authenticator 316 controls second stage authentication that is performed when operating the device 200. The session manager 317 manages session information 800 (FIG. 8 to be described later) every time a login is performed. The session manager 317 stores the session information 800 in the DB server 301.

Figure 5:
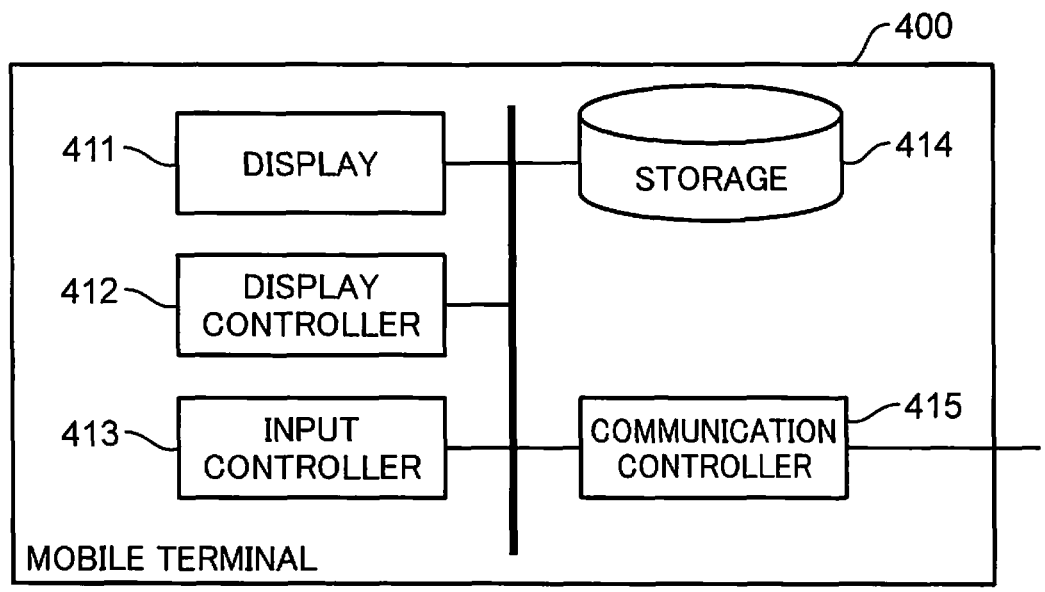
FIG. 5 is a block diagram schematically showing a configuration of a mobile terminal.

FIG. 5 is a block diagram schematically showing a configuration of the mobile terminal 400. By operating the mobile terminal 400 and transmitting a request to the server 300, the user operates the device 200. As shown in FIG. 5, the mobile terminal 400 includes a display 411, a display controller 412, an input controller 413, a storage 414, and a communication controller 415.

The display 411 is constituted by, for example, a touch panel display. The display 411 displays a user interface and the like, the user interface enabling a user to operate the mobile terminal 400. By touching the display 411, the user can input various operations to the mobile terminal 400. The display controller 412 generates a GUI of the mobile terminal 400 and causes the GUI to be displayed on the display 411.

When the input controller 413 recognizes an operation to the display 411 by the user, the input controller 413 interprets contents of the operation and notifies the operation contents to other blocks. For example, when an object is displayed at a position on the display 411 that is tapped by the user, the input controller 413 recognizes that the object is selected by the user. Various GUI parts that accept operations by the user such as a button may be adopted as the object.

The communication controller 415 controls communication between the mobile terminal 400 and the server 300. The communication controller 415 accepts transmission requests for various types of data from other blocks and transmits the transmission requests to the home controller 100 or the server 300. The communication controller 415 receives data transmitted from the home controller 100 or the server 300 and delivers the data to a concerned block. The storage 414 stores information necessary for operation of the mobile terminal 400 such as data transmitted from the home controller 100 or the server 300.

Since the communication controller 415 performs browser-based communication with the server 300, contents of a transmission from the server 300 include a cookie. A login state regarding communication between the mobile terminal 400 and the server 300 is stored in the cookie. Accordingly, the storage 414 saves the cookie included in contents of transmission from the server 300.

Figure 6:
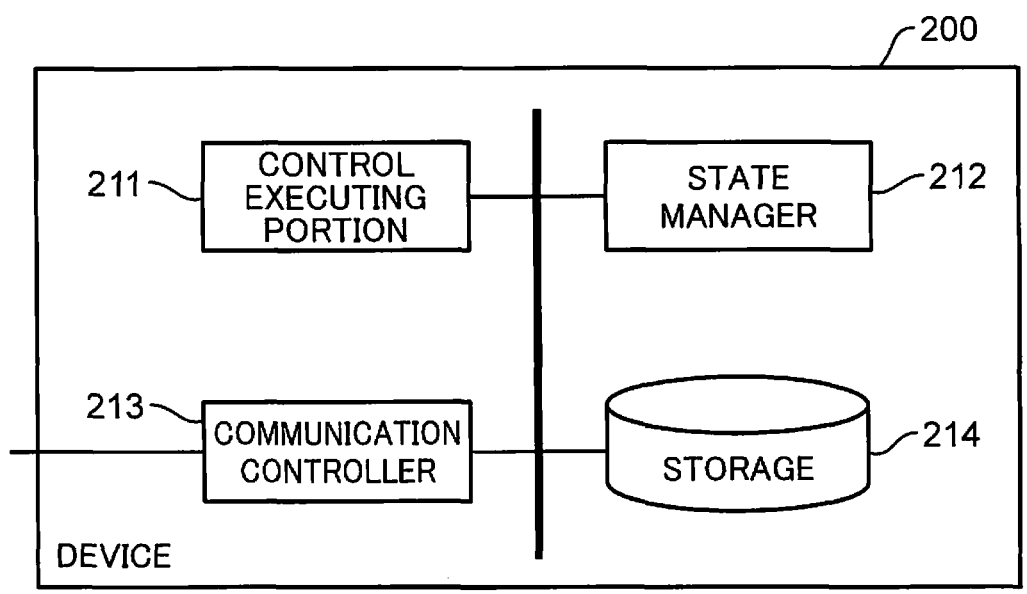
FIG. 6 is a block diagram schematically showing a configuration of a device.

FIG. 6 is a block diagram schematically showing a configuration of the device 200. As shown in FIG. 6, the device 200 includes a control executing portion 211, a state manager 212, a communication controller 213, and a storage 214. The control executing portion 211 controls the device 200 according to a control command that is transmitted from the home controller 100. Contents of control of the device 200 by the control executing portion 211 differ depending on a type of the device 200. For example, if the device 200 is an illumination device, the control executing portion 211 turns the illumination device on and off. In addition, the control executing portion 211 issues a request to the communication controller 213 to transmit a result of execution of a control command or a state of the device 200 to the home controller 100.

The state manager 212 manages a state of the device 200. Contents of management of the device 200 by the state manager 212 differ depending on a type of the device 200. For example, if the device 200 is an illumination device, the state manager 212 manages whether the illumination device is currently in an on state or an off state. The communication controller 213 controls communication between the device 200 and the home controller 100. In addition, the communication controller 213 accepts transmission requests for various types of data from other blocks and transmits the transmission requests to the home controller 100. Furthermore, the communication controller 213 receives data transmitted from the home controller 100 and delivers the data to a concerned block. The storage 214 stores information related to a state of the device 200 that is managed by the state manager 212.

(Data Structure of Information)

FIG. 7 is a diagram schematically showing an example of a data structure of the authentication setting information 700 that is managed by the authentication setting manager 313 of the server 300. The authentication setting information 700 is information for authenticating a user who has accessed the server 300 using the mobile terminal 400. As shown in FIG. 7, the authentication setting information 700 includes login authentication information 701, second stage authentication information 702, and device association information 703.

The login authentication information 701 includes a login ID 711, a login password 712, a login authentication skip setting 713, and a login authentication skip time limit 714.

Figure 13A:
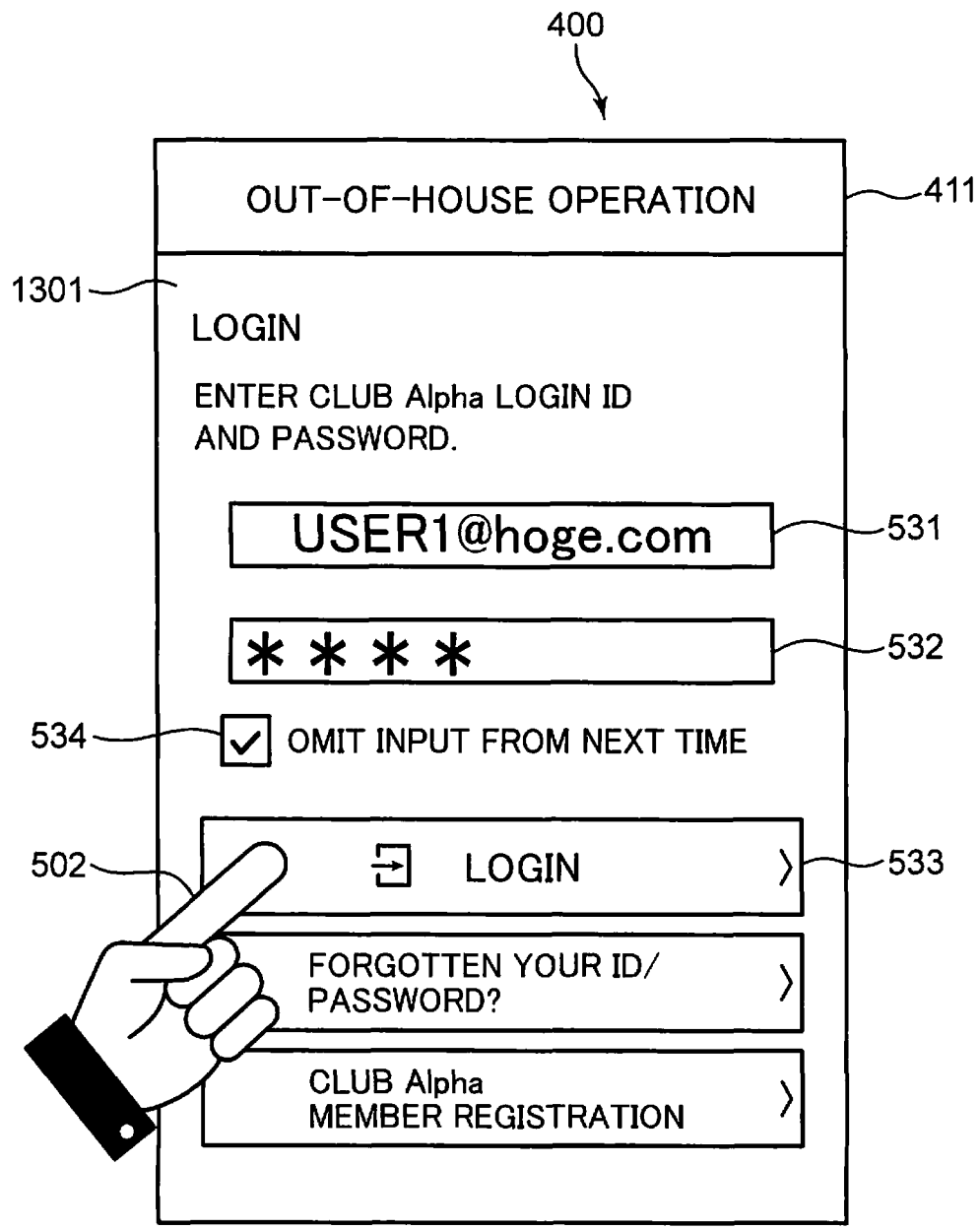
FIG. 13A is a diagram schematically showing an example of a display screen of a mobile terminal in a login process.

When a user registers as a member in Club Alpha which operates the device management system according to the present embodiment using a "CLUB Alpha member registration" button provided on a login screen 1301 shown in FIG. 13A for example, a login ID and a login password are issued. The login ID 711 (an example of the user ID) is information for identifying each user. The login password 712 (an example of the user password) is a personal identification number that must be input upon login.

The login authentication skip setting 713 includes information indicating "enabled" or "disabled". The login authentication skip time limit 714 includes information indicating a skip time limit. When the login authentication skip setting 713 is set to "enabled", a next login process is not performed until the skip time limit (for example, one month from now) that is set as the login authentication skip time limit 714 expires. "Enabled" or "disabled" of the login authentication skip setting 713 is set by a selection made by the user upon login. Alternatively, the login authentication skip setting 713 may be set to "enabled" by default.

The second stage authentication information 702 includes second stage authentication usage 721, a second stage authentication skip setting 722, and a second stage authentication skip time limit 723. The second stage authentication usage 721 includes information indicating "enabled" or "disabled". The second stage authentication skip setting 722 includes information indicating "enabled" or "disabled". The second stage authentication skip time limit 723 includes information indicating a skip time limit.

When the second stage authentication usage 721 is set to "enabled", a second stage authentication is performed after a first stage authentication (authentication upon login) when operating the device 200. When the second stage authentication usage 721 is set to "disabled", the second stage authentication is not performed. When the second stage authentication skip setting 722 is set to "enabled", a second stage authentication process is not performed until the skip time limit (for example, one month from now) that is set as the second stage authentication skip time limit 723 expires.

While the second stage authentication process doubles as a confirmation of ownership of the home controller 100, it is conceivable that the confirmation need not be frequently performed. Therefore, a configuration is adopted in which the second stage authentication process can be omitted. In addition, as shown in FIG. 7, the second stage authentication skip time limit 723 is set separately from the login authentication skip time limit 714. As a result, flexible control can be achieved.

The device association information 703 is information for associating a user who is identified by the login ID 711 and the home controller 100 that is owned by the user with each other. The device association information 703 includes a device ID 731 and a device password 732. The device ID 731 is information for identifying each home controller 100. The device password 732 is a personal identification number that is set by the user.

When the user accesses the server 300 from the mobile terminal 400 for the first time using access information in which a device ID of the home controller 100 has been added to an URL (Uniform Resource Locator) of the server 300, the user is guided to set a device password as will be described later. Subsequently, when the user sets a device password, the device password 732 associates the login ID 711 which identifies the user with the device ID 731 which identifies the home controller 100.

In this manner, the authentication setting manager 313 uses the device password 732 to manage the login ID 711 and the device ID 731 of the home controller 100 in association with each other. Therefore, by setting the device password 732, the user with the login ID 711 can now use the home controller 100 with the device ID 731.

In FIG. 7, for example, since a user whose login ID 711 is "USER3@hoge.com" has a login ID, it is obvious that the user is registered as a member in Club Alpha. However, this user has not yet set a device password. Therefore, "unset" is respectively saved for the device ID 731 and the device password 732 in the device association information 703.

On the other hand, for example, a user whose login ID 711 is "USER1@hoge.com" has already set a device password. Therefore, "HC-001" that is the device ID of the home controller 100 owned by the user is saved as the device ID 731 and "hoge123" that is a device password set by the user is saved as the device password 732 of the device association information 703.

Figure 8:
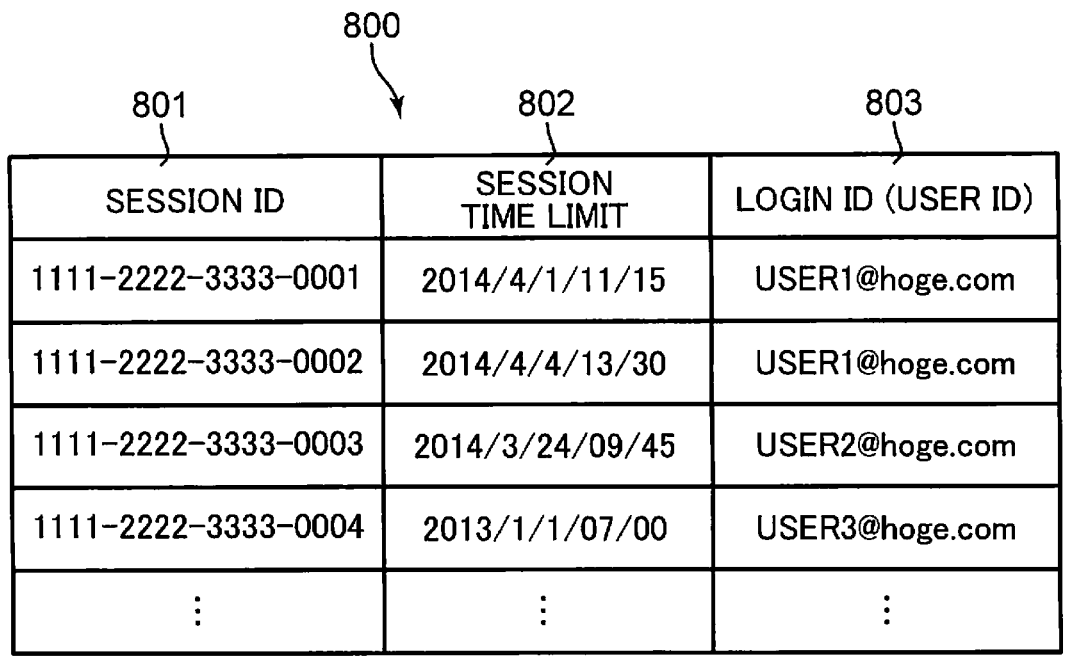
FIG. 8 is a diagram schematically showing an example of a data structure of session information that is managed by a session manager of a server.

FIG. 8 is a diagram schematically showing an example of a data structure of the session information 800 that is managed by the session manager 317 of the server 300. The session information 800 is information for managing a login state. Each time a login is performed, the session manager 317 generates the session information 800 corresponding to the login. As shown in FIG. 8, the session information 800 includes a session ID 801, a session time limit 802, and a login ID 803.

The session ID 801 is information for identifying each login. The session ID 801 is randomly set upon each login. The session time limit 802 includes a session time limit in units of minutes. The session time limit 802 represents a time limit until login is disabled. The login ID 803 is information for identifying a user who is currently logged in.

FIG. 9 is a diagram schematically showing an example of a data structure of the home controller connection management information 900 that is managed by the connected device manager 311 of the server 300. The home controller connection management information 900 is information for managing a state of connection with the home controller 100 and a target device (an air conditioner, an illumination device, or the like) which is an operation target being connected to the home controller 100. As shown in FIG. 9, the home controller connection management information 900 includes a home controller device ID 901, a home controller connection state 902, a connected device ID 903, a device type 904, and an installation location 905.

The home controller device ID 901 is information for identifying each home controller 100. The home controller device ID 901 is a value that is unique to each home controller 100. The home controller connection state 902 includes information indicating "connected" or "disconnected". The connected device ID 903 is information for identifying each device 200 that is connected to the home controller 100 corresponding to the home controller device ID 901. The device type 904 represents a type of the device 200 which corresponds to the connected device ID 903. The installation location 905 represents a location where the device 200 which corresponds to the connected device ID 903 is installed.

The home controller connection state 902 is normally always set to "connected". The home controller connection state 902 of "disconnected" means that the home controller 100 is not connected to an Internet line. For example, the home controller connection state 902 is "disconnected" when power of the home controller 100 is turned off or when power of a router provided between the home controller 100 and an Internet line is turned off.

As shown in FIG. 9, the home controller connection management information 900 includes information of the home controller connection state 902 and the connected device ID 903 for each home controller 100 (in other words, for each house) and includes information of the device type 904 and the installation location 905 for each connected device ID 903.

FIGS. 10A to 10C are, respectively, diagrams schematically showing an example of a data structure of the device authentication information 1000 that is managed by the device password controller 107 of the home controller 100. The device authentication information 1000 is information for managing setting of a device password at each home controller 100. As shown in FIGS. 10A to 10C, the device authentication information 1000 includes a device ID 1001 of a home controller, a device password 1002, a device password standby state 1003, and a standby time 1004.

The device ID 1001 is information for identifying the home controller 100. The device password 1002 is a personal identification number that is set by the user. If the user has not set a device password, the device password 1002 includes information indicating "unset".

The device password standby state 1003 represents whether or not the home controller 100 is in a device password standby state in which a device password can be set. The device password standby state 1003 of "enabled" represents that the home controller 100 is in the device password standby state. The device password standby state 1003 of "disabled" represents that the home controller 100 is not in the device password standby state.

When the device password standby state 1003 is "enabled", the standby time 1004 includes information of time in units of minutes. In this case, the standby time 1004 represents time that remains in the device password standby state. When the device password standby state 1003 is "disabled", the standby time 1004 includes information indicating "unset".

FIG. 10A shows the device authentication information 1000 of the home controller 100 whose device ID 1001 is "HC-001". The device authentication information 1000 in FIG. 10A represents that the user of the home controller 100 whose device ID 1001 is "HC-001" has already set "hoge123" as the device password 1002. In addition, since the device password standby state 1003 is "disabled", it is shown that the home controller 100 is not in the device password standby state. As a result, the standby time 1004 includes information indicating "unset".

FIG. 10B shows the device authentication information 1000 of the home controller 100 whose device ID 1001 is "HC-002". In FIG. 10B, the device password 1002 is "unset". Therefore, FIG. 10B shows that the user of the home controller 100 whose device ID 1001 is "HC-002" has not yet set a device password. In addition, since the device password standby state 1003 is "enabled", it is shown that the home controller 100 is in the device password standby state. Furthermore, since the standby time 1004 is "10 minutes", it is shown that a remaining time in which a device password can be set is 10 minutes.

FIG. 10C shows the device authentication information 1000 of the home controller 100 whose device ID 1001 is "HC-003". FIG. 10C shows that the user of the home controller 100 whose device ID 1001 is "HC-003" has already set "abcdef" as the device password 1002. In addition, since the device password standby state 1003 is "enabled", it is shown that the home controller 100 is in the device password standby state. Furthermore, since the device password standby state 1003 is set to "enabled" and the standby time 1004 in which a device password can be set is "3 minutes", it is shown that a remaining time in which a new device password can be set is 3 minutes.

When a device password included in a control command that is transmitted from the server 300 matches a device password that is saved as the device password 1002 in the device authentication information 1000, each of the home controllers 100 with the device IDs 1001 shown in FIGS. 10A to 10C recognizes that the control command is a control command intended for itself.

Moreover, when the standby time lapses before a device password is set, a previously set device password may be reused.

FIGS. 11A and 11B are, respectively, diagrams schematically showing an example of a data structure of a control command that is transmitted from the server 300 to the home controller 100. The control commands 1100 in FIGS. 11A and 11B respectively include an item 1110 and a value 1120 corresponding to the item 1110.

The control command 1100 shown in FIG. 11A represents a command for instructing the home controller 100 to set a device password. The control command 1100 shown in FIG. 11A includes a target device ID 1111, a command type 1112, and a device password 1113 as the item 1110.

As the value 1120 corresponding to the target device ID 1111, "HC-001" that identifies the home controller 100 is stored. As the value 1120 corresponding to the command type 1112, "setPassword" that represents setting a device password is stored. As the value 1120 corresponding to the device password 1113, "hoge123" that represents a set device password is stored. Based on the control command 1100 shown in FIG. 11A, the home controller 100 sets a device password.

The control command 1100 shown in FIG. 11B represents a command for instructing the home controller 100 to control the device 200. The control command 1100 shown in FIG. 11B includes the target device ID 1111, the command type 1112, the device password 1113, and a control item 1114 as the item 1110.

As the value 1120 corresponding to the target device ID 1111, "devId-aircon-0001" that identifies the device 200 is stored. As a value 1120 corresponding to the command type 1112, "control" that represents control of the device 200 is stored. As the value 1120 corresponding to the device password 1113, "hoge123" that represents a device password for authenticating the user is stored. As the value 1120 corresponding to the control item 1114, "on" is stored with respect to "power", "28" is stored with respect to "room temperature", and "heater" is stored with respect to "mode".

When the control command 1100 shown in FIG. 11B is transmitted from the server 300, the home controller 100 determines whether or not the device password 1113 included in the control command 1100 matches the device password owned by itself. Subsequently, based on the control command 1100 shown in FIG. 11B, the home controller 100 controls the device 200.

Moreover, in a case where the control command 1100 in FIG. 11B is a command for acquiring a state of the device 200, for example, "getStatus" representing acquisition of a status of the device 200 may be stored as the value 1120 corresponding to the command type 1112.

(Display Screen of Home Controller)

FIGS. 12A to 12D are, respectively, diagrams showing an example of a display screen of the display 101 of the home controller 100.

FIG. 12A shows a service setting screen 1201. The service setting screen 1201 is a screen for performing initial setting when receiving a service provided by the device management system according to the present embodiment. The service setting screen 1201 includes a "device password setting" button 501.

FIG. 12B shows a guidance screen 1202. The guidance screen 1202 is a screen that guides the user to set a device password. The guidance screen 1202 includes a message for guiding setting of a device password and a "next" button 511.

FIG. 12C shows a standby screen 1203. The standby screen 1203 is a screen that is displayed while an operation for setting a device password is being performed. The standby screen 1203 includes a status displaying section 521, a two-dimensional code 522, a URL 523 of the server 300, a device ID 524 of the home controller 100, and a "service setting" button 525.

The status displaying section 521 represents a current setting status of the home controller 100. The status displaying section 521 includes an "interrupt setting" button 526. In FIG. 12C, "on" is displayed as an out-of-house remote connection setting. As a result, it is shown that the home controller 100 is capable of communicating with the server 300. In addition, "standing by for change (10 minutes remaining)" is displayed with respect to a device password. Accordingly, it is shown that the home controller 100 is standing by for a device password to be input and that the remaining time is 10 minutes (for example, the standby time 1004 shown in FIG. 10B).

The two-dimensional code 522 includes access information in which a device ID of the home controller 100 has been added to an URL of the server 300. When the user reads the two-dimensional code 522 using the mobile terminal 400 and accesses the server 300, the user can set a device password using the mobile terminal 400 as described later.

Moreover, instead of reading the two-dimensional code 522 using the mobile terminal 400, information in which the device ID 524 is added to the URL 523 of the server 300 may be manually input to the mobile terminal 400 to access the server 300. Alternatively, a barcode (one-dimensional code) may be used instead of a two-dimensional code.

FIG. 12D shows a setting completion screen 1204. The setting completion screen 1204 is a screen that represents completion of setting of a device password. The status displaying section 521 of the setting completion screen 1204 displays that a device password is "already set". Accordingly, it is shown that a device password has been set. When notified by the server 300 that a device password has been set, the display controller 102 displays the setting completion screen 1204 on the display 101.

FIG. 12E is a diagram schematically showing a transition of the display screens shown in FIGS. 12A to 12D. A top left diagram in FIG. 12E represents the service setting screen 1201 shown in FIG. 12A. A top right diagram in FIG. 12E represents the guidance screen 1202 shown in FIG. 12B. A bottom left diagram in FIG. 12E represents the standby screen 1203 shown in FIG. 12C. A bottom right diagram in FIG. 12E represents the setting completion screen 1204 shown in FIG. 12D.

When the user touches the "device password setting" button 501 with a contact object 502 (for example, a finger of the user) on the service setting screen 1201 that is shown in the top left diagram in FIG. 12E, the touch panel controller 103 detects the contact. As a result, the display controller 102 displays the guidance screen 1202 on the display 101 as shown in the top right diagram in FIG. 12E.

When the user touches the "next" button 511 with the contact object 502 on the guidance screen 1202 that is shown in the top right diagram in FIG. 12E, the touch panel controller 103 detects the contact. As a result, the display controller 102 displays the standby screen 1203 that is shown in the bottom left diagram in FIG. 12E on the display 101. In addition, the device password controller 107 causes the home controller 100 to make a transition to a device password standby state and starts counting standby time.

When a device password setting request is transmitted together with a device password from the server 300, the device password controller 107 stores the device password in the device authentication information 1000 (for example, FIG. 10A). As a result, the display controller 102 switches the display screen that is displayed on the display 101 from the standby screen 1203 that is shown in the bottom left diagram in FIG. 12E to the setting completion screen 1204 that is shown in the bottom right diagram in FIG. 12E.

Moreover, when the user touches the "interrupt setting" button 526 with the contact object 502 on the standby screen 1203 that is shown in the bottom left diagram in FIG. 12E, the touch panel controller 103 detects the contact. As a result, the display controller 102 displays the guidance screen 1202 that is shown in the top right diagram in FIG. 12E on the display 101. In addition, the device password controller 107 cancels the device password standby state of the home controller 100.

Furthermore, when the user touches the "service setting" button 525 with the contact object 502 on the standby screen 1203 that is shown in the bottom left diagram in FIG. 12E, the touch panel controller 103 detects the contact. As a result, the display controller 102 displays the service setting screen 1201 that is shown in the top left diagram in FIG. 12E on the display 101.

(Display Screen of Mobile Terminal)

FIGS. 13A to 13E are, respectively, diagrams showing an example of a display screen of the display 411 of the mobile terminal 400.

FIG. 13A shows a login screen 1301 (an example of the setting screen). The login screen 1301 is a screen that is used by the user to log into a service provided by the device management system according to the present embodiment. The login screen 1301 includes a login ID input field 531, a login password input field 532, a "login" button 533, and a check box 534. The login ID input field 531 is a field for inputting a login ID. The login password input field 532 is a field for inputting a login password. The "login" button 533 is a button for instructing login.

When the user instructs login by touching the "login" button 533 with the contact object 502 in a state where the check box 534 has been checked by touching the check box 534 with the contact object 502, the login authenticator 315 of the server 300 maintains a login state for a certain period (for example, two weeks). As a result, a login process is no longer required every time.

Figure 13B:
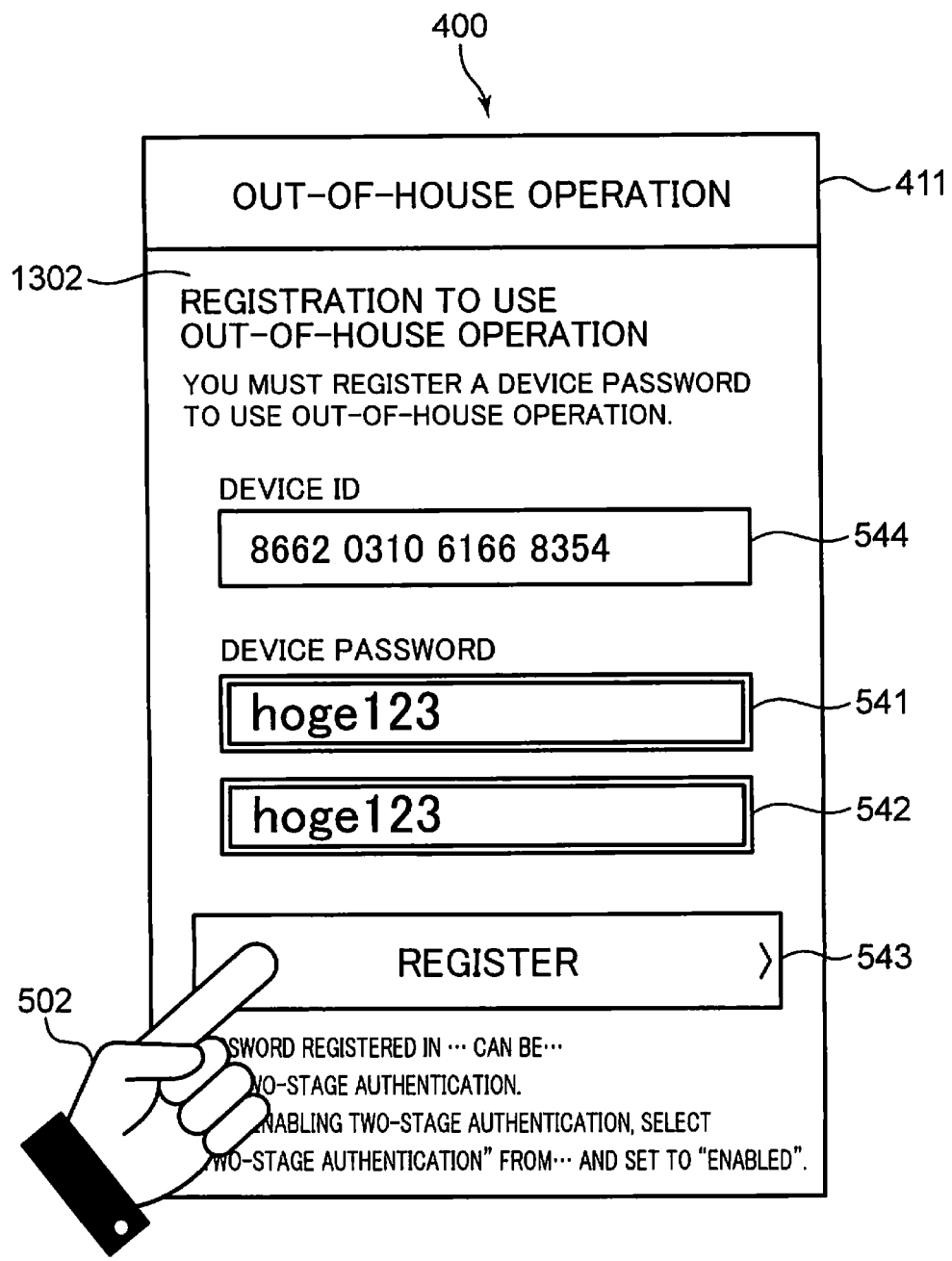
FIG. 13B is a diagram schematically showing an example of a display screen of a mobile terminal in a login process.

FIG. 13B shows a device password registration screen 1302 (an example of the setting screen). The device password registration screen 1302 is a screen that is used by the user to set a device password. The device password registration screen 1302 includes a device ID input field 544, device password input fields 541 and 542, and a "register" button 543. The device ID input field 544 is a field for inputting a device ID of the home controller 100. In this case, the server 300 extracts a device ID from access information including a device ID which has been transmitted to the server 300 upon acquiring the login screen 1301 that is shown in FIG. 13A, in which case the extracted device ID is automatically input to the device ID input field 544. While this configuration is adopted in order to reduce user operations, it is obvious that the user can manually input the device ID instead. The device password input fields 541 and 542 are field for inputting a device password. The "register" button 543 is a button for instructing registration of a device ID and a device password.

Figure 13C:
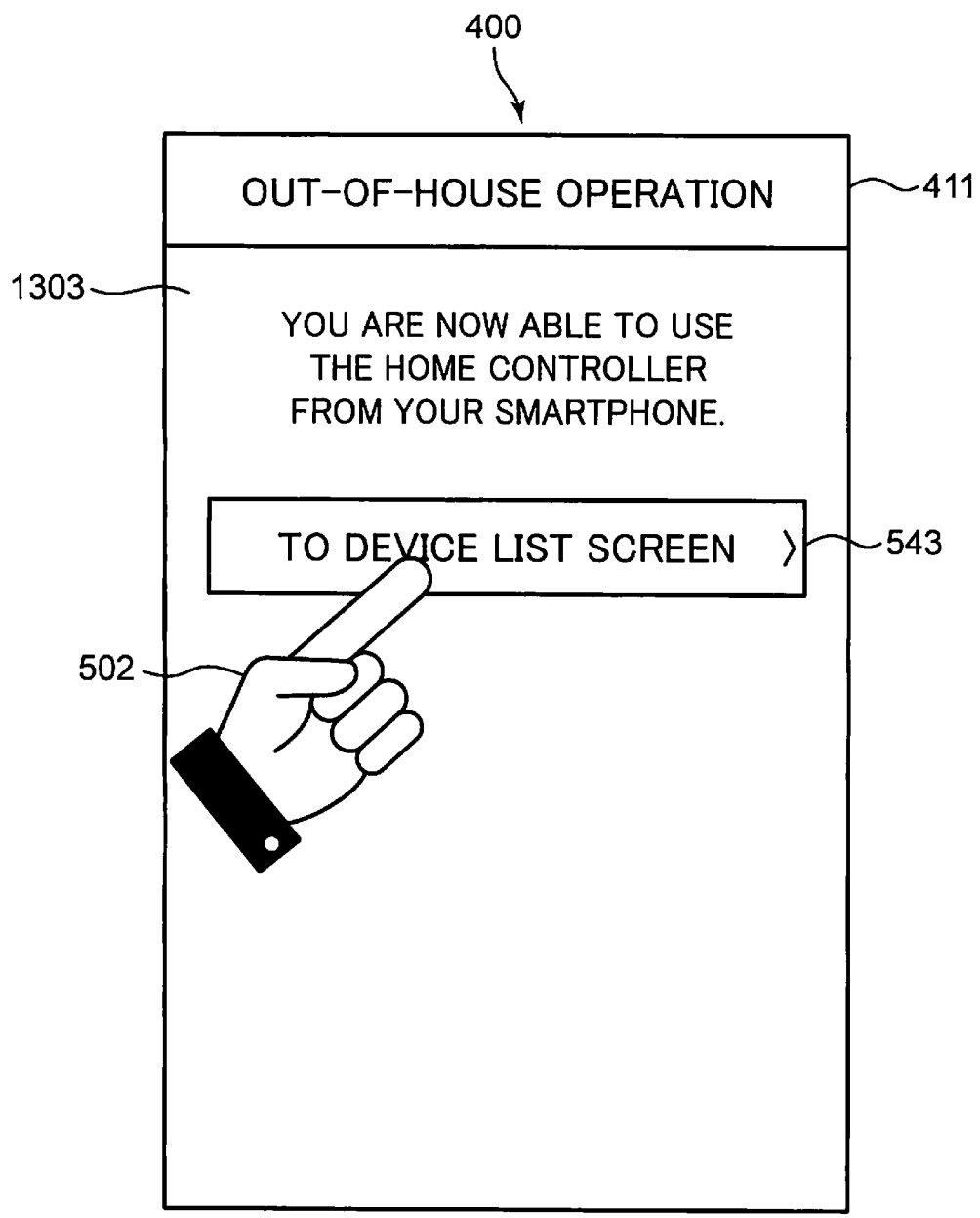
FIG. 13C is a diagram schematically showing an example of a display screen of a mobile terminal in a login process.

FIG. 13C shows a registration completion screen 1303. The registration completion screen 1303 includes a message notifying that the home controller 400 has become usable. The message represents that setting of a device password has been completed. The registration completion screen 1303 further includes a "to device list screen" button 543. The "to device list screen" button 543 is a button for instructing display of a device list screen.

Figure 13D:
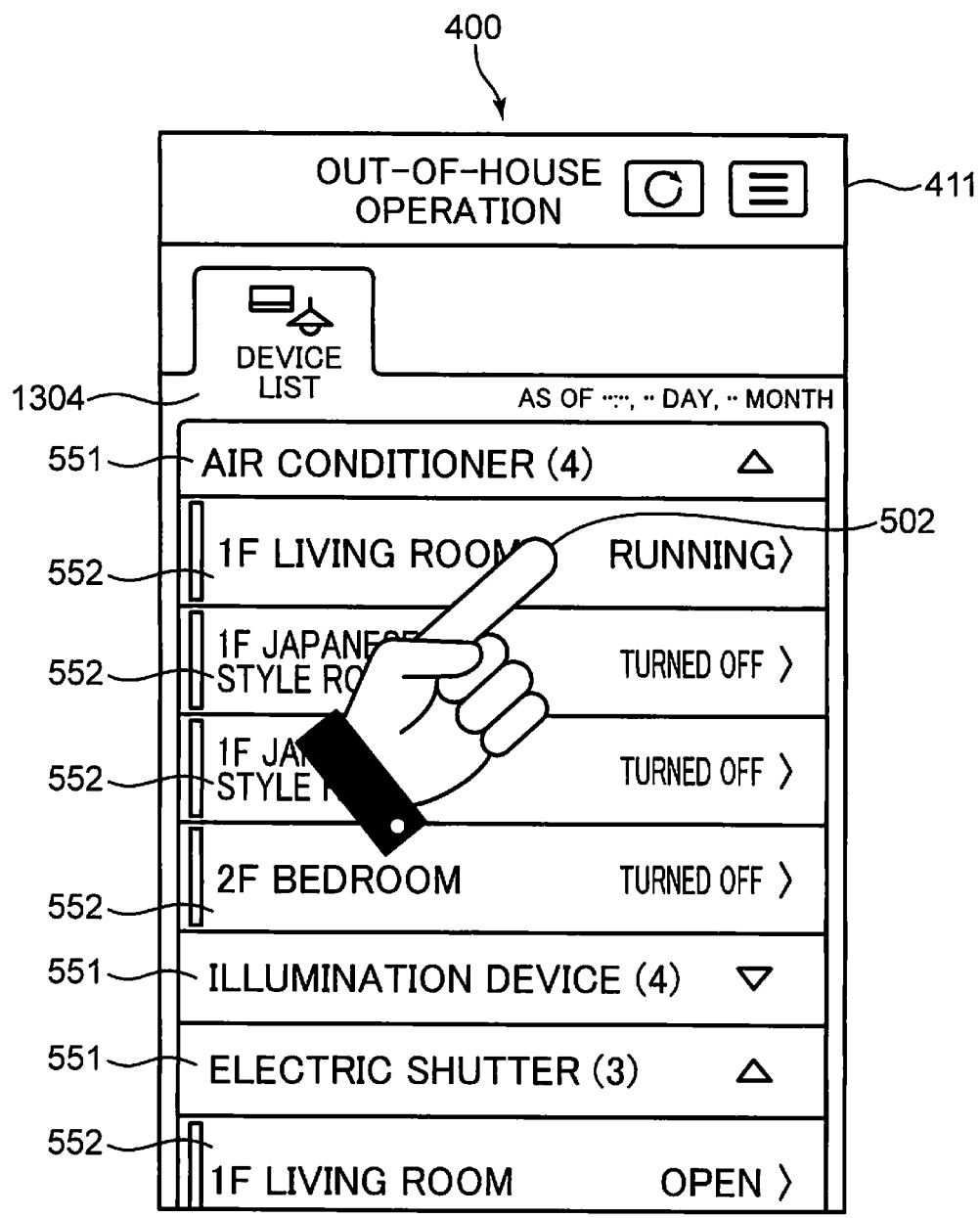
FIG. 13D is a diagram schematically showing an example of a display screen of a mobile terminal in a login process.

FIG. 13D shows a device list screen 1304. The device list screen 1304 shows devices 200 connected to the home controller 100. The user can select a device to be an operation target from the device list screen 1304. The device list screen 1304 includes a device type displaying section 551 and an individual device displaying section 552.

The device type displaying section 551 includes a device type and the number of devices. The number of devices is expressed by a numeral in brackets. The device type displaying sections 551 in FIG. 13D show that four air conditioners, four illumination devices, and three electric shutter apparatuses are respectively installed.

The individual device displaying section 552 includes an installation location of a device and a status of the device. The individual device displaying sections 552 in FIG. 13D show that an air conditioner in a first floor living room is running, and two air conditioners in a Japanese style room on the first floor and an air conditioner in a second floor bedroom are turned off. It is also shown that an electric shutter apparatus in the first floor living room is open. In addition, the individual device displaying sections 552 of the illumination devices are hidden in FIG. 13D.

When the user selects the device type displaying section 551 with the contact object 502 in a state where the device list screen 1304 is displayed, the input controller 413 detects the selection. As a result, if the individual device displaying section 552 of the selected device type displaying section 551 is not displayed, the display controller 412 displays the individual device displaying section 552. On the other hand, if the individual device displaying section 552 of the selected device type displaying section 551 is displayed, the display controller 412 hides the individual device displaying section 552.

In addition, when the user performs a swipe operation with the contact object 502 in a state where the device list screen 1304 is displayed, the input controller 413 detects the swipe operation. As a result, the display controller 412 scrolls the device type displaying sections 551 and the individual device displaying sections 552 on the device list screen 1304 in a direction of the swipe operation.

Figure 13E:
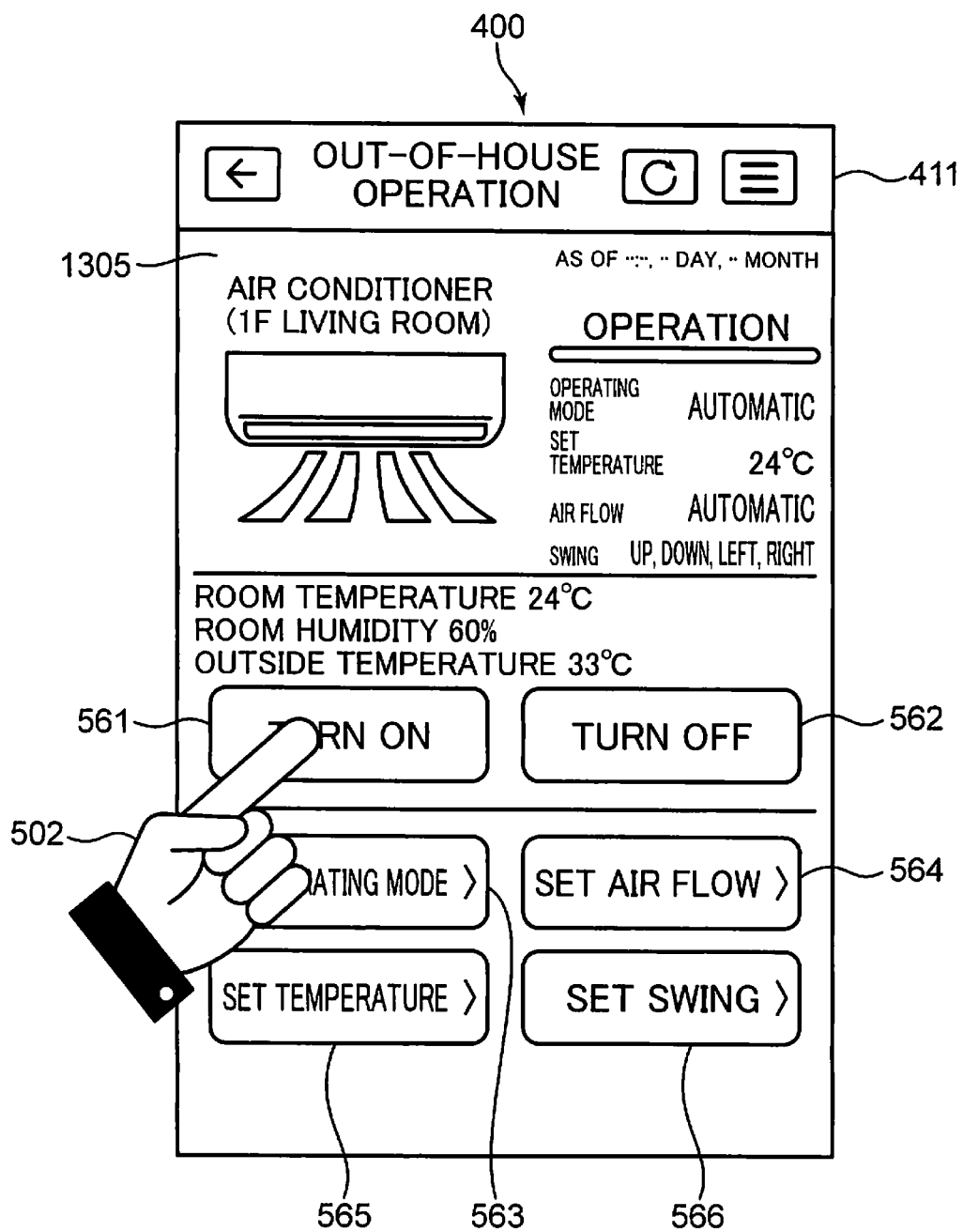
FIG. 13E is a diagram schematically showing an example of a display screen of a mobile terminal in a login process.

FIG. 13E shows a device operation screen 1305. The device operation screen 1305 is a screen that is used by the user to operate the device 200. FIG. 13E shows an example of the device operation screen 1305 for operating the air conditioner in the first floor living room. A schematic diagram of the device (the air conditioner) and an operational state of the device (the air conditioner) are shown in an upper half of the device operation screen 1305. Operation buttons 561 to 566 are provided in a lower half of the device operation screen 1305.

The operation button 561 is a button for turning on power of the air conditioner. The operation button 562 is a button for turning off power of the air conditioner. The operation button 563 is a button for switching operating modes. The operation button 564 is a button for setting an air flow of the air conditioner. The operation button 565 is a button for setting temperature of the air conditioner. The operation button 566 is a button for setting an air direction of the air conditioner. By touching each of the operation buttons 561 to 566 with the contact object 502, the user can perform operations of the air conditioner that is installed in the first floor living room in a preferable manner.

FIG. 13F is a diagram schematically showing a transition of the display screens shown in FIGS. 13A to 13E. A top left diagram in FIG. 13F represents the standby screen 1203 shown in FIG. 12C. A top right diagram in FIG. 13F represents the login screen 1301 shown in FIG. 13A. A bottom left diagram in FIG. 13F represents the device password registration screen 1302 shown in FIG. 13B. A bottom second-from-left diagram in FIG. 13F represents the registration completion screen 1303 shown in FIG. 13C. A bottom third-from-left diagram in FIG. 13F represents the device list screen 1304 shown in FIG. 13D. A bottom right diagram in FIG. 13F represents the device operation screen 1305 shown in FIG. 13E.

The user accesses the URL of the server 300 by reading the two-dimensional code 522 with the mobile terminal 400 on the standby screen 1203 of the home controller 100 that is shown in the top left diagram in FIG. 13F. As a result, the display controller 412 of the mobile terminal 400 displays the login screen 1301 that is shown in the top right diagram in FIG. 13F which is transmitted from the server 300 on the display 411.

When the user inputs a login ID in the login ID input field 531, inputs a login password in the login password input field 532, and touches the "login" button 533 with the contact object 502 on the login screen 1301 that is shown in the top right diagram in FIG. 13F, the inputs and the contact are detected by the input controller 413. Subsequently, the communication controller 415 transmits the input contents of the user to the server 300.

The communication controller 415 receives a device password registration screen that is transmitted by the server 300 in response to the transmission of the input contents of the user to the server 300. The display controller 412 displays the device password registration screen 1302 that is received by the communication controller 415 on the display 411 as shown in the bottom left diagram in FIG. 13F.

When the user inputs a device password in the device password input fields 541 and 542 and touches the "register" button 543 with the contact object 502 on the device password registration screen 1302 that is shown in the bottom left diagram in FIG. 13F, the input and the contact are detected by the input controller 413. Subsequently, the communication controller 415 transmits the device ID that is set in the device ID input field 544 and the device password input by the user to the device password input fields 541 and 542 to the server 300.

The communication controller 415 receives a registration completion screen that is transmitted by the server 300 in response to the transmission of the device password input by the user to the server 300. The display controller 412 displays the registration completion screen 1303 that is received by the communication controller 415 on the display 411 as shown in the bottom second-from-left diagram in FIG. 13F.

When the user touches the "to device list screen" button 543 with the contact object 502 on the registration completion screen 1303 that is shown in the bottom second-from-left diagram in FIG. 13F, the contact is detected by the input controller 413. Subsequently, the communication controller 415 transmits information indicating that the "to device list screen" button 543 has been selected to the server 300.

The communication controller 415 receives a device list screen that is transmitted by the server 300 in response to the transmission of information indicating that the "to device list screen" button 543 has been selected to the server 300. The display controller 412 displays the device list screen 1304 that is received by the communication controller 415 on the display 411 as shown in the bottom third-from-left diagram in FIG. 13F.

When the user touches with the contact object 502, for example, "1st floor living room" in the individual device displaying section 552 of the air conditioner in the device type displaying section 551 on the device list screen 1304 that is shown in the bottom third-from-left diagram in FIG. 13F, the contact is detected by the input controller 413. Subsequently, the communication controller 415 transmits contents of the contact to the server 300.

The communication controller 415 receives a device operation screen that is transmitted by the server 300 in response to the transmission of the device selected by the user to the server 300. The display controller 412 displays the device operation screen 1305 that is received by the communication controller 415 on the display 411 as shown in the bottom right diagram in FIG. 13F.

Figure 14A:
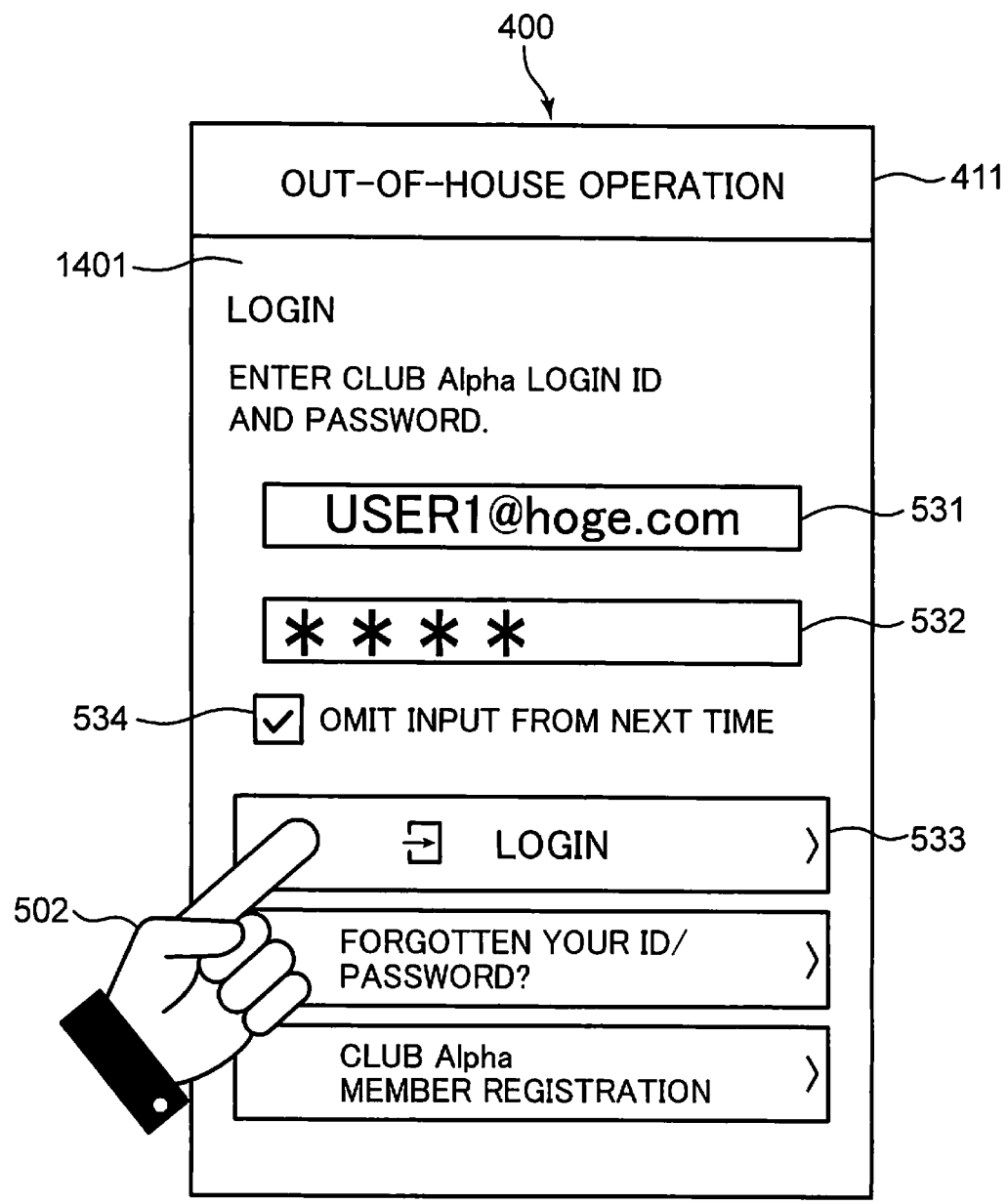
FIG. 14A is a diagram schematically showing an example of a display screen of a mobile terminal in second stage authentication.
Figure 14B:
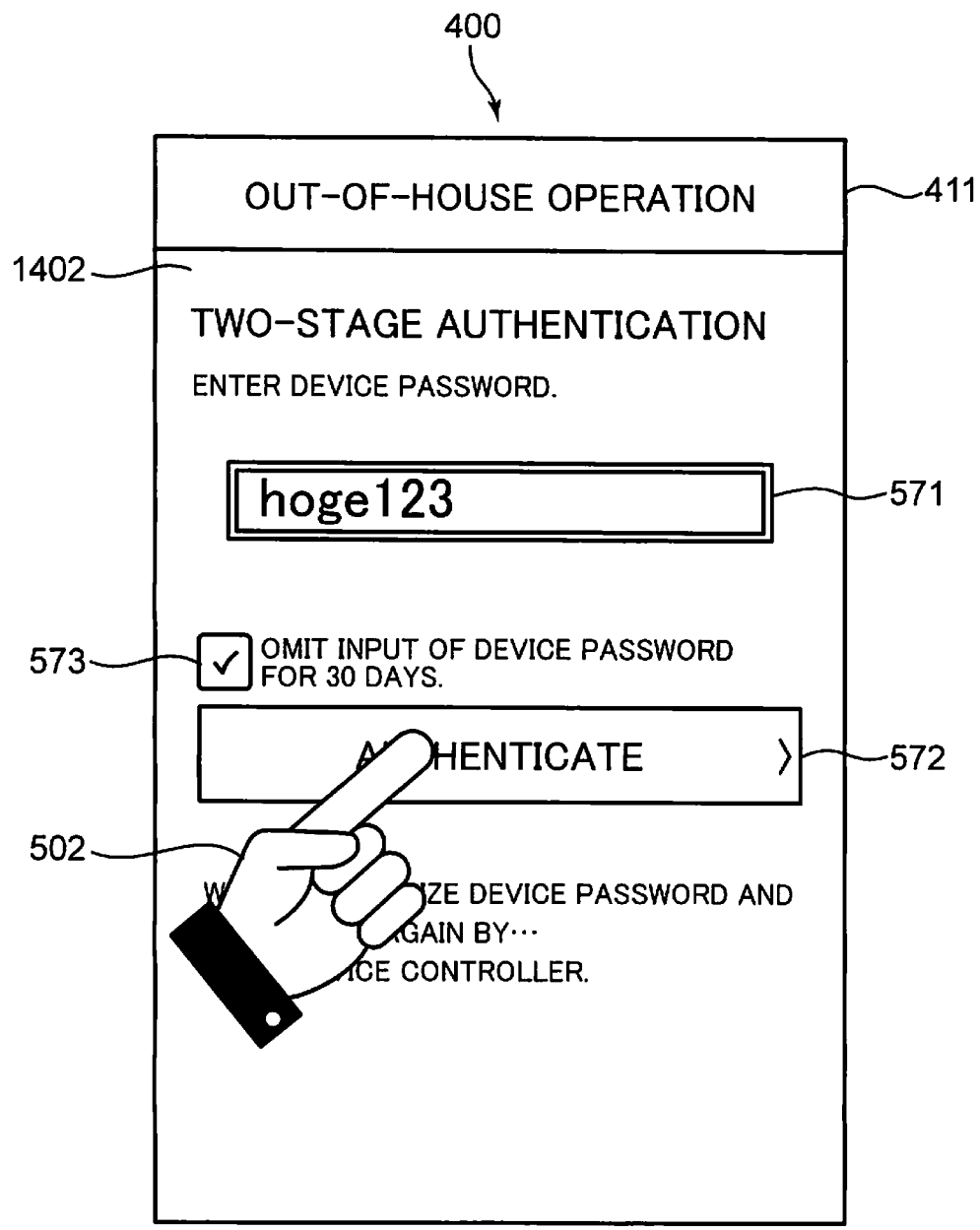
FIG. 14B is a diagram schematically showing an example of a display screen of a mobile terminal in second stage authentication.

FIGS. 14A and 14B are, respectively, diagrams showing an example of a display screen of the display 411 of the mobile terminal 400 when a user having finished setting a device password is authenticated in order to operate a device.

FIG. 14A shows a login screen 1401. The login screen 1401 is a screen that is used by the user to receive authentication to log into a service provided by the device management system according to the present embodiment in order to operate a device. The login screen 1401 is configured exactly the same and is operated in exactly the same manner as the login screen 1301 that is shown in FIG. 13A.

FIG. 14B shows a second stage authentication screen 1402 (an example of the authentication screen). The second stage authentication screen 1402 is a screen that is used by the user who has received authentication for login (first stage authentication) on the login screen 1401 in order to receive second stage authentication. The second stage authentication screen 1402 includes a device password input field 571, an "authenticate" button 572, and a check box 573.

The device password input field 571 is a field for inputting a device password. The "authenticate" button 572 is a button for instructing second stage authentication.

When the user instructs second stage authentication by touching the "authenticate" button 572 with the contact object 502 in a state where the check box 573 has been checked by touching the check box 573 with the contact object 502, the second stage authenticator 316 of the server 300 does not perform second stage authentication for a certain period (for example, 30 days). Accordingly, the hassle of having to perform second stage authentication every time can be avoided.

On the second stage authentication screen 1402, input of a device password (an example of the input password) is requested. As described earlier with reference to FIG. 7, the device password is a password that is used to associate the login ID 711 and the device ID 731 of the home controller 100 with each other. The device password is also used in the second stage authentication that is performed after the login authentication. As a result, by performing the second stage authentication, password management can be prevented from becoming complicated due to the increase in the number of types of passwords while suppressing a decline in security level.

In addition, on the second stage authentication screen 1402, only input of a device password is requested and input of a device ID of the home controller 100 is not requested. Therefore, the risk of leakage of both the device password and the device ID of the home controller 100 at the same time can be reduced.

Figure 14C:
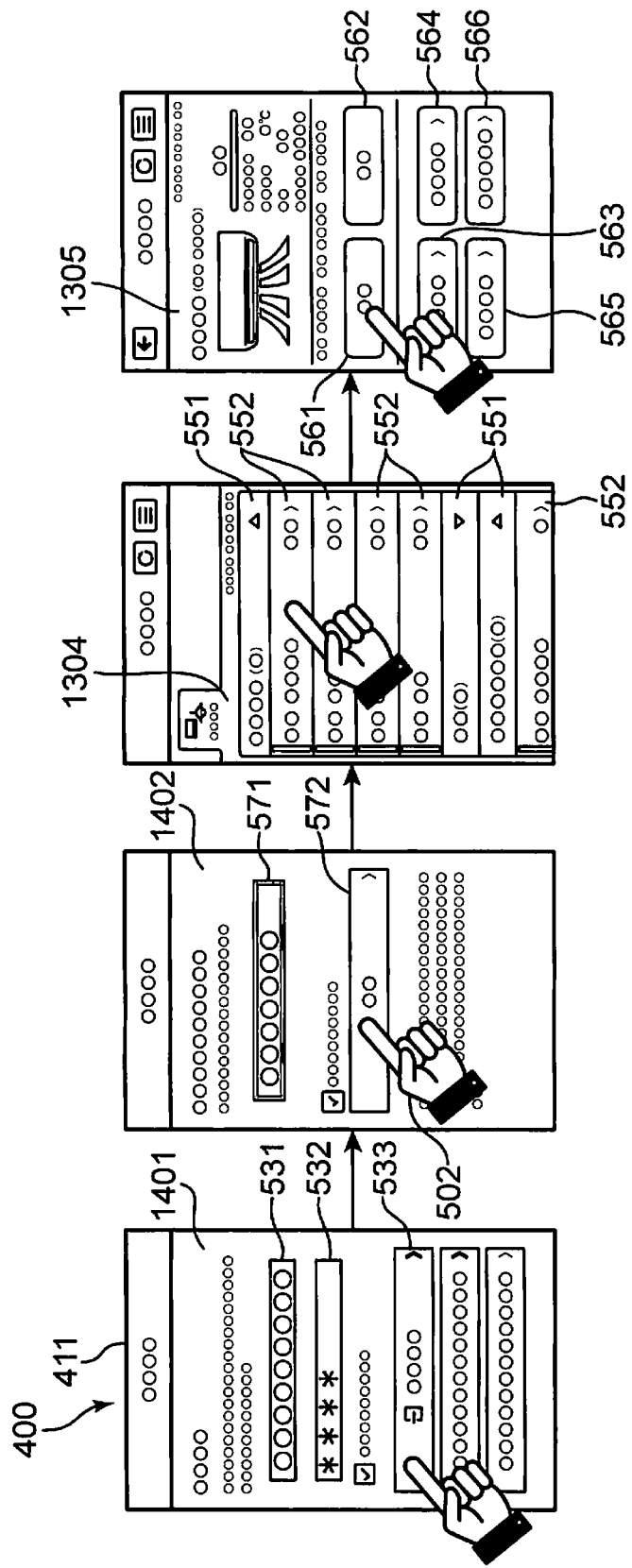
FIG. 14C is a diagram schematically showing a transition example of a display screen of a mobile terminal including second stage authentication.

FIG. 14C is a diagram schematically showing a transition example of display screens of the mobile terminal 400 including second stage authentication. A left diagram in FIG. 14C represents the login screen 1401 shown in FIG. 14A. A second-from-left diagram in FIG. 14C represents the second stage authentication screen 1402 shown in FIG. 14B. A third-from-left diagram in FIG. 14C represents the device list screen 1304 shown in FIG. 13D. A right diagram in FIG. 14C represents the device operation screen 1305 shown in FIG. 13E.

When the user inputs a login ID in the login ID input field 531, inputs a login password in the login password input field 532, and touches the "login" button 533 with the contact object 502 on the login screen 1401 that is shown in the left diagram in FIG. 14C, the inputs and the contact are detected by the input controller 413. Subsequently, the communication controller 415 transmits input contents of the user to the server 300.

The communication controller 415 receives a second stage authentication screen that is transmitted by the server 300 in response to the transmission of the input contents of the user to the server 300. The display controller 412 displays the second stage authentication screen 1402 that is received by the communication controller 415 on the display 411 as shown in the second-from-left diagram in FIG. 14C.

When the user inputs a device password in the device password input field 571 and touches the "authenticate" button 572 with the contact object 502 on the second stage authentication screen 1402 that is shown in the second-from-left diagram in FIG. 14C, the input contents and the contact are detected by the input controller 413. Subsequently, the communication controller 415 transmits the device password input by the user to the server 300.

The communication controller 415 receives a device list screen that is transmitted by the server 300 in response to the transmission of the device password input by the user to the server 300. The display controller 412 displays the device list screen 1304 that is received by the communication controller 415 on the display 411 as shown in the third-from-left diagram in FIG. 14C.

A transition from the device list screen 1304 that is shown in the third-from-left diagram in FIG. 14C to the device operation screen 1305 that is shown in the right diagram in FIG. 14C is the same as the transition from the device list screen 1304 that is shown in the bottom third-from-left diagram in FIG. 13F to the device operation screen 1305 that is shown in the bottom right diagram in FIG. 13F.

FIGS. 15A to 15D are, respectively, diagrams that schematically show an example of an error screen that is displayed on the display 411 of the mobile terminal 400.

Figure 15A:
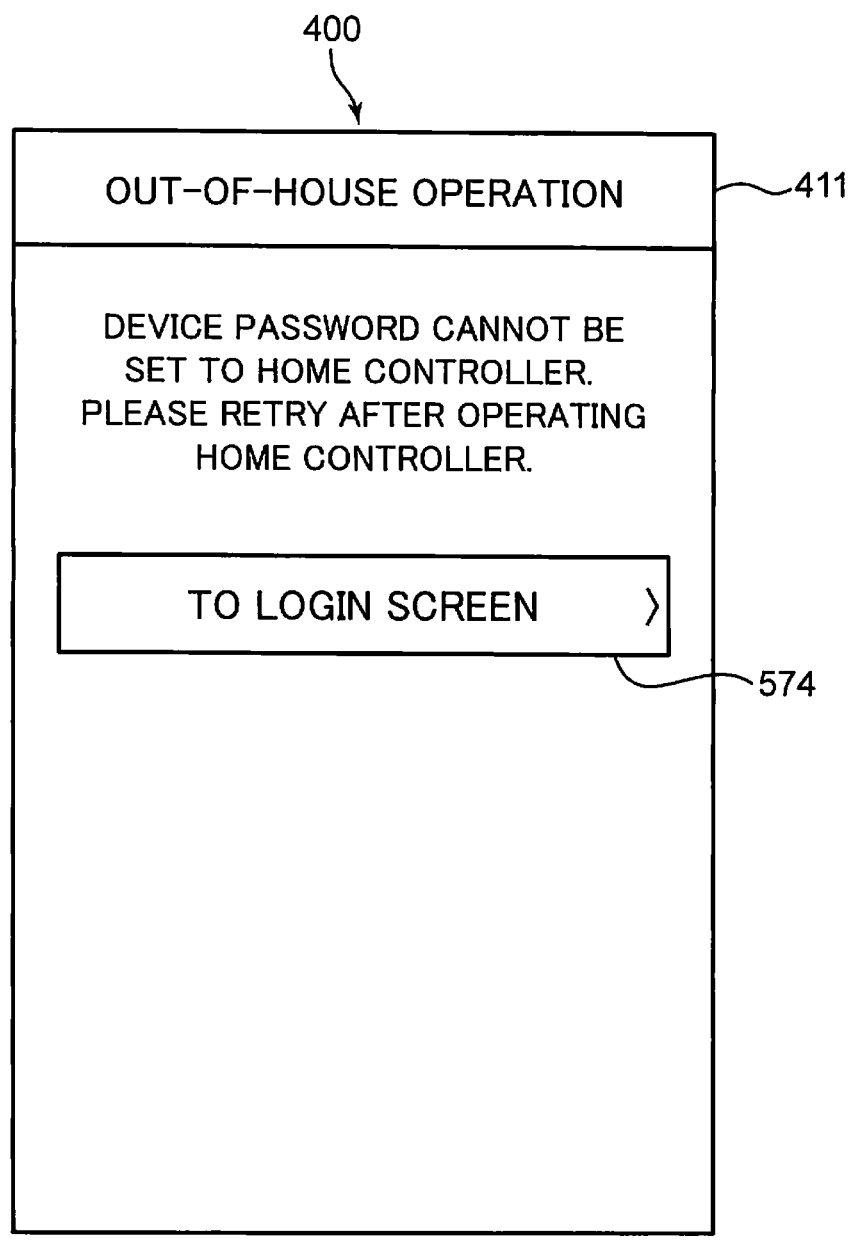
FIG. 15A is a diagram schematically showing an example of an error screen that is displayed on a mobile terminal.
Figure 15B:
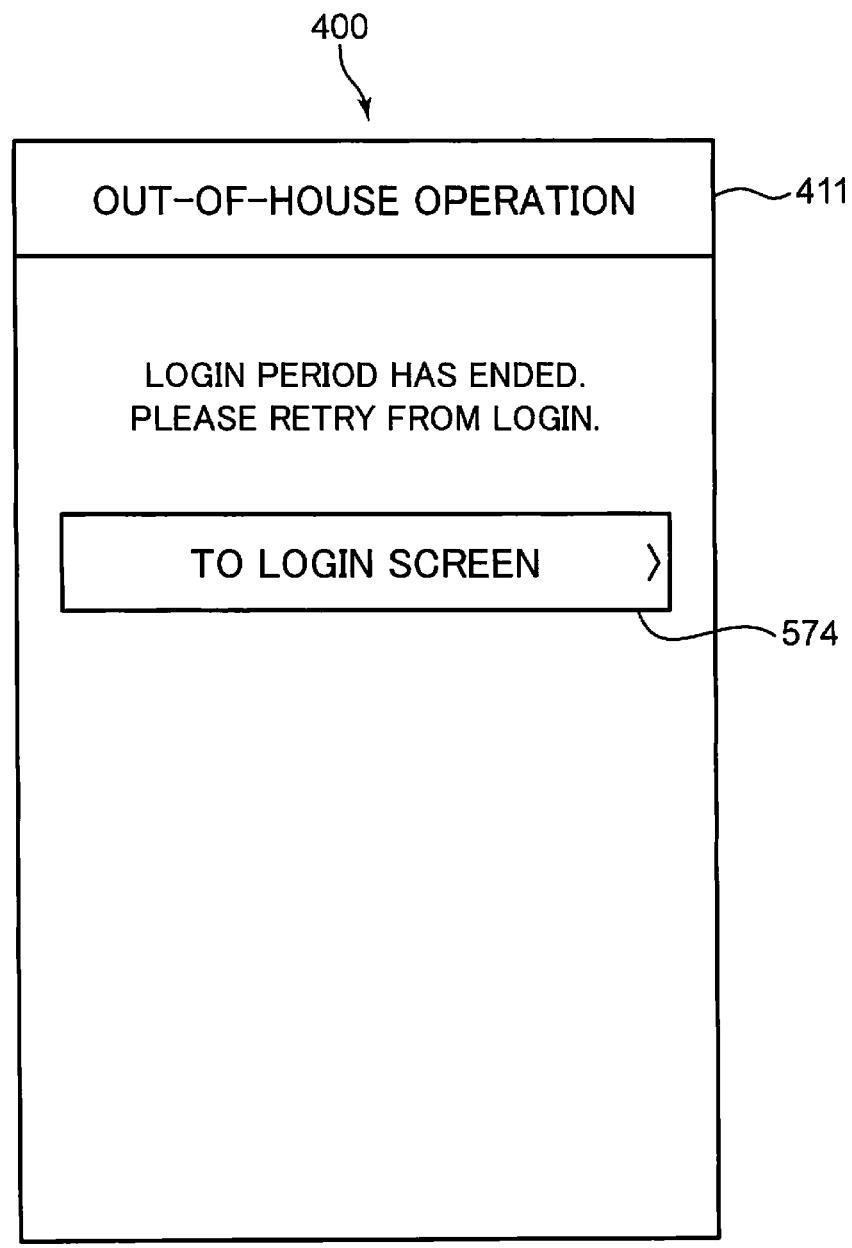
FIG. 15B is a diagram schematically showing an example of an error screen that is displayed on a mobile terminal.

FIG. 15A shows an error screen that is displayed on the display 411 when a setting process of a device password does not succeed because the home controller 100 is not in a device password standby state. FIG. 15B shows an error screen that is displayed on the display 411 when a login period ends in the middle of an operation.

Figure 15C:
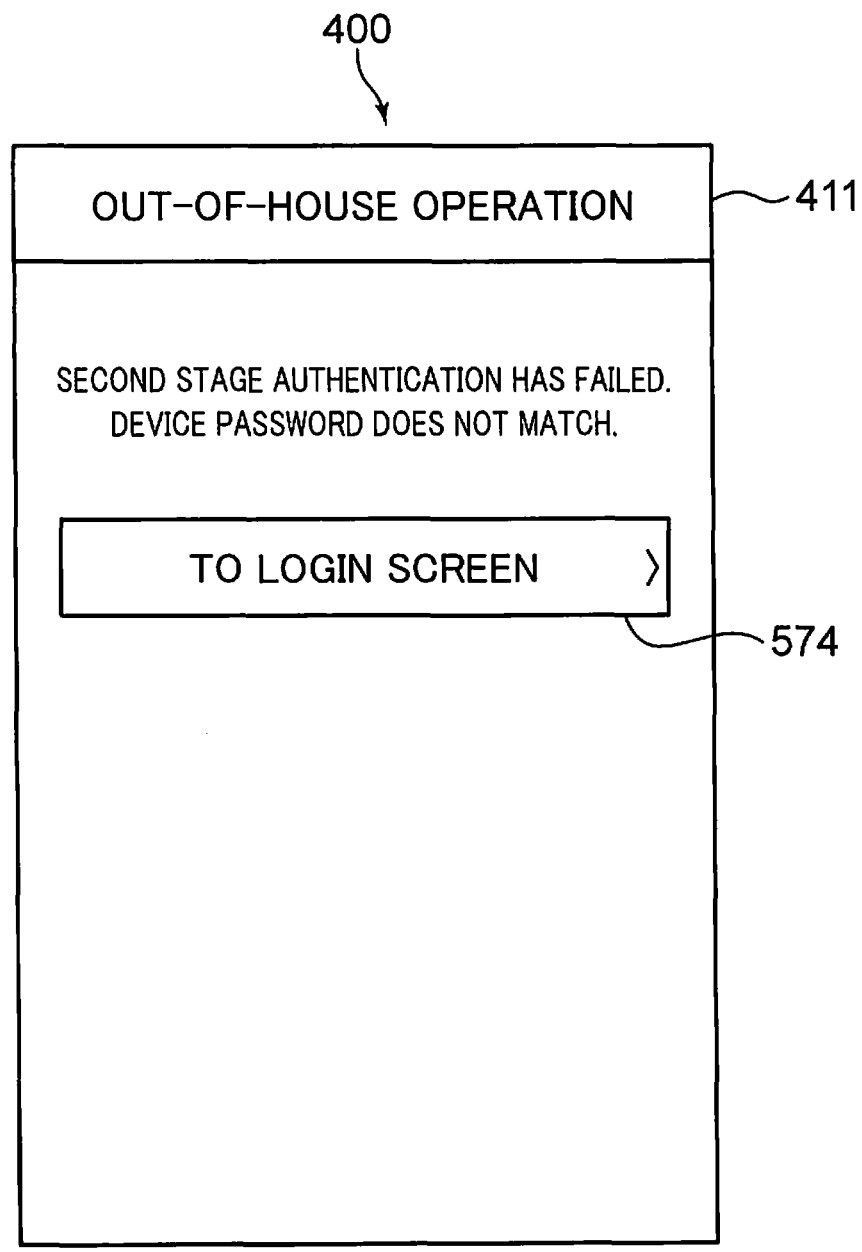
FIG. 15C is a diagram schematically showing an example of an error screen that is displayed on a mobile terminal.

FIG. 15C shows an error screen that is displayed on the display 411 when the device password that is input on the second stage authentication screen 1402 (FIG. 14B) does not match the data stored in the device password 732 in the authentication setting information 700 (FIG. 7).

Figure 15D:
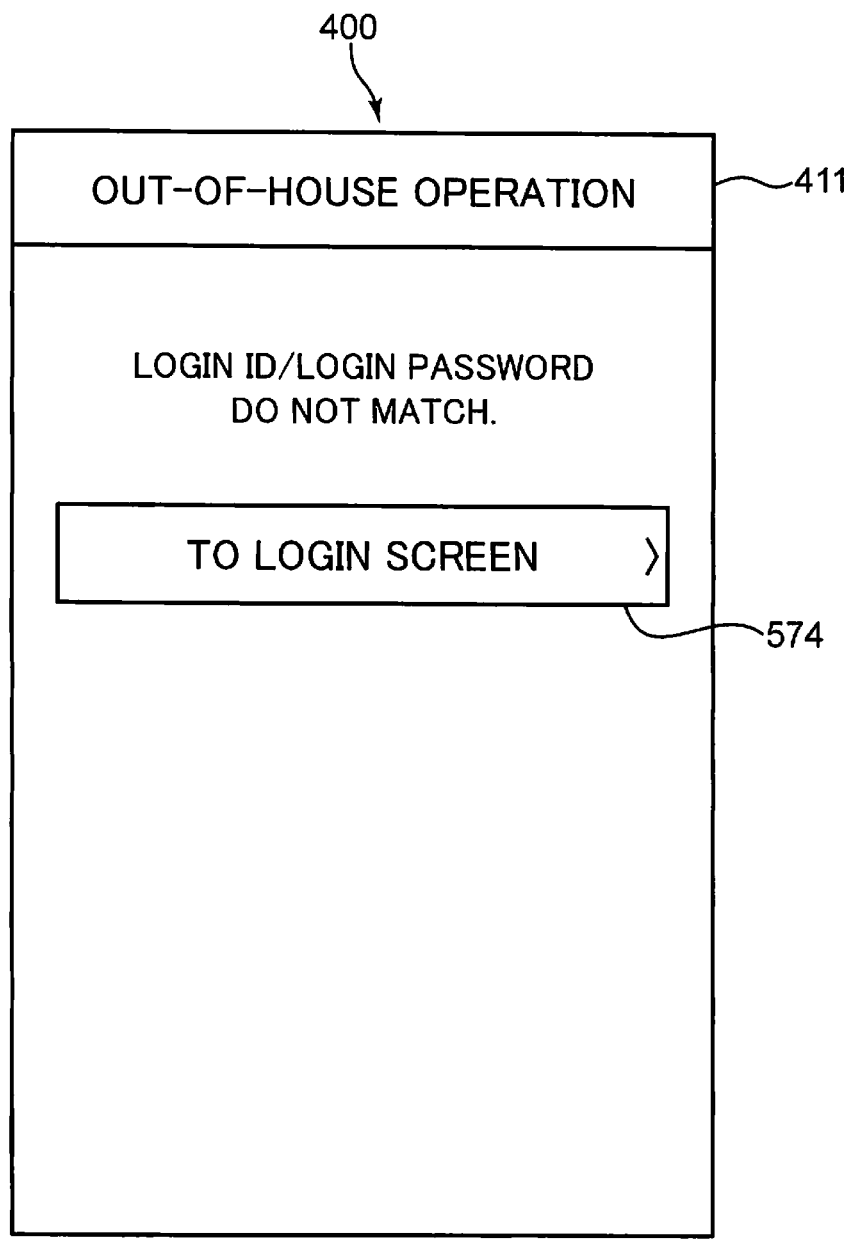
FIG. 15D is a diagram schematically showing an example of an error screen that is displayed on a mobile terminal.

FIG. 15D shows an error screen that is displayed on the display 411 when the login ID and the login password that are input on the login screen 1401 (FIG. 14A) do not match the data stored in the login ID 711 and the login password 712 in the authentication setting information 700 (FIG. 7).

On the error screens shown in FIGS. 15A to 15D, when the user touches a "to login screen" button 574 with the contact object 502, the input controller 413 detects the contact. Subsequently, the communication controller 415 transmits information indicating that the "to login screen" button 574 has been selected by the user to the server 300.

The communication controller 415 receives a login screen that is transmitted by the server 300 in response to the transmission to the server 300. The display controller 412 displays the login screen that is received by the communication controller 415 on the display 411 as shown in FIG. 13A.

Figure 16:
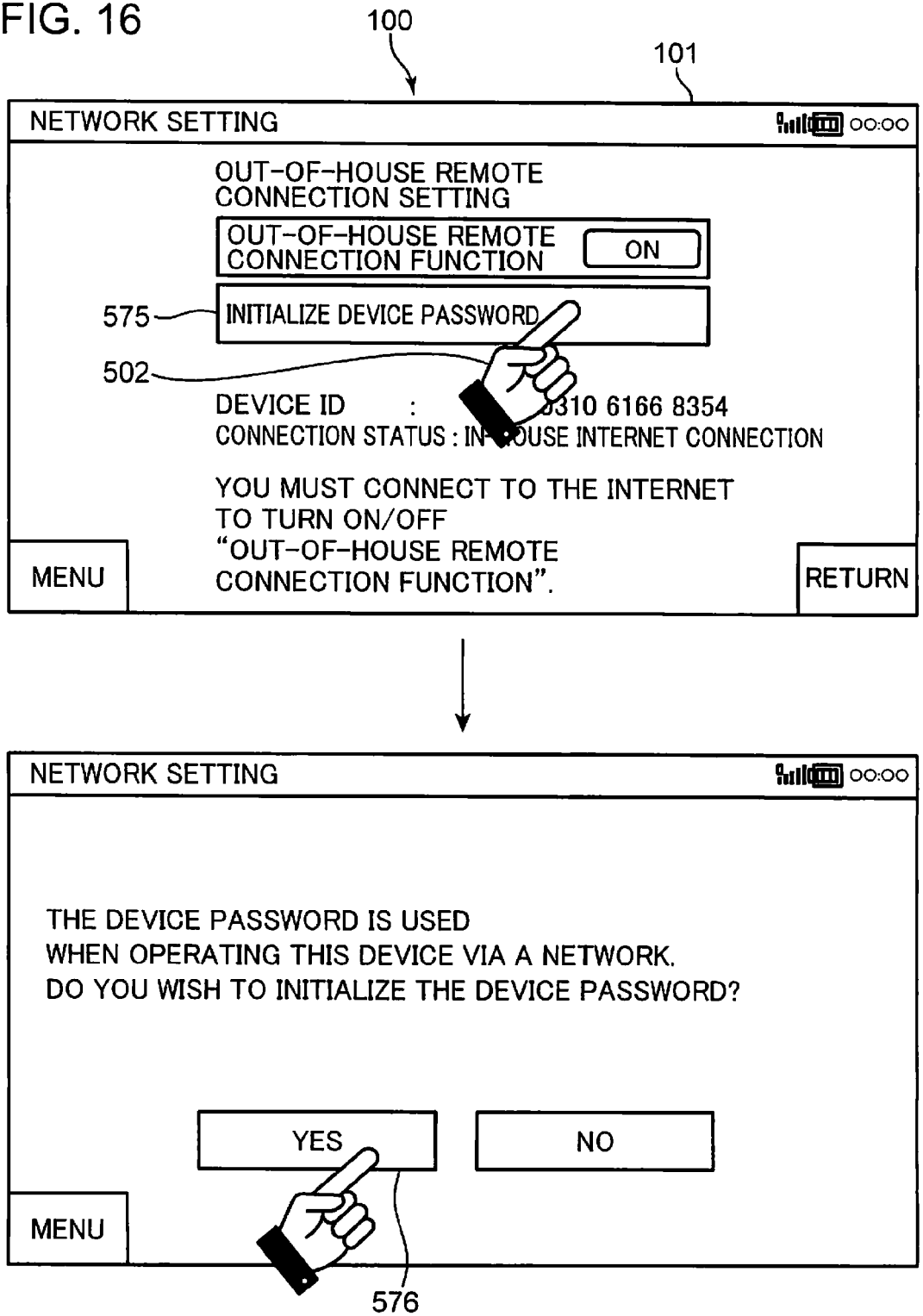
FIG. 16 is a diagram schematically showing a transition example of a display screen upon initialization of a device password in a home controller.

FIG. 16 is a diagram schematically showing a transition example of display screens upon initialization of a device password in the home controller 100.

An upper diagram in FIG. 16 shows a setting screen for initializing a device password. The setting screen shown in the upper diagram in FIG. 16 includes an "initialize device password" button 575. When the user touches the "initialize device password" button 575 with the contact object 502 on the setting screen that is shown in the upper diagram in FIG. 16, the touch panel controller 103 detects the contact. As a result, the display controller 102 displays a confirmation screen to confirm whether or not initialization of a device password is to be executed with the user on the display 101 as shown in a lower diagram in FIG. 16.

The confirmation screen shown in the lower diagram in FIG. 16 includes a "yes" button 576. When the user touches the "yes" button 576 with the contact object 502 on the confirmation screen that is shown in the lower diagram in FIG. 16, the touch panel controller 103 detects the contact. As a result, the device password controller 107 initializes the device password that is already set. Specifically, the device password controller 107 rewrites the item of the device password 1002 in the device authentication information 1000 (for example, FIG. 10A) to "unset".

In addition, upon receiving a request from the device password controller 107, the communication controller 104 transmits an initialization request of the device password to the server 300. Accordingly, the device password that is already set is also initialized at the server 300. Specifically, the authentication setting manager 313 of the server 300 respectively rewrites the items of the device ID 731 and the device password 732 in the authentication setting information 700 (FIG. 7) to "unset". In addition, if the second stage authentication skip setting 722 in the authentication setting information 700 is set to "enabled", the authentication setting manager 313 rewrites the second stage authentication skip setting 722 to "disabled".

(Flow of Processes)

Figure 17:
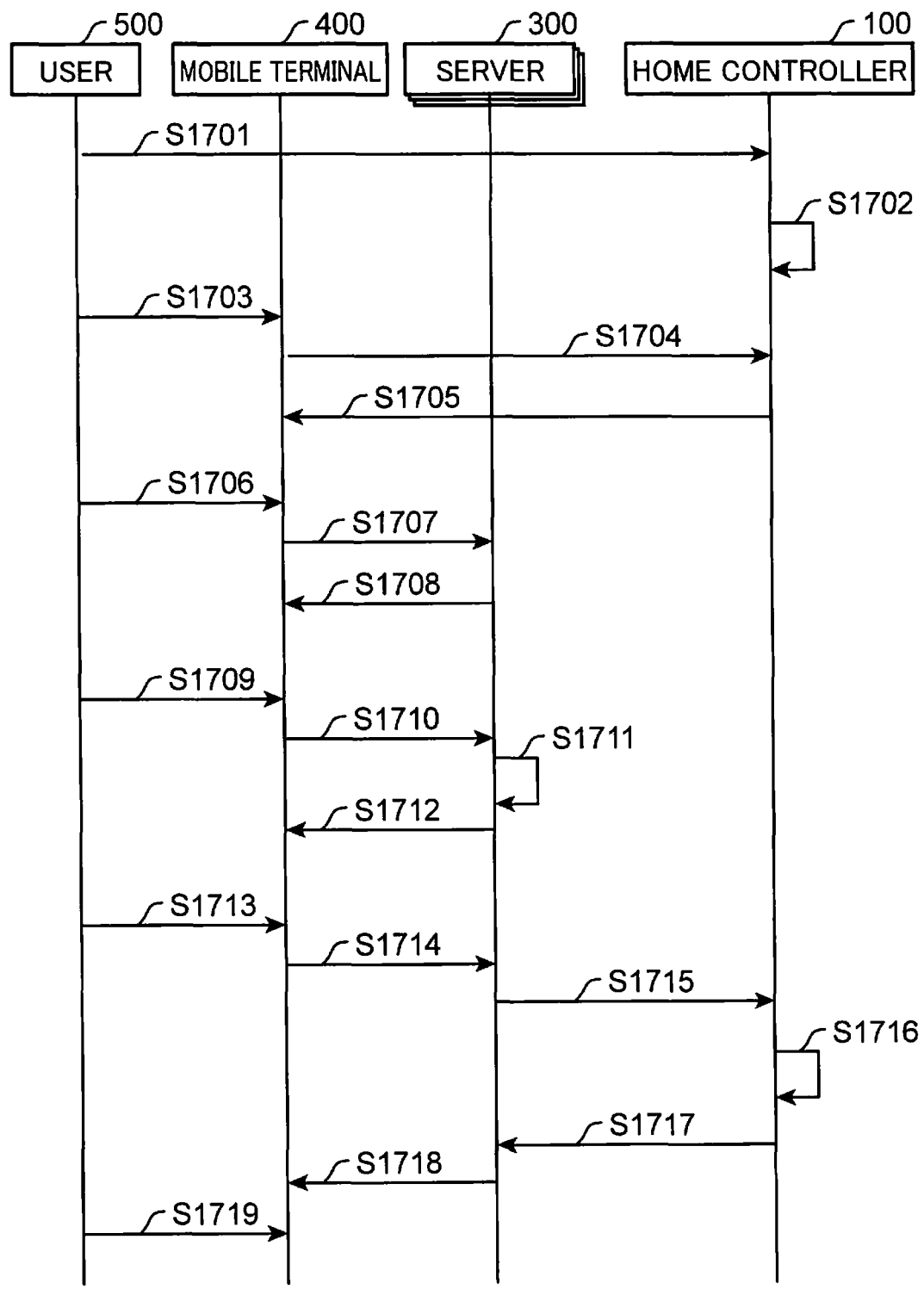
FIG. 17 is a sequence diagram schematically showing an example of a flow of processes of initial setting of a device management system according to the present embodiment.

FIG. 17 is a sequence diagram schematically showing an example of a flow of processes of initial setting of the device management system according to the present embodiment.

First, a user 500 performs an operation (selection of the "next" button 511 in FIG. 12B) on the home controller 100 to cause a transition of the home controller 100 to a device password standby state (S1701). As a result, the home controller 100 makes a transition to the device password standby state (S1702).

Next, the user 500 operates the mobile terminal 400 (S1703) and causes the mobile terminal 400 to read the two-dimensional code 522 (FIG. 12C) that is displayed on the display 101 of the home controller 100 (S1704). Accordingly, the mobile terminal 400 acquires access information including a URL of the server 300 and a device ID of the home controller 100 from the home controller 100 (S1705).

Next, the user 500 operates the mobile terminal 400 (S1706) and causes the mobile terminal 400 to issue a request for acquiring a top screen (for example, the login screen 1301 shown in FIG. 13A) to the server 300 using the access information including the URL of the server 300 and the device ID of the home controller 100 (S1707). In response to the acquisition request for a top screen, the server 300 transmits the login screen 1301 to the mobile terminal 400 (S1708).

Next, the user 500 operates the mobile terminal 400 and inputs login information including a login ID and a login password (S1709). The mobile terminal 400 then transmits the input login information to the server 300 (S1710). The server 300 checks the transmitted login ID and login password with the login ID 711 and the login password 712 in the authentication setting information 700 (FIG. 7) (S1711). When the transmitted login ID and login password respectively match the login ID 711 and the login password 712 in the authentication setting information 700, the server 300 transmits the device password registration screen 1302 (FIG. 13B) to the mobile terminal 400 (S1712).

Next, the user 500 performs an input operation of a device password to the display 411 of the mobile terminal 400 (S1713). The mobile terminal 400 transmits the device ID of the home controller 100 and the device password input by the user 500 to the server 300 (S1714). The server 300 issues a request to set the device password to the home controller 100 (S1715). In response to the setting request, the home controller 100 sets the device password and cancels the device password standby state (S1716).

Subsequently, the home controller 100 transmits a response to the effect that setting of the device password is successful to the server 300 (S1717). Upon receiving the response to the effect that setting of the device password is successful, the server 300 sequentially transmits the device list screen 1304 (FIG. 13D) and the device operation screen 1305 (FIG. 13E) to the mobile terminal 400 (S1718). Accordingly, the user 500 can operate the device 200 using the mobile terminal 400.

Finally, in order to simplify access from the next time, the user 500 performs an operation for registering a URL of a top screen (for example, the login screen 1401 shown in FIG. 14A) of the service provided by the device management system according to the present embodiment as a bookmark (S1719) to end the processes shown in FIG. 17.

Moreover, the process of S1719 need not be performed. In this case, the user may acquire an access destination by, for example, reading the two-dimensional code 522 every time an operation of the device 200 is started.

Figure 18:
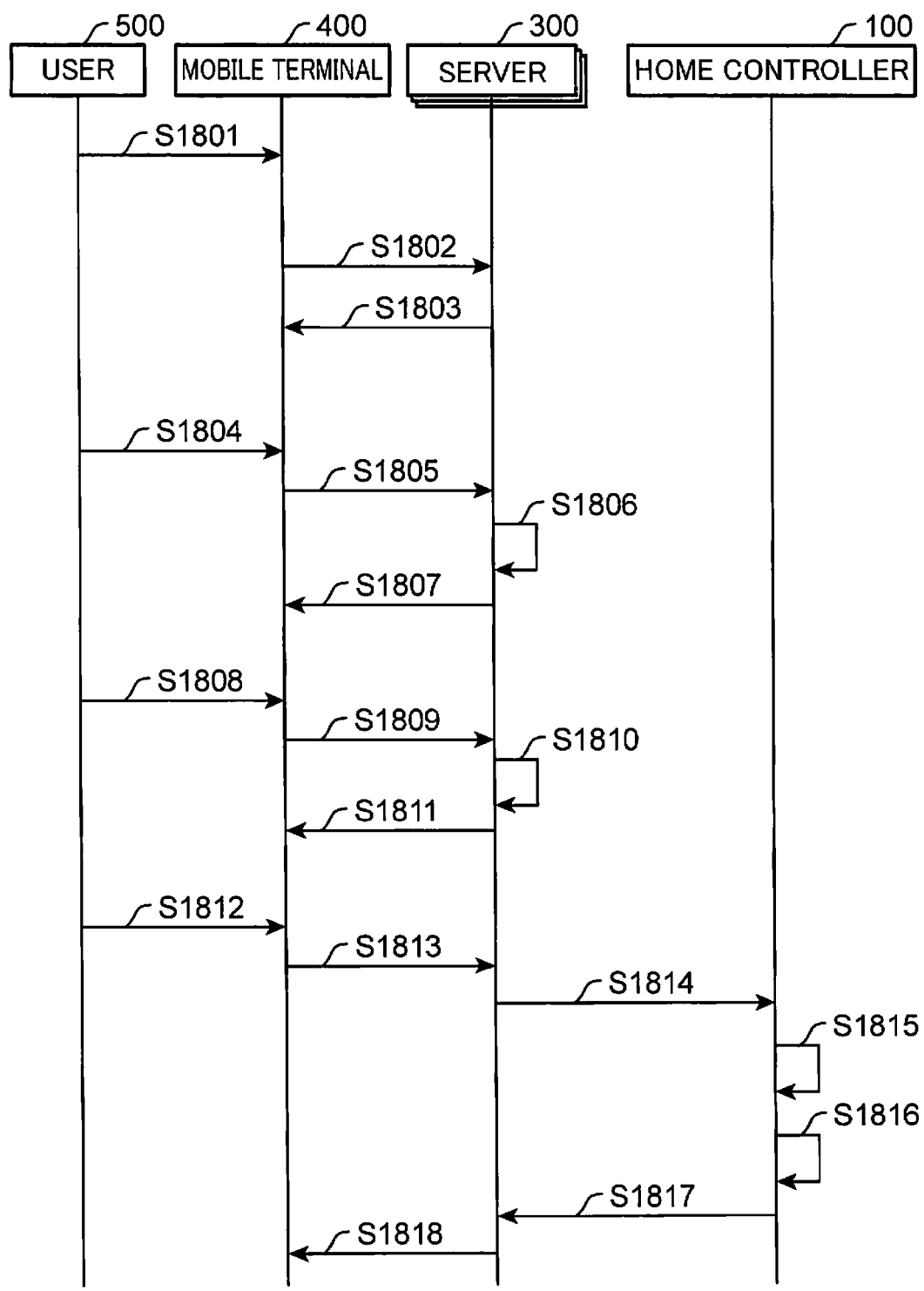
FIG. 18 is a sequence diagram schematically showing an example of a flow of processes including second stage authentication for performing a device operation with a device management system according to the present embodiment.

FIG. 18 is a sequence diagram schematically showing an example of a flow of processes including second stage authentication for performing a device operation with the device management system according to the present embodiment.

First, the user 500 performs an operation on the mobile terminal 400 for displaying a top screen (for example, the login screen 1401 shown in FIG. 14A) whose URL is registered as a bookmark on the display 411 (S1801). According to this operation, the mobile terminal 400 accesses the URL of the server 300 (S1802) and, in response to the access, the server 300 transmits the login screen 1401 (FIG. 14A) to the mobile terminal 400 (S1803).

Next, the user 500 operates the mobile terminal 400 and inputs login information including a login ID and a login password (S1804). The mobile terminal 400 then transmits the input login information to the server 300 (S1805). The server 300 checks the transmitted login ID and login password with the login ID 711 and the login password 712 in the authentication setting information 700 (FIG. 7) (S1806). When the transmitted login ID and login password respectively match the login ID 711 and the login password 712 in the authentication setting information 700, the server 300 transmits the second stage authentication screen 1402 (FIG. 14B) to the mobile terminal 400 (S1807).

Next, the user 500 performs an input operation of a device password to the display 411 of the mobile terminal 400 (S1808). The mobile terminal 400 transmits the device password input by the user 500 to the server 300 as second stage authentication information (S1809). The server 300 checks the transmitted device password with the device password 732 in the authentication setting information 700 (FIG. 7) (S1810). When the transmitted device password and the device password 732 in the authentication setting information 700 match each other, the server 300 sequentially transmits the device list screen 1304 (FIG. 13D) and the device operation screen 1305 (FIG. 13E) to the mobile terminal 400 (S1811).

When the user 500 performs an operation on the device 200 using the device operation screen 1305 (FIG. 13E) that is displayed on the mobile terminal 400 (S1812), the mobile terminal 400 transmits a control command including a device ID and a device password of the device 200 that is a control target to the server 300 (S1813). The server 300 transmits, to the home controller 100, the control command transmitted from the mobile terminal 400 (S1814).

The home controller 100 checks the device password included in the transmitted control command and the device password 1002 in the device authentication information 1000 with each other (S1815). When the device password included in the transmitted control command and the device password 1002 in the device authentication information 1000 match each other, the home controller 100 controls the device 200 according to the control command (S1816). Subsequently, the home controller 100 transmits a response to the effect that control is successful to the server 300 (S1817). Upon receiving the transmission, the server 300 transmits a response to the effect that control is successful to the mobile terminal 400 (S1818) to end the processes shown in FIG. 18.

Figure 19:
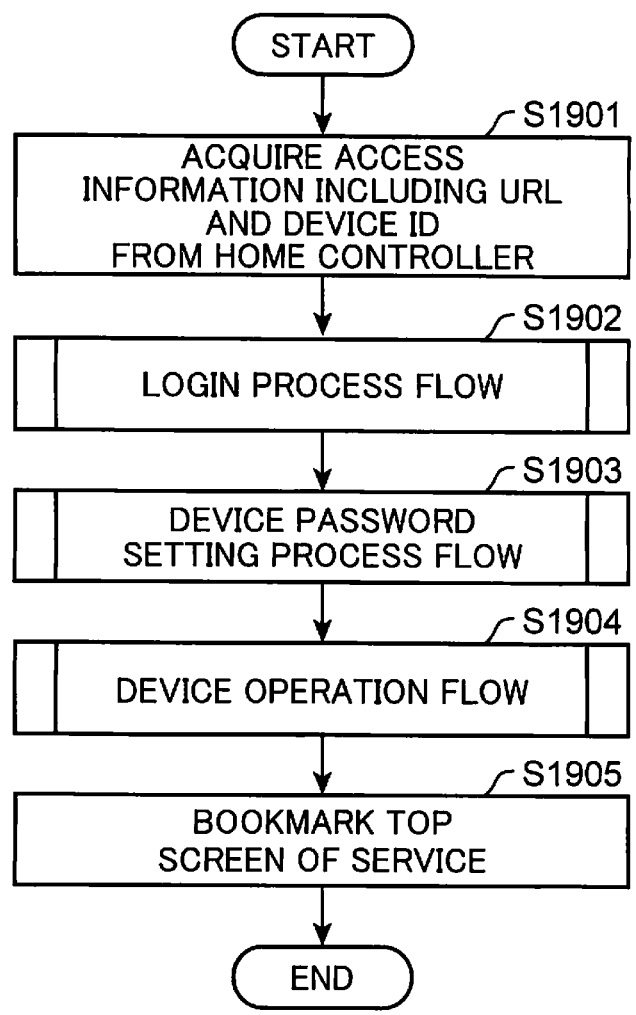
FIG. 19 is a flow chart schematically showing an example of a flow of processes of initial setting of a device management system according to the present embodiment.

FIG. 19 is a flow chart schematically showing an example of a flow of processes of initial setting of the device management system according to the present embodiment.

First, the user 500 operates the mobile terminal 400 to acquire access information including the device ID of the home controller 100 and the URL of the server 300 from the home controller 100 (S1901).

Next, in S1902, a subroutine of a login process flow (FIG. 20 to be described later) is executed. Subsequently, in S1903, a subroutine of a device password setting process flow (FIG. 21 to be described later) is executed. Next, in S1904, a subroutine of a device operation flow (FIG. 22 to be described later) is executed. Finally, in S1905, the user 500 operates the mobile terminal 400 to register a URL of a top screen (for example, the login screen 1401 shown in FIG. 14A) of the service provided by the device management system according to the present embodiment as a bookmark to end the flow shown in FIG. 19.

Figure 20:
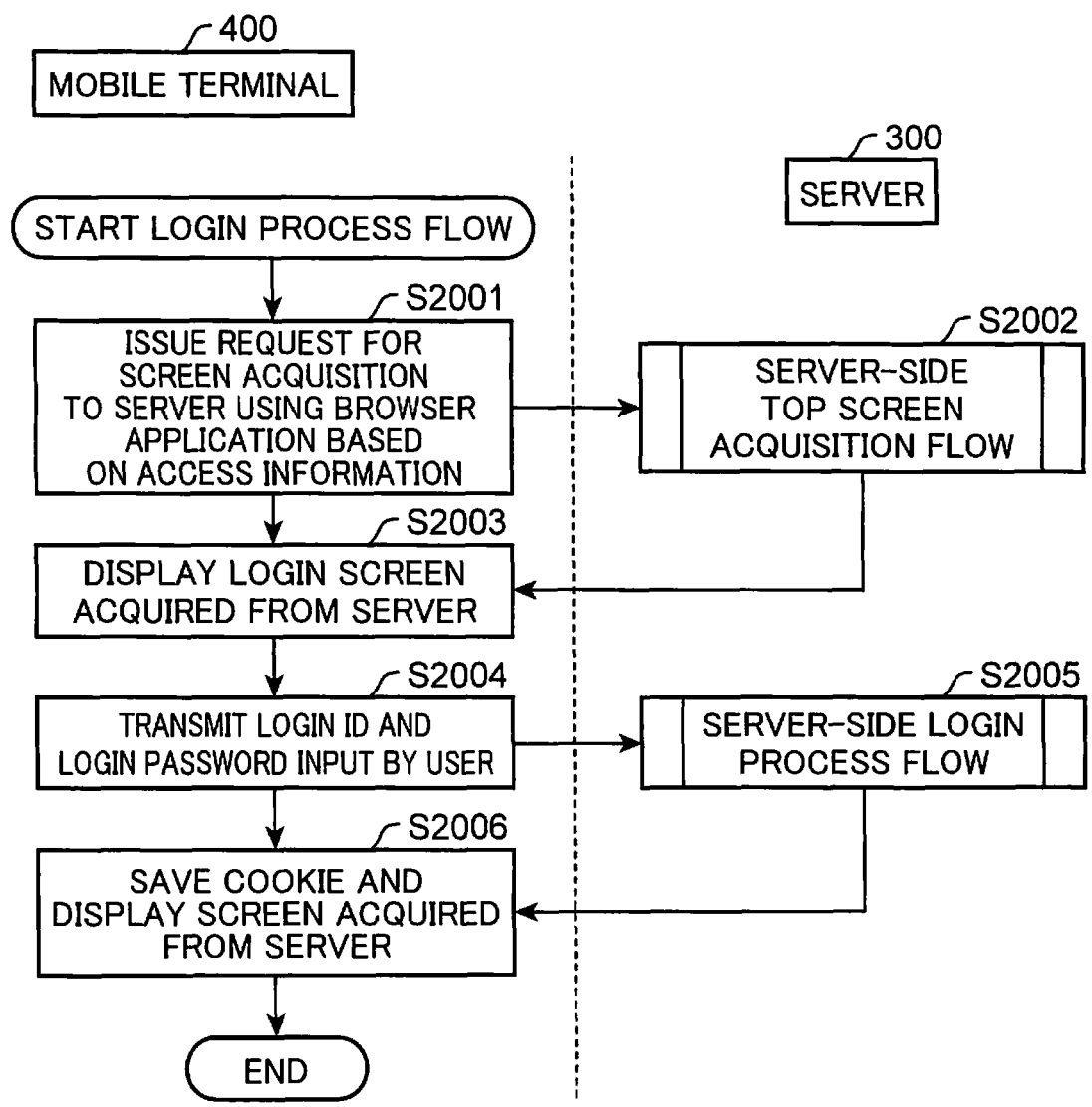
FIG. 20 is a flow chart schematically showing a subroutine of a login process flow of S1902 in FIG. 19.

FIG. 20 is a flow chart schematically showing the subroutine of the login process flow of S1902 in FIG. 19.

First, based on the access information, the communication controller 415 of the mobile terminal 400 issues a request for screen acquisition to the server 300 using a browser application (S2001). In response to the screen acquisition request, a subroutine of a server-side top screen acquisition flow (FIG. 23 to be described later) is executed by the server 300 (S2002). Subsequently, at the mobile terminal 400, the display controller 412 displays the top screen acquired from the server 300 on the display 411 (S2003). Moreover, in this case, it is assumed that a login screen is transmitted from the server 300 as the top screen. Therefore, in S2003, the login screen 1301 (FIG. 13A) is displayed on the display 411 of the mobile terminal 400.

Subsequently, the communication controller 415 transmits the login ID and the login password which have been input by the user to the login screen displayed in S2003 to the server 300 (S2004). In response to the transmission, a subroutine of a server-side login process flow (FIG. 26 to be described later) is executed by the server 300 (S2005). Next, in S2006, at the mobile terminal 400, the communication controller 415 saves information on a cookie described earlier which is included in the transmission from the server 300 in the storage 414. In addition, in S2006, the display controller 412 displays the screen acquired from the server 300 (in this case, the device password registration screen 1302 shown in FIG. 13B) on the display 411 to end the processes shown in FIG. 20.

Figure 21:
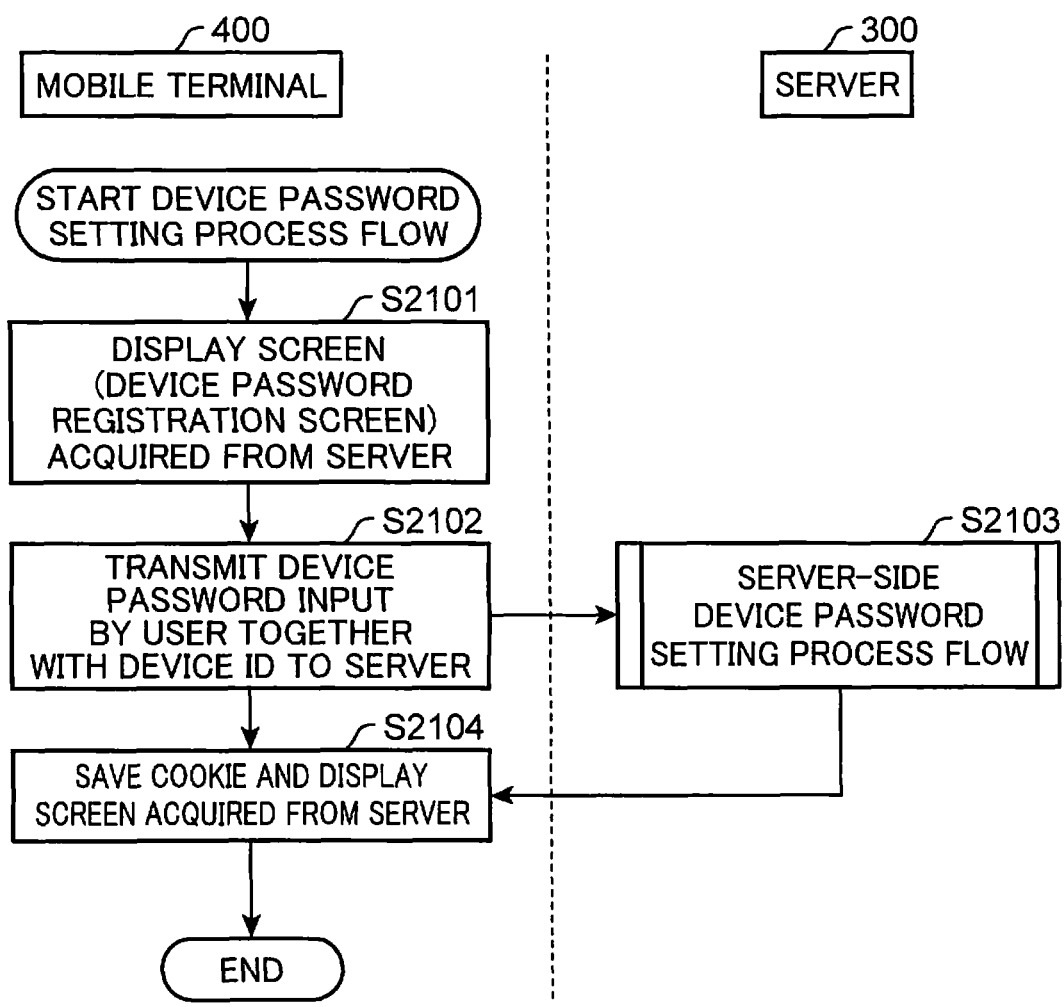
FIG. 21 is a flow chart schematically showing a subroutine of a device password setting process flow of S1903 in FIG. 19.

FIG. 21 is a flow chart schematically showing the subroutine of the device password setting process flow of S1903 in FIG. 19.

First, at the mobile terminal 400, the display controller 412 displays the device password registration screen 1302 (FIG. 13B) acquired from the server 300 on the display 411 (S2101). Moreover, while S2101 is described in order to facilitate understanding, this step overlaps with the display of a screen in S2006 shown in FIG. 20.

Following S2101, the communication controller 415 of the mobile terminal 400 transmits the device password input by the user to the server 300 together with the device ID of the home controller 100 (S2102). In response to the transmission, a subroutine of a server-side device password setting process flow (FIG. 27 to be described later) is executed by the server 300 (S2103).

Next, in S2104, at the mobile terminal 400, the communication controller 415 saves a cookie transmitted from the server 300 in the storage 414. In addition, in S2104, the display controller 412 displays a screen acquired from the server 300 (for example, the registration completion screen 1303 shown in FIG. 13C) on the display 411 to end the processes shown in FIG. 21.

Figure 22:
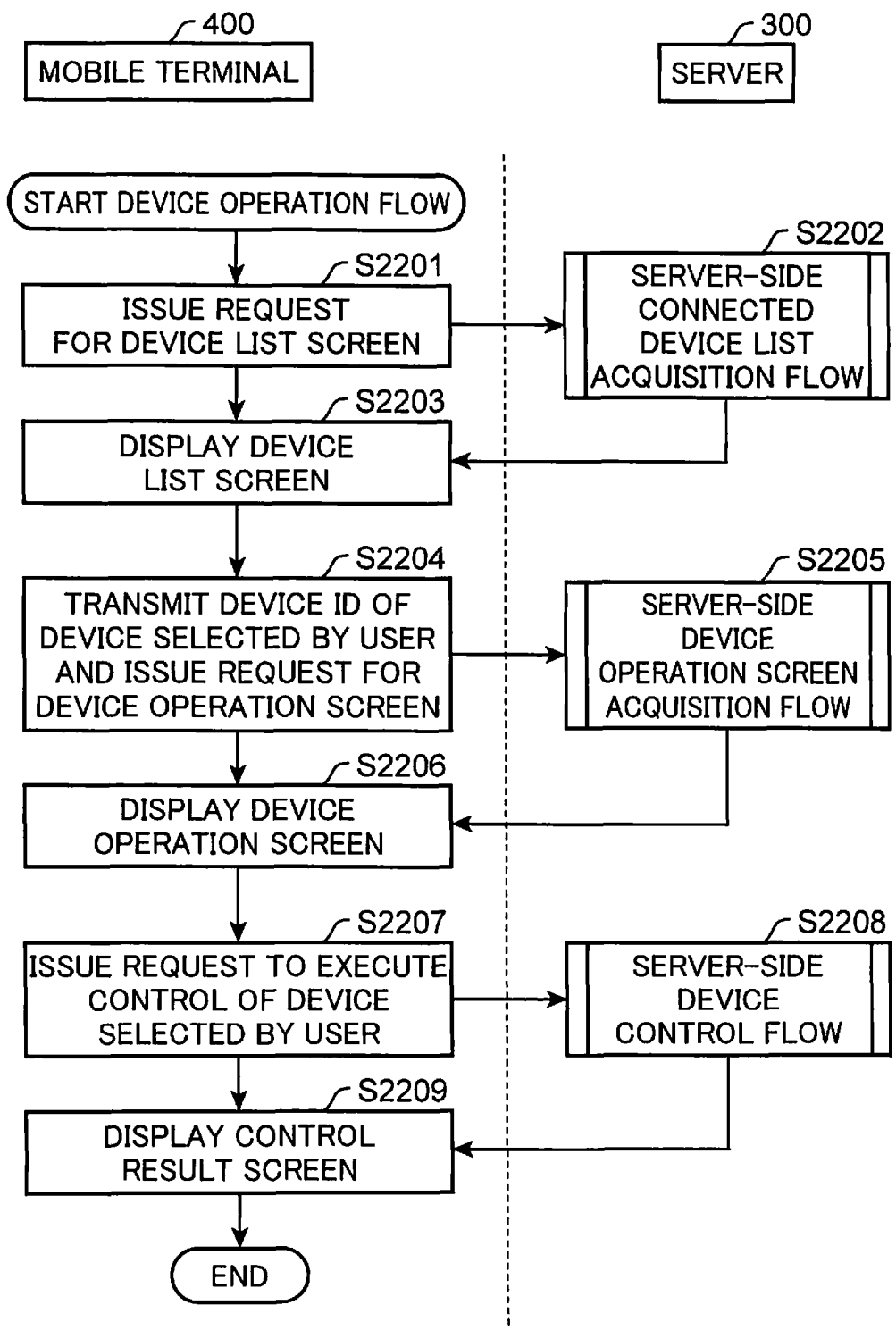
FIG. 22 is a flow chart schematically showing a subroutine of a device operation flow of S1904 in FIG. 19 and S3310 in FIG. 33.

FIG. 22 is a flow chart schematically showing the subroutine of the device operation flow of S1904 in FIG. 19 and S3310 in FIG. 33 (to be described later).

First, the user selects the "to device list screen" button 543 on the registration completion screen 1303 shown in FIG. 13C which is displayed on the display 411 of the mobile terminal 400 and the selection is detected by the input controller 413. As a result, the communication controller 415 issues a request for the device list screen to the server 300 (S2201). In response to the request, a subroutine of a server-side connected device list acquisition flow (FIG. 30 to be described later) is executed by the server 300 (S2202). In following S2203, the display controller 412 of the mobile terminal 400 displays the device list screen 1304 (FIG. 13D) that is transmitted from the server 300 on the display 411.

The user selects a device in a state where the device list screen 1304 (FIG. 13D) is displayed on the display 411 and the selection is detected by the input controller 413. As a result, the communication controller 415 transmits a device ID of the device selected by the user to the server 300 and issues a request for a device operation screen (S2204). In response to the request, a subroutine of a server-side device operation screen acquisition flow (FIG. 31 to be described later) is executed by the server 300 (S2205). Subsequently, the display controller 412 of the mobile terminal 400 displays the device operation screen 1305 (FIG. 13E) that is transmitted from the server 300 on the display 411 (S2206).

The user selects device control in a state where the device operation screen 1305 (FIG. 13E) is displayed on the display 411 and the selection is detected by the input controller 413. As a result, the communication controller 415 of the mobile terminal 400 issues a request to the server 300 to execute the device control selected by the user on the device operation screen 1305. In response to the request, a subroutine of a server-side device control flow (FIG. 32 to be described later) is executed by the server 300 (S2208).

Subsequently, the display controller 412 of the mobile terminal 400 displays a control result screen transmitted from the server 300 on the display 411 (S2209) to end the processes shown in FIG. 22. The control result screen that is displayed on the display 411 is displayed as a popup screen on, for example, the device operation screen 1305 shown in FIG. 13E. Alternatively, the control result screen that is displayed on the display 411 may be an error screen.

Figure 23:
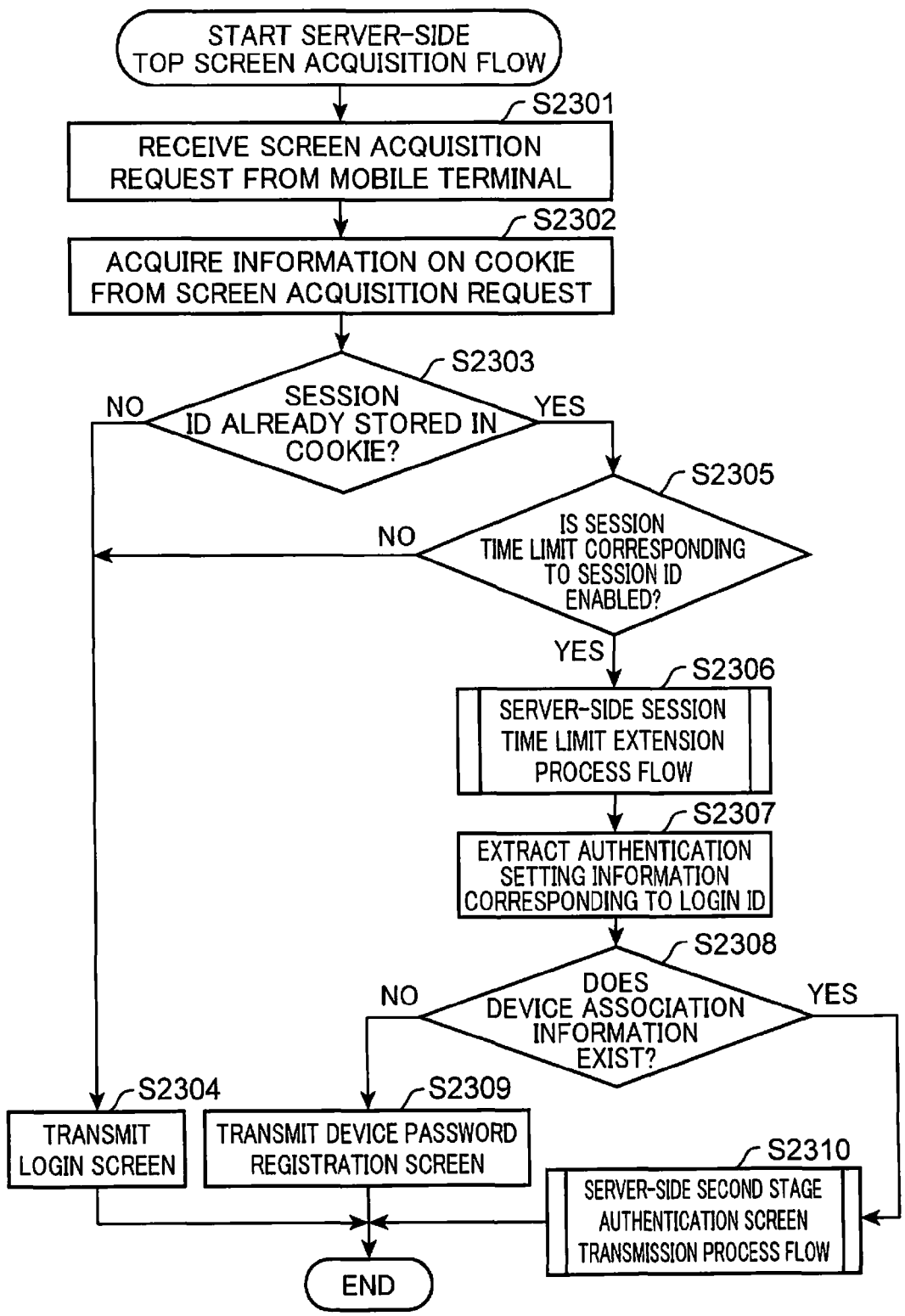
FIG. 23 is a flow chart schematically showing a subroutine of a server-side top screen acquisition flow of S2002 in FIG. 20 and S3302 in FIG. 33.

FIG. 23 is a flow chart schematically showing the subroutine of the server-side top screen acquisition flow of S2002 in FIG. 20 and S3302 in FIG. 33 (to be described later).

First, the communication controller 314 of the server 300 receives a screen acquisition request that has been transmitted from the mobile terminal 400 (S2301). Next, the session manager 317 receives the screen acquisition request from the communication controller 314 and acquires information on a cookie that is included in the screen acquisition request (S2302). The session manager 317 determines whether or not a session ID is stored in the cookie (S2303).

When a session ID is not stored in the cookie (NO in S2303), the communication controller 314 transmits a login screen to the mobile terminal 400 (S2304) to end the process shown in FIG. 23. Moreover, when executed for the first time (when executed as a subroutine of S2002 in FIG. 20), since no information is stored in the cookie, a result of NO is obtained in S2303.

In S2303, when a session ID is stored in the cookie (YES in S2303), the session manager 317 determines whether or not a session time limit which corresponds to the session ID stored in the cookie in the session information 800 (FIG. 8) is valid (S2305). When the session time limit corresponding to the session ID is not valid (NO in S2305), since a valid period of a login state has expired, the process of FIG. 23 ends after advancing to S2304.

In S2305, when the session time limit corresponding to the session ID is valid (YES in S2305), a subroutine of a server-side session time limit extension process flow (FIG. 24 to be described later) is executed (S2306). Next, the session manager 317 notifies a login ID corresponding to the session ID to the authentication setting manager 313. Subsequently, the authentication setting manager 313 extracts information corresponding to the notified login ID from the authentication setting information 700 (FIG. 7) (S2307).

The authentication setting manager 313 determines whether or not the device association information 703 exists in the extracted information corresponding to the login ID (S2308). When the device association information 703 does not exist (NO in S2308), a device password has not been set yet. Therefore, the communication controller 314 transmits the device password registration screen 1302 (FIG. 13B) to the mobile terminal 400 (S2309) to end the process shown in FIG. 23.

On the other hand, when the device association information 703 exists in the information corresponding to the notified login ID which is extracted from the authentication setting information 700 (YES in S2308), a subroutine of a server-side second stage authentication screen transmission process flow (FIG. 25 to be described later) is executed (S2310) to end the process shown in FIG. 23.

As shown in FIG. 23, various display screens are transmitted from the server 300 to the mobile terminal 400 depending on a result of the process of FIG. 23. However, it is assumed that a login screen is transmitted from the server 300 to the mobile terminal 400 in S2002 in FIG. 20 described earlier.

Figure 24:
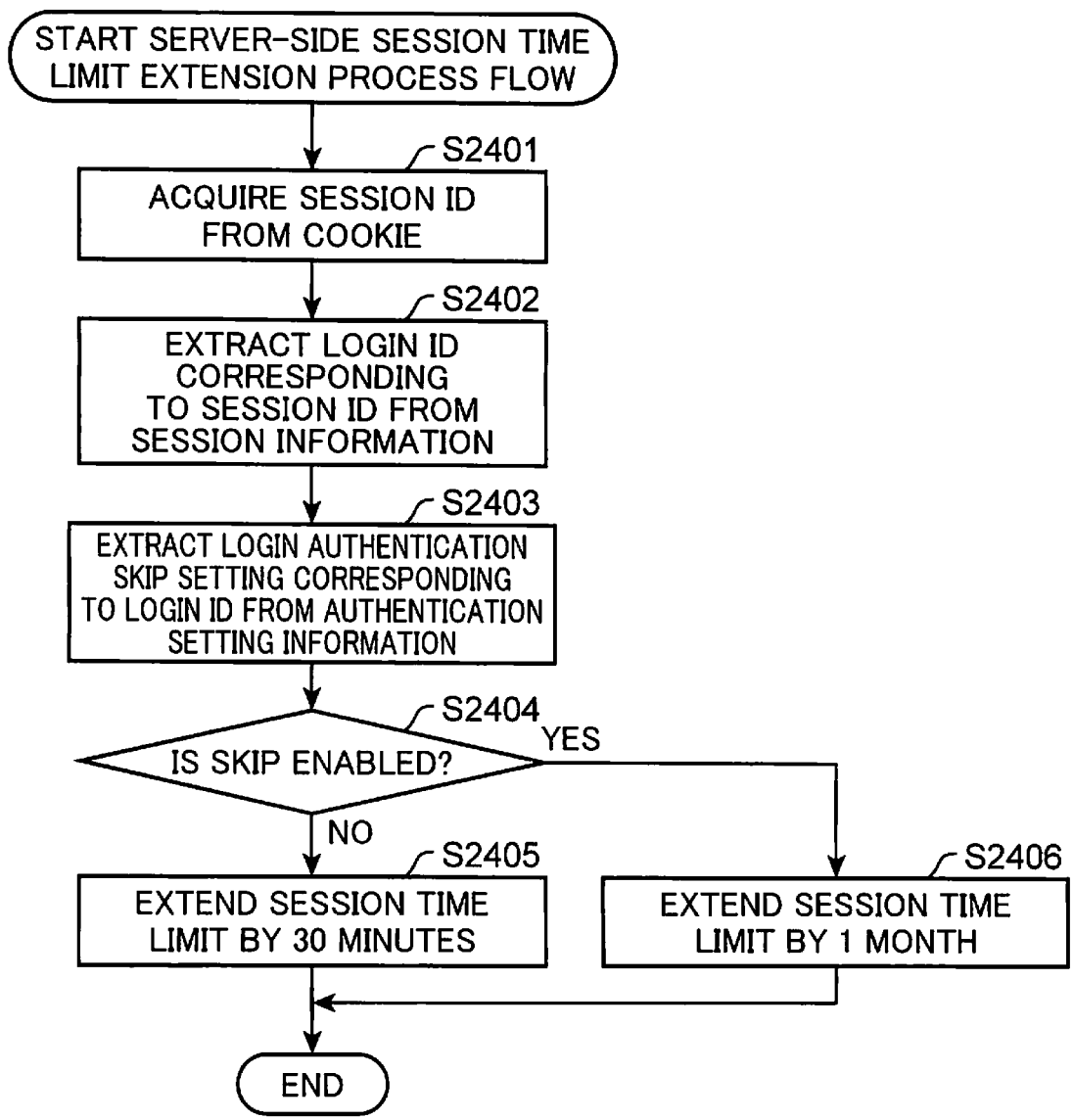
FIG. 24 is a flow chart schematically showing a subroutine of a server-side session time limit extension process flow of S2306 in FIG. 23 and S2808 in FIG. 28.

FIG. 24 is a flow chart schematically showing the subroutine of the server-side session time limit extension process flow of S2306 in FIG. 23 and S2808 in FIG. 28 (to be described later).

First, the session manager 317 of the server 300 acquires a session ID from a cookie (S2401). Next, the session manager 317 extracts a login ID corresponding to the acquired session ID from the session information 800 (FIG. 8) (S2402). Subsequently, the session manager 317 notifies the extracted login ID to the authentication setting manager 313. In addition, the authentication setting manager 313 extracts the login authentication skip setting 713 corresponding to the login ID 711 from the authentication setting information 700 (FIG. 7) corresponding to the notified login ID (S2403).

Next, the authentication setting manager 313 determines whether or not the extracted login authentication skip setting 713 is enabled (S2404). In addition, the authentication setting manager 313 notifies a determination result to the session manager 317. When the extracted login authentication skip setting 713 is not enabled (NO in S2404), it is determined that the current user does not mind frequently performing login authentication and the session manager 317 extends the session time limit by a relatively short period of time (in the present embodiment, for example, 30 minutes) to end the process shown in FIG. 24.

On the other hand, in S2404, when the extracted login authentication skip setting 713 is enabled (YES in S2404), it is determined that the current user does not wish to frequently perform login authentication and the session manager 317 extends the session time limit by a relatively long period of time (in the present embodiment, for example, 1 month) to end the process shown in FIG. 24.

Figure 25:
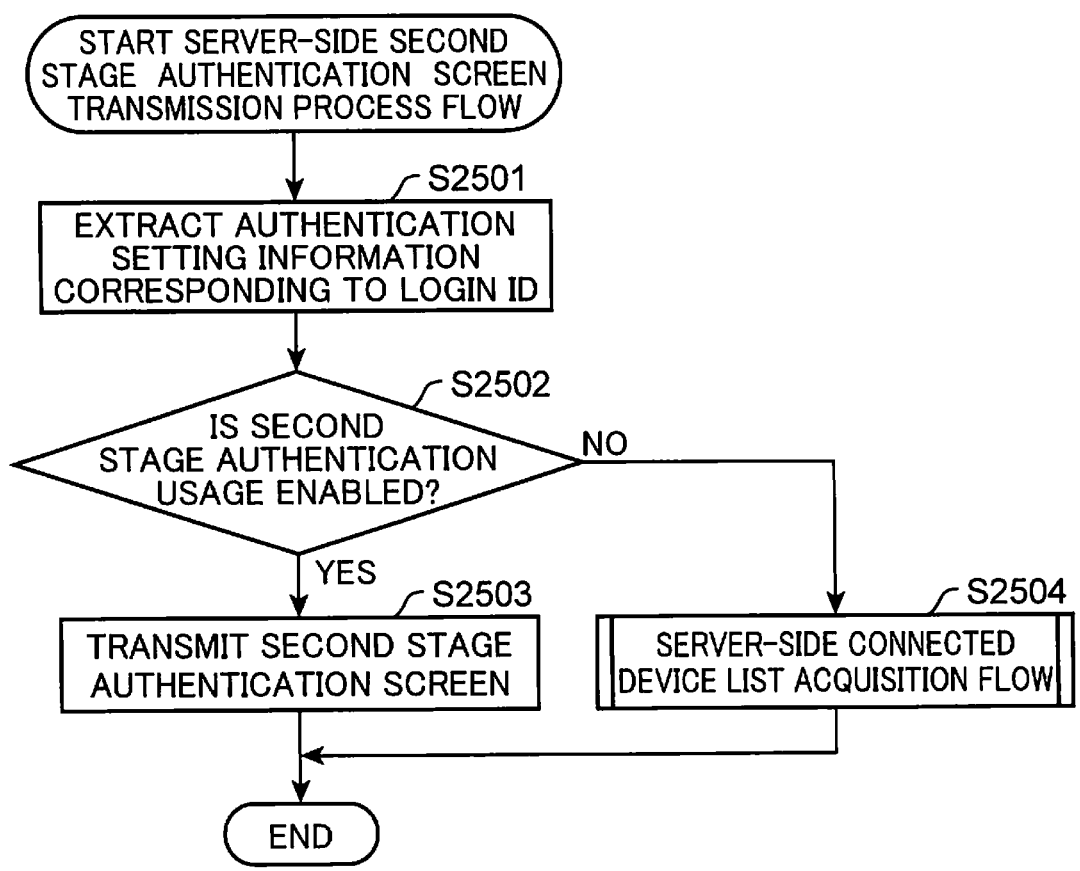
FIG. 25 is a flow chart schematically showing a subroutine of a server-side second stage authentication screen transmission process flow of S2310 in FIG. 23 and S2610 in FIG. 26.

FIG. 25 is a flow chart schematically showing the subroutine of the server-side second stage authentication screen transmission process flow of S2310 in FIG. 23 and S2610 in FIG. 26 (to be described later).

First, the authentication setting manager 313 of the server 300 extracts information corresponding to the login ID notified by the session manager 317 from the authentication setting information 700 (FIG. 7) (S2501). Subsequently, the authentication setting manager 313 determines whether or not usage of second stage authentication is enabled in the information extracted from the authentication setting information 700 (S2502).

When usage of second stage authentication is enabled (YES in S2502), the communication controller 314 transmits the second stage authentication screen 1402 (FIG. 14B) to the mobile terminal 400 (S2503) to end the process shown in FIG. 25. On the other hand, in S2502, when usage of second stage authentication is not enabled (NO in S2502), a subroutine of a server-side connected device list acquisition flow (FIG. 30 to be described later) is executed (S2504) to end the process shown in FIG. 25.

Figure 26:
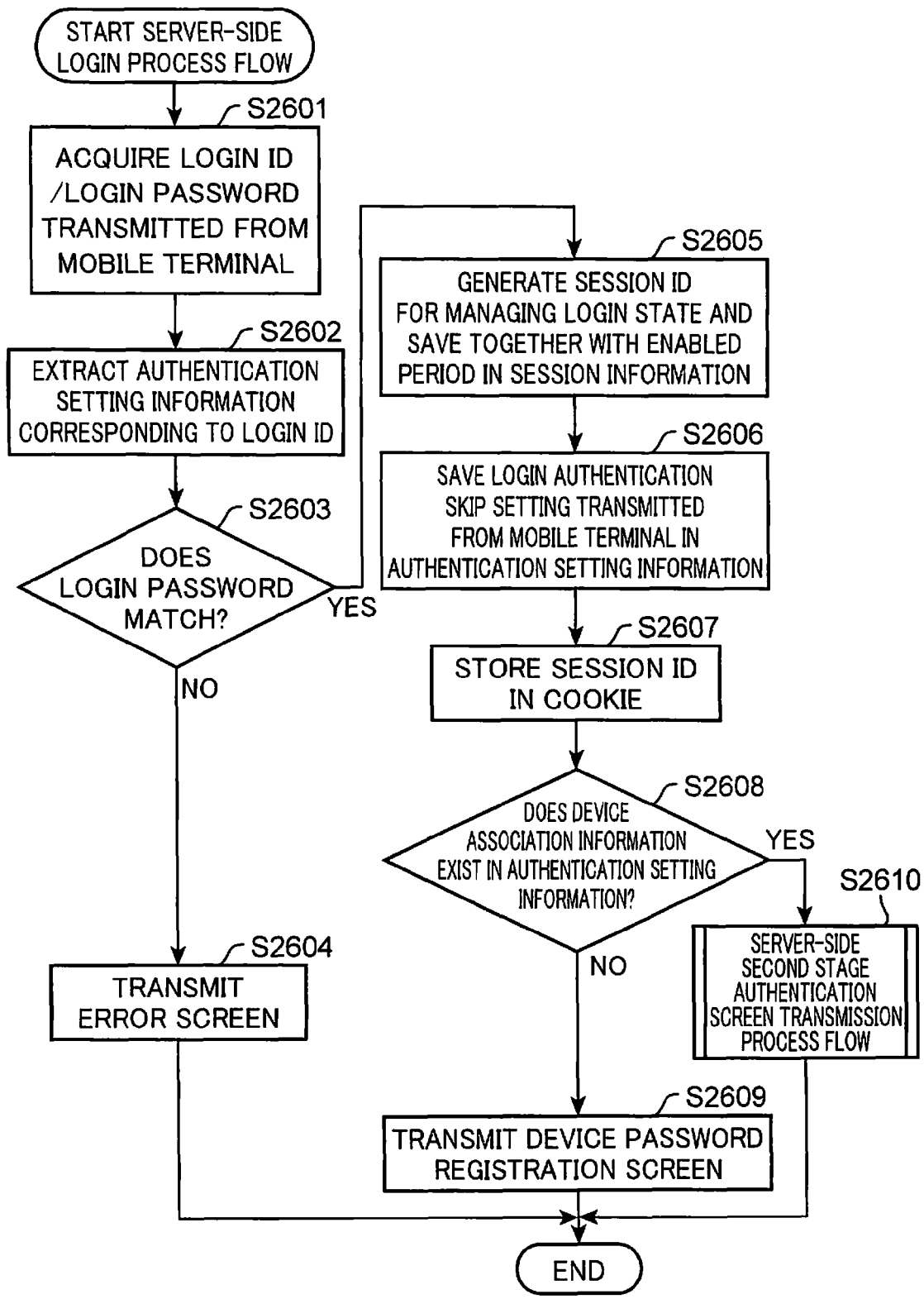
FIG. 26 is a flow chart schematically showing a subroutine of a server-side login process flow of S2005 in FIG. 20 and S3305 in FIG. 33.

FIG. 26 is a flow chart schematically showing the subroutine of the server-side login process flow of S2005 in FIG. 20 and S3305 in FIG. 33 (to be described later).

First, the authentication setting manager 313 of the server 300 acquires the login ID and the login password which are received by the communication controller 314 and which have been transmitted from the mobile terminal 400 (S2601). Next, the authentication setting manager 313 extracts information corresponding to the acquired login ID from the authentication setting information 700 (FIG. 7) (S2602).

Subsequently, the authentication setting manager 313 determines whether or not the login password acquired in S2601 matches the login password 712 included in the information extracted from the authentication setting information 700 in S2602 (S2603). When the login password acquired in S2601 does not match the login password 712 extracted from the authentication setting information 700 in S2602 (NO in S2603), the communication controller 314 transmits an error screen (for example, FIG. 15D) to the mobile terminal 400 (S2604) to end the process shown in FIG. 26.

On the other hand, when the login password acquired in S2601 matches the login password 712 extracted from the authentication setting information 700 in S2602 (YES in S2603), the session manager 317 generates a session ID for managing the login state and saves the session ID together with an enabled period in the session information 800 (FIG. 8) (S2605).

Next, the authentication setting manager 313 saves contents of the login authentication skip setting that has been transmitted from the mobile terminal 400 in the authentication setting information 700 (S2606). In other words, when the check box 534 (FIG. 13A) on the login screen is checked, the authentication setting manager 313 sets the login authentication skip setting in the authentication setting information 700 to "enabled". On the other hand, when the check box 534 (FIG. 13A) is not checked, the authentication setting manager 313 sets the login authentication skip setting in the authentication setting information 700 to "disabled".

Subsequently, the session manager 317 stores the session ID in a cookie (S2607).

Next, the authentication setting manager 313 determines whether or not the device association information 703 exists in the information extracted from the authentication setting information 700 in S2602 (S2608). When the device association information 703 does not exist (NO in S2608), a device password has not been set yet. Therefore, the communication controller 314 transmits the device password registration screen 1302 (FIG. 13B) to the mobile terminal 400 (S2609) to end the process shown in FIG. 26.

On the other hand, in S2608, when the device association information 703 exists in the information extracted from the authentication setting information 700 (YES in S2608), the subroutine of the server-side second stage authentication screen transmission process flow (FIG. 25) is executed (S2610) to end the process shown in FIG. 26.

Figure 27:
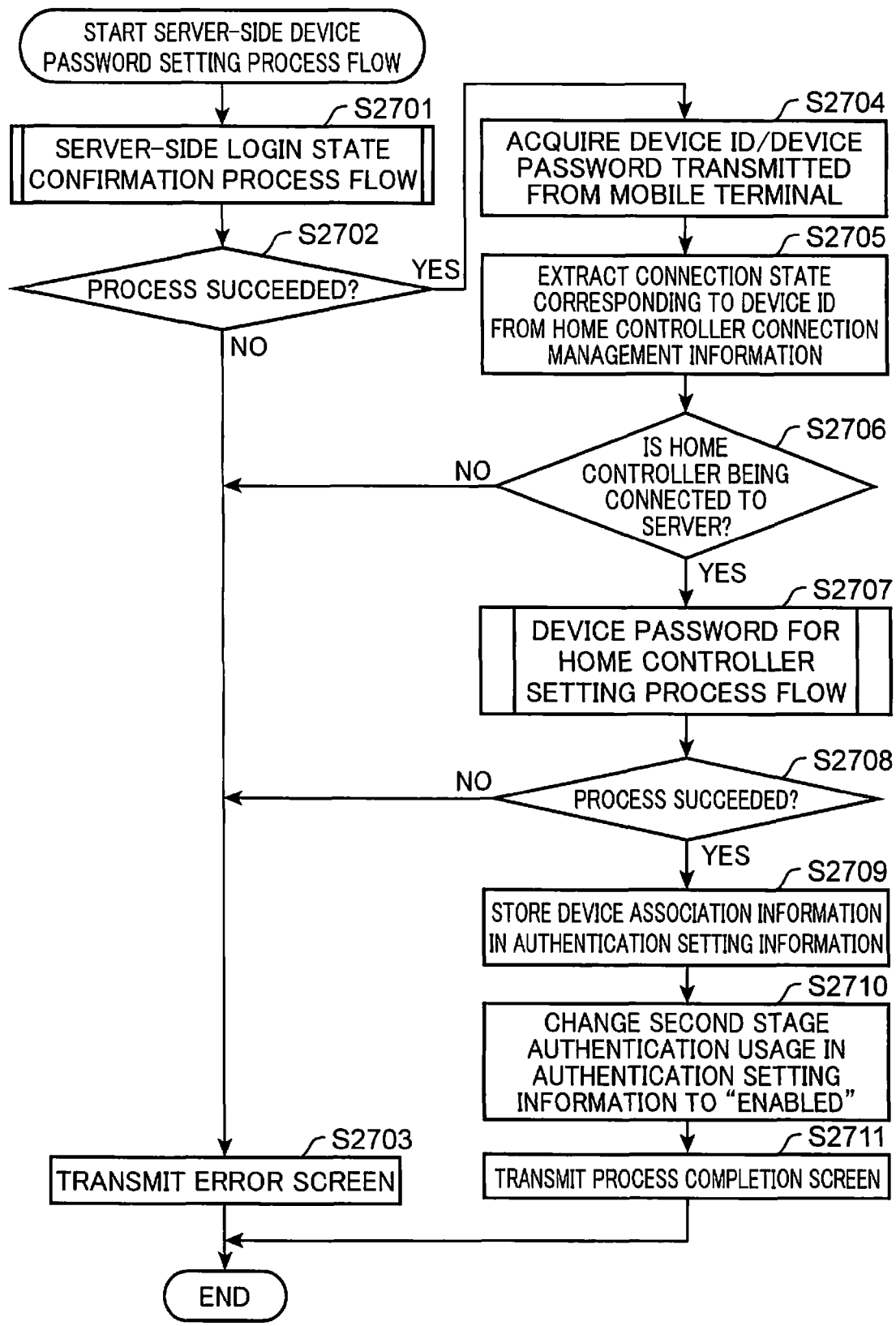
FIG. 27 is a flow chart schematically showing a subroutine of a server-side device password setting process flow of S2103 in FIG. 21.

FIG. 27 is a flow chart schematically showing the subroutine of the server-side device password setting process flow of S2103 in FIG. 21.

First, a subroutine of a server-side login state confirmation process flow (FIG. 28 to be described later) is executed (S2701). Next, the login authenticator 315 of the server 300 determines whether or not the process in the subroutine of the server-side login state confirmation process flow has succeeded based on a flag (to be described later with reference to FIG. 28) (S2702). If the process has not succeeded (NO in S2702), the communication controller 314 transmits an error screen (for example, FIG. 15A) to the mobile terminal 400 (S2703) to end the process shown in FIG. 27.

On the other hand, in S2702, if the process has succeeded (YES in S2702), the connected device manager 311 acquires the device ID and the device password which have been transmitted from the mobile terminal 400 in S2102 in FIG. 21 (S2704). Subsequently, the connected device manager 311 extracts the connection state 902 with respect to the device ID 901 of the home controller 100 from the home controller connection management information 900 (FIG. 9) (S2705).

Next, the connected device manager 311 determines whether or not the home controller 100 corresponding to the device ID acquired in S2704 is being connected to the server 300 (S2706). When the home controller 100 is not being connected to the server 300 (NO in S2706), the process shown in FIG. 27 is ended after advancing to S2703.

On the other hand, when the home controller 100 is being connected to the server 300 (YES in S2706), a subroutine of a device password setting process flow to the home controller (FIG. 29 to be described later) is executed (S2707).

Subsequently, the connected device manager 311 determines whether or not the process in the subroutine of the device password setting process flow to the home controller (S2707) has succeeded based on a flag (to be described later with reference to FIG. 29) (S2708). If the process has not succeeded (NO in S2708), the process shown in FIG. 27 is ended after advancing to S2703.

On the other hand, if the subroutine of the device password setting process flow to the home controller (S2707) has succeeded (YES in S2708), the authentication setting manager 313 stores device association information constituted by the device ID and the device password which have been acquired by the connected device manager 311 in S2704 in the authentication setting information 700 (FIG. 7) (S2709). In addition, the authentication setting manager 313 changes the second stage authentication usage in the authentication setting information 700 to "enabled" (S2710). Next, the communication controller 314 transmits the registration completion screen 1303 (FIG. 13C) to the mobile terminal 400 (S2711) to end the process shown in FIG. 27.

Figure 28:
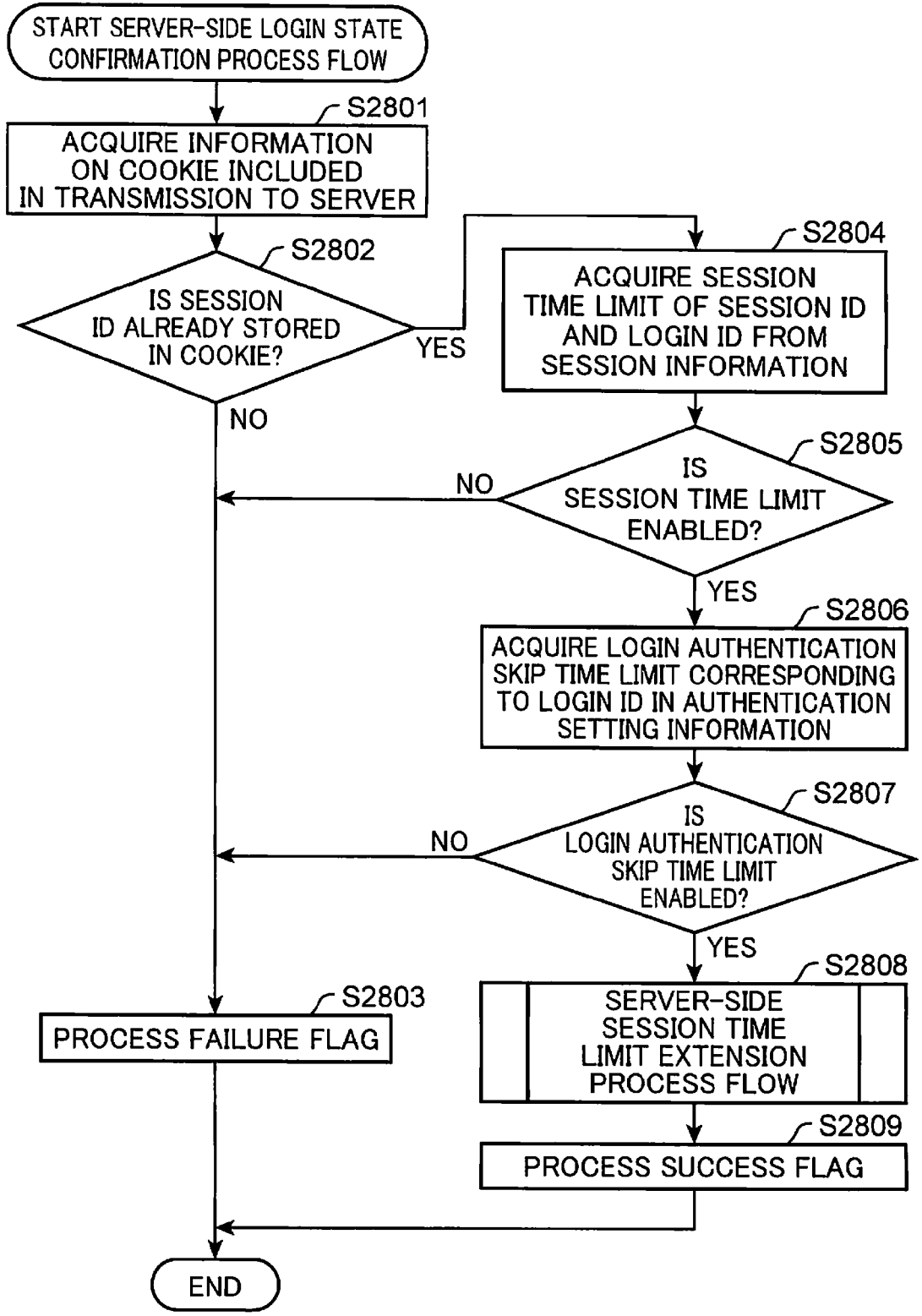
FIG. 28 is a flow chart schematically showing a subroutine of a server-side login state confirmation process flow of S2701 in FIG. 27, S3001 in FIG. 30, S3101 in FIG. 31, S3201 in FIG. 32, and S3401 in FIG. 34.

FIG. 28 is a flow chart schematically showing the subroutine of the server-side login state confirmation process flow of S2701 in FIG. 27, S3001 in FIG. 30 (to be described later), S3101 in FIG. 31 (to be described later), S3201 in FIG. 32 (to be described later), and S3401 in FIG. 34 (to be described later).

First, the session manager 317 of the server 300 acquires information on a cookie that is included in a transmission to the server (S2801). The session manager 317 determines whether or not a session ID is stored in the cookie (S2802). When a session ID is not stored in the cookie (NO in S2802), the session manager 317 sets a process failure flag (S2803) to end the process shown in FIG. 28.

On the other hand, in S2802, when a session ID is stored in the cookie (YES in S2802), the session manager 317 acquires a session time limit and a login ID which correspond to the session ID stored in the cookie from the session information 800 (FIG. 8) (S2804). Next, the session manager 317 determines whether or not the acquired session time limit is valid (S2805). When the session time limit is not valid (NO in S2805), since a valid period of a login state has expired, the process of FIG. 28 ends after advancing to S2803.

On the other hand, in S2805, when the session time limit is valid (YES in S2805), the session manager 317 notifies the login ID acquired in S2804 to the authentication setting manager 313. The authentication setting manager 313 acquires a login authentication skip time limit that corresponds to the notified login ID in the authentication setting information 700 (FIG. 7) (S2808). Next, the authentication setting manager 313 determines whether or not the acquired login authentication skip time limit is valid (S2807). When the login authentication skip time limit is not valid (NO in S2807), the process shown in FIG. 28 is ended after advancing to S2803.

On the other hand, in S2807, when the login authentication skip time limit is valid (YES in S2807), the subroutine of the server-side session time limit extension process flow (FIG. 24 described earlier) is executed (S2808). Subsequently, the session manager 317 sets a process success flag (S2809) to end the process shown in FIG. 28.

Figure 29:
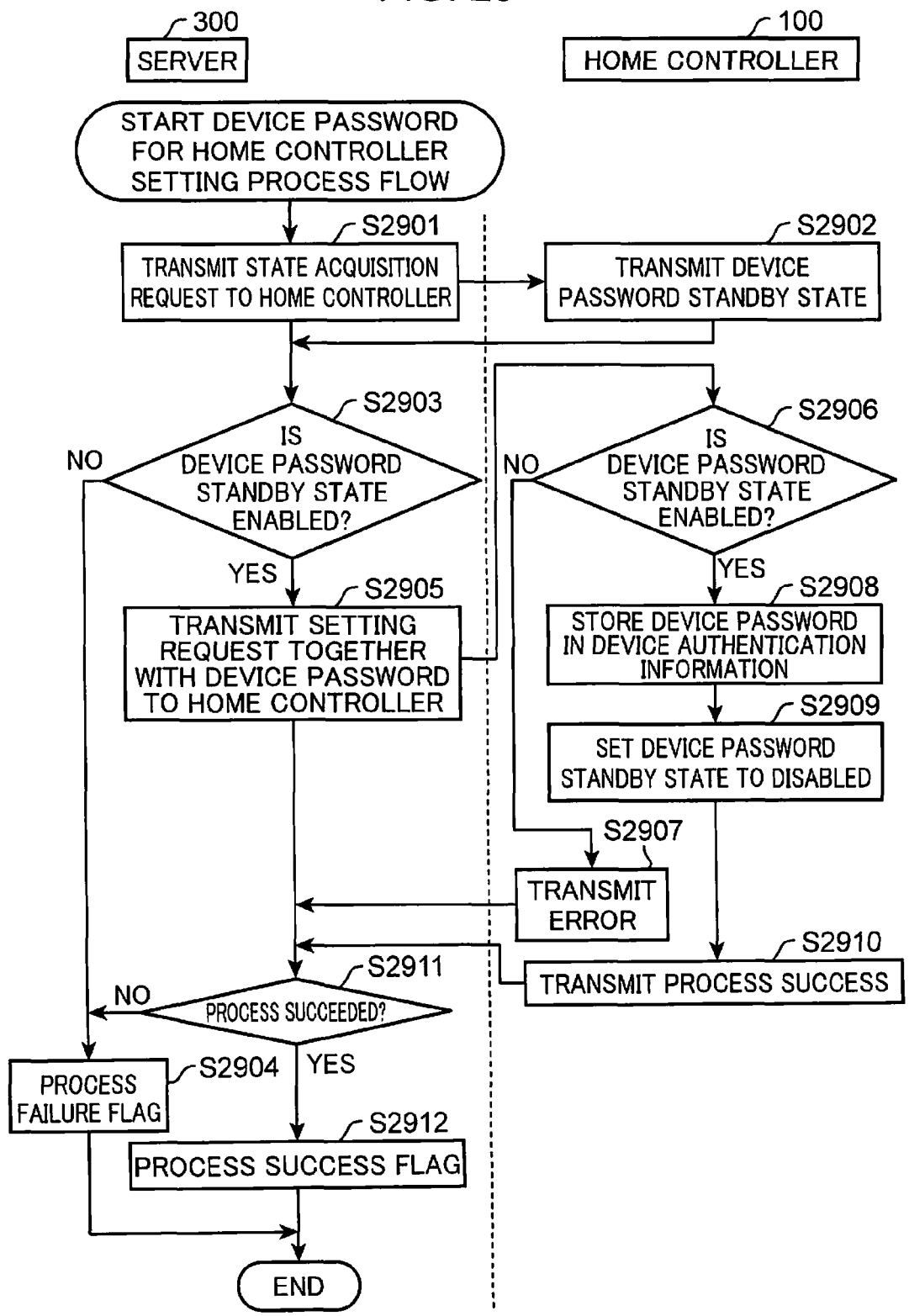
FIG. 29 is a flow chart schematically showing a subroutine of a device password setting process flow to a home controller of S2707 in FIG. 27.

FIG. 29 is a flow chart schematically showing the subroutine of the device password setting process flow to the home controller of S2707 in FIG. 27.

First, upon receiving a request from the authentication setting manager 313, the communication controller 314 of the server 300 transmits a state acquisition request to the home controller 100 (S2901). In response to the request, the communication controller 104 of the home controller 100 transmits contents of the device password standby state 1003 in the device authentication information 1000 (for example, FIG. 10A) upon receiving a request from the device password controller 107 (S2902).

Upon receiving the transmission, the authentication setting manager 313 of the server 300 determines whether or not the device password standby state 1003 is enabled (S2903). When the device password standby state 1003 is not enabled (NO in S2903), the authentication setting manager 313 sets a process failure flag (S2904) to end the process shown in FIG. 29.

On the other hand, when the device password standby state 1003 is enabled in S2903 (YES in S2903), the communication controller 314 transmits a device password setting request together with the acquired device password to the home controller 100 upon receiving a request from the authentication setting manager 313 (S2905).

Upon receiving the request, the device password controller 107 of the home controller 100 determines whether or not the device password standby state 1003 in the device authentication information 1000 is enabled (S2906). When the device password standby state 1003 is not enabled (NO in S2906), the communication controller 104 transmits an error upon receiving a request from the device password controller 107 (S2907).

On the other hand, in S2906, when the device password standby state 1003 is enabled (YES in S2906), the device password controller 107 stores the device password that has been transmitted from the server 300 in the device password 1002 in the device authentication information 1000 (S2908). Accordingly, the device password is managed in association with the device ID of the home controller 100.

In addition, the device password controller 107 sets the device password standby state 1003 to disabled (S2909). Subsequently, the communication controller 104 transmits information indicating a successful process to the server 300 upon receiving a request from the device password controller 107 (S2910).

Upon receiving the transmission of S2907 or S2910, the authentication setting manager 313 of the server 300 determines whether or not the process has succeeded (S2911). If the process has not succeeded (NO in S2911), the process shown in FIG. 29 is ended after advancing to S2904. On the other hand, if the process has succeeded (YES in S2911), the authentication setting manager 313 sets a process success flag (S2912) to end the process shown in FIG. 29.

Figure 30:
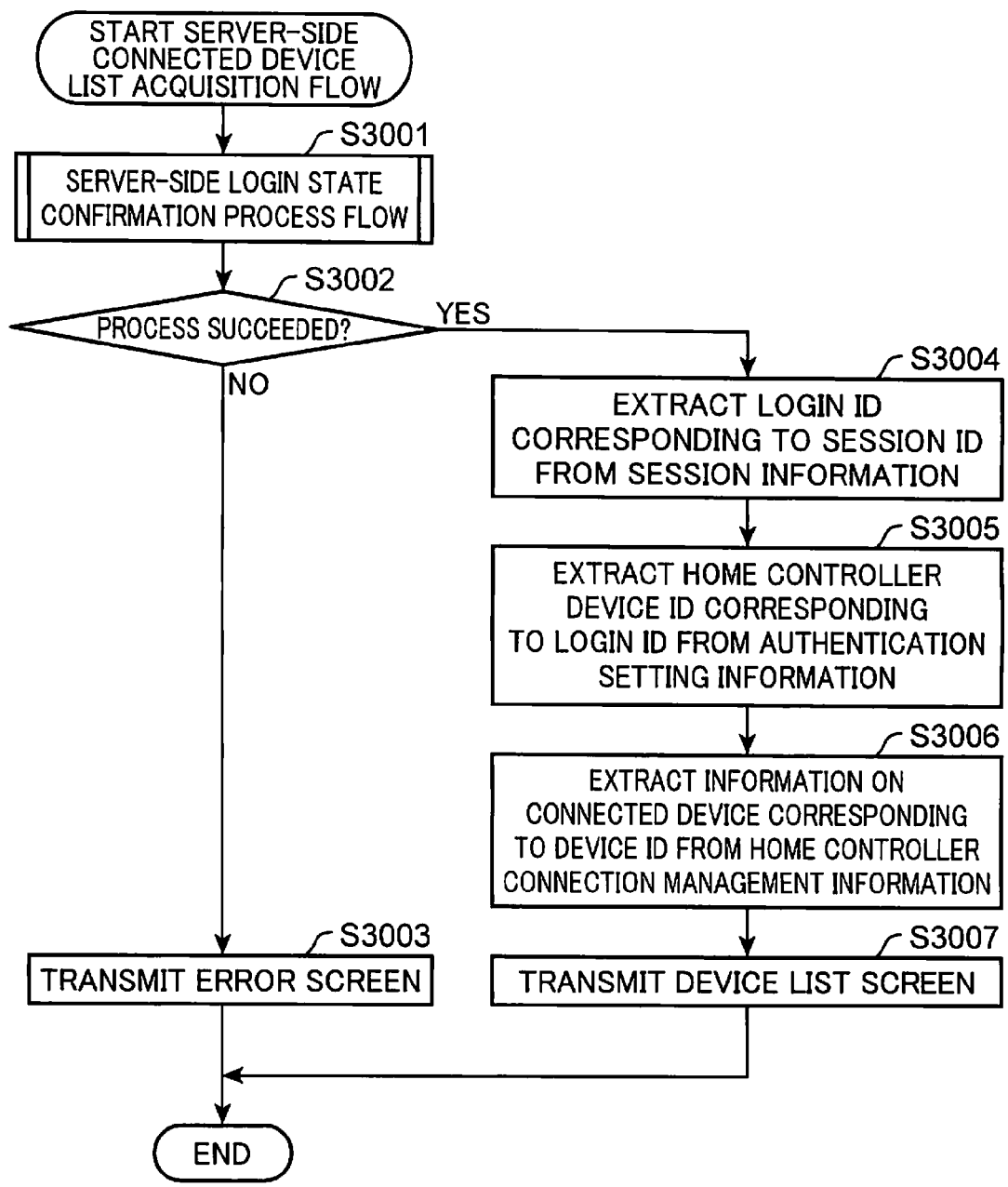
FIG. 30 is a flow chart schematically showing a subroutine of a server-side connected device list acquisition flow of S2202 in FIG. 22, S2504 in FIG. 25, and S3409 in FIG. 34.

FIG. 30 is a flow chart schematically showing the subroutine of the server-side connected device list acquisition flow of S2202 in FIG. 22, S2504 in FIG. 25, and S3409 in FIG. 34 (to be described later).

First, the subroutine of the server-side login state confirmation process flow (FIG. 28 described earlier) is executed (S3001). Next, the login authenticator 315 of the server 300 determines whether or not the process in the subroutine of the server-side login state confirmation process flow has succeeded based on the flag (S3002). If the process has not succeeded (NO in S3002), the communication controller 314 transmits an error screen (for example, FIG. 15B) to the mobile terminal 400 (S3003) to end the process shown in FIG. 30.

On the other hand, in S3002, if the process has succeeded (YES in S3002), the session manager 317 of the server 300 extracts a login ID corresponding to the session ID from the session information 800 (FIG. 8) (S3004). The session manager 317 notifies the extracted login ID to the authentication setting manager 313. The authentication setting manager 313 extracts a device ID of the home controller 100 which corresponds to the notified login ID from the authentication setting information 700 (FIG. 7) (S3005). The authentication setting manager 313 notifies the extracted device ID of the home controller 100 to the connected device manager 311.

The connected device manager 311 extracts information on all connected devices corresponding to the notified device ID of the home controller 100 from the home controller connection management information 900 (FIG. 9) (S3006). The connected device manager 311 creates the device list screen 1304 (FIG. 13D) based on the extracted information on the connected devices. The communication controller 314 transmits the device list screen 1304 (FIG. 13D) to the mobile terminal 400 upon receiving a request from the connected device manager 311 (S3007) to end the process shown in FIG. 30.

Figure 31:
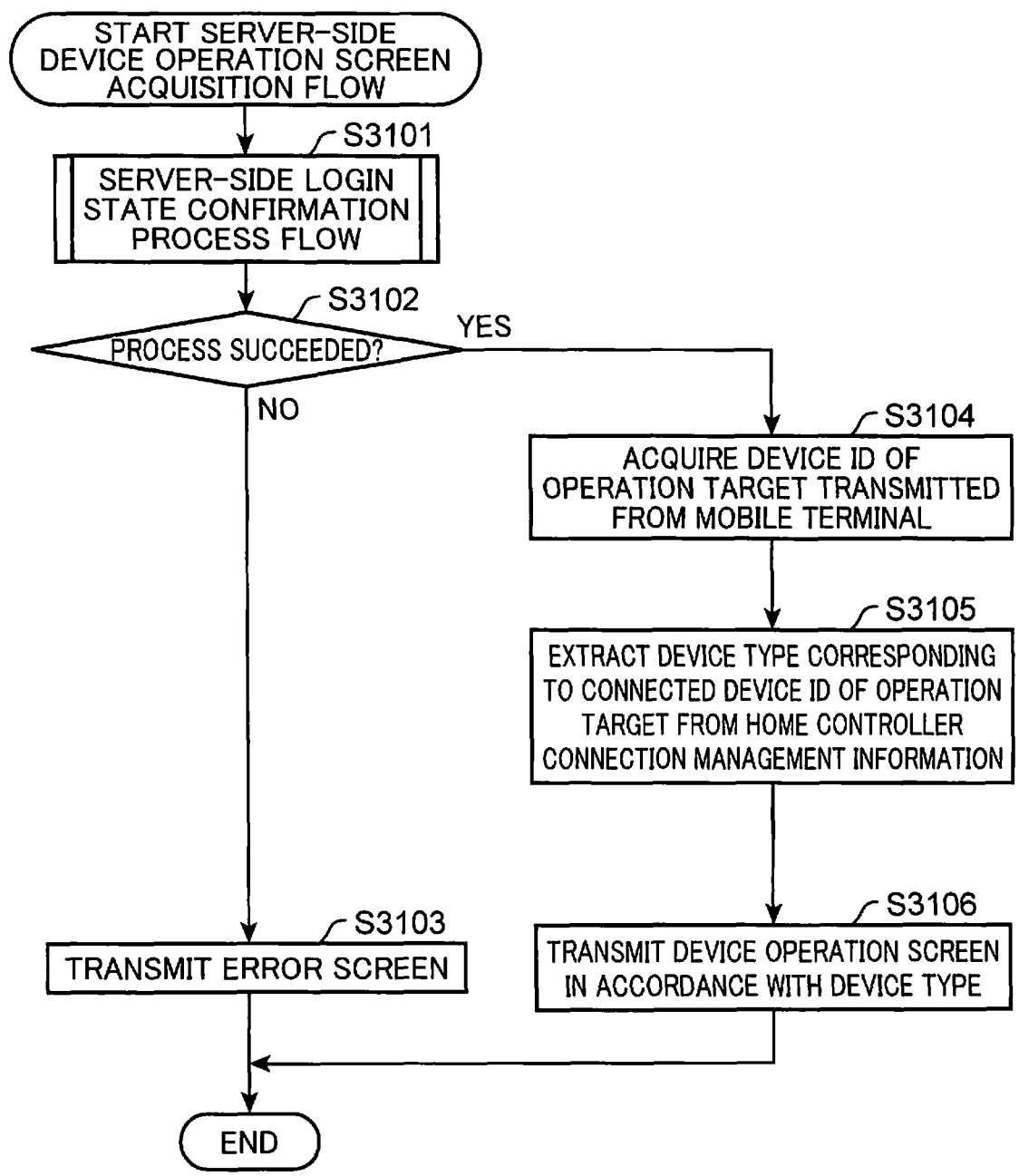
FIG. 31 is a flow chart schematically showing a subroutine of a server-side device operation screen acquisition flow of S2205 in FIG. 22.

FIG. 31 is a flow chart schematically showing the subroutine of the server-side device operation screen acquisition flow of S2205 in FIG. 22.

First, the subroutine of the server-side login state confirmation process flow (FIG. 28 described earlier) is executed (S3101). Next, the device controller 312 of the server 300 determines whether or not the process in the subroutine of the server-side login state confirmation process flow has succeeded based on the flag (S3102). If the process has not succeeded (NO in S3102), the communication controller 314 transmits an error screen (for example, FIG. 15B) to the mobile terminal 400 (S3103) to end the process shown in FIG. 31.

On the other hand, in S3102, if the process has succeeded (YES in S3102), the device controller 312 of the server 300 acquires a device ID of the device 200 that is an operation target which has been transmitted from the mobile terminal 400 (S3104). The device controller 312 notifies the acquired device ID of the device 200 that is the operation target to the connected device manager 311.

The connected device manager 311 extracts a device type corresponding to the notified connected device ID of the operation target from the home controller connection management information 900 (FIG. 9) (S3105). The connected device manager 311 notifies the extracted device type to the device controller 312. The device controller 312 creates the device operation screen 1305 (FIG. 13E) in accordance with the device type. The communication controller 314 transmits the device operation screen 1305 (FIG. 13E) to the mobile terminal 400 upon receiving a request from the device controller 312 (S3106) to end the process shown in FIG. 31.

Figure 32:
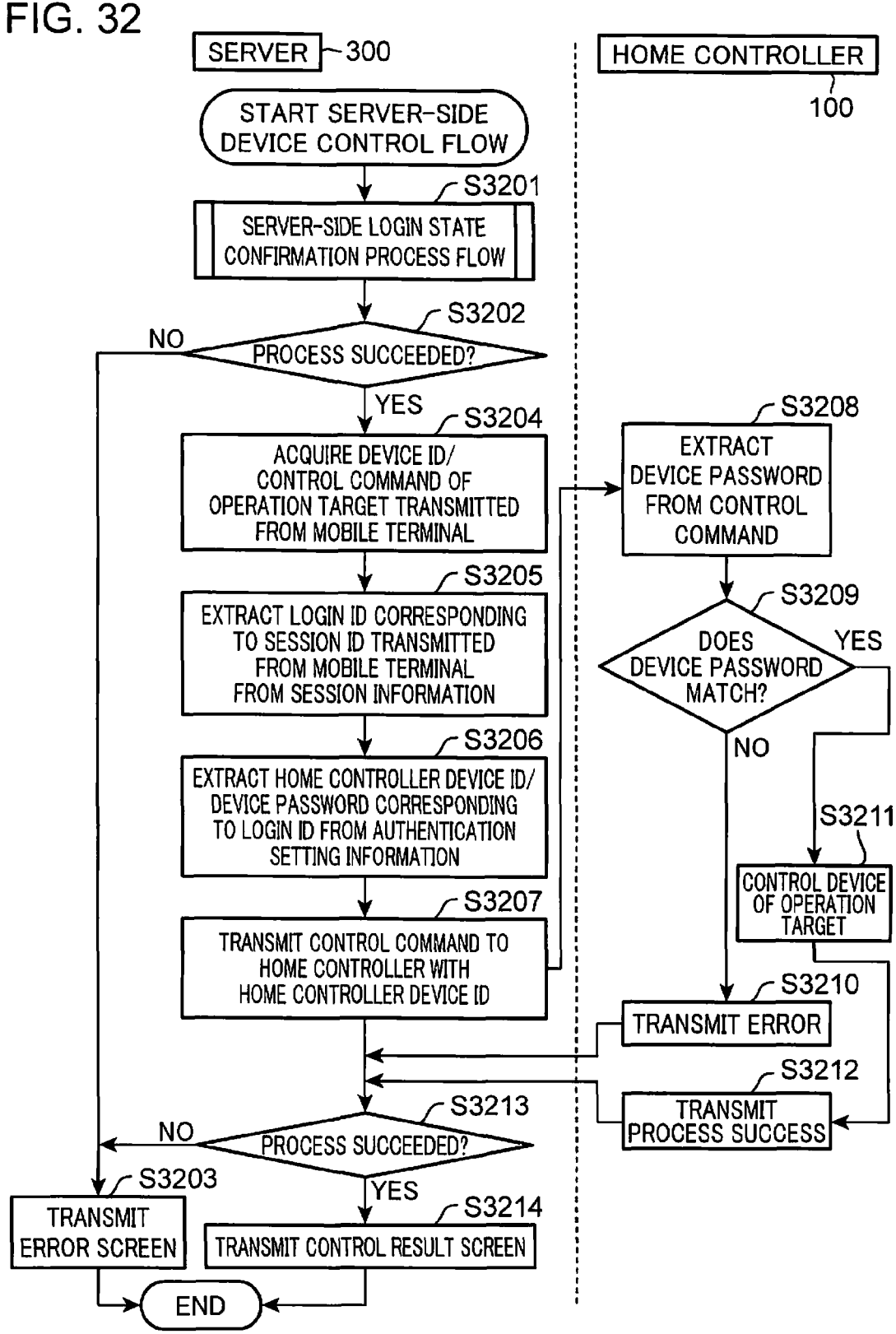
FIG. 32 is a flow chart schematically showing a subroutine of a server-side device control flow of S2208 in FIG. 22.

FIG. 32 is a flow chart schematically showing the subroutine of the server-side device control flow of S2208 in FIG. 22.

First, the subroutine of the server-side login state confirmation process flow (FIG. 28 described earlier) is executed (S3201). Next, the device controller 312 of the server 300 determines whether or not the process in the subroutine of the server-side login state confirmation process flow has succeeded based on the flag (S3202). If the process has not succeeded (NO in S3202), the communication controller 314 transmits an error screen (for example, FIG. 15B) to the mobile terminal 400 (S3203) to end the process shown in FIG. 32.

On the other hand, in S3202, if the process has succeeded (YES in S3202), the device controller 312 of the server 300 acquires, via the communication controller 314, a control command including a device ID of the device 200 that is an operation target which has been transmitted from the mobile terminal 400 (S3204). The session manager 317 extracts a login ID corresponding to the session ID which has been transmitted from the mobile terminal 400 from the session information 800 (FIG. 8) (S3205). The session manager 317 notifies the extracted login ID to the authentication setting manager 313.

The authentication setting manager 313 extracts a device ID and a device password of the home controller 100 which corresponds to the notified login ID from the authentication setting information 700 (FIG. 7) (S3206). The communication controller 314 transmits the control command acquired by the device controller 312 in S3204 to the home controller 100 with the device ID extracted by the authentication setting manager 313 in S3206 (S3207).

Upon receiving the transmission, the device password controller 107 of the home controller 100 extracts a device password from the control command (S3208). The device password controller 107 determines whether or not the extracted device password matches data stored in the device password 1002 in the device authentication information 1000 (S3209). When the extracted device password does not match the data stored in the device password 1002 in the device authentication information 1000 (NO in S3209), the communication controller 104 transmits an error to the server 300 (S3210).

On the other hand, when the extracted device password matches the data stored in the device password 1002 in the device authentication information 1000 (YES in S3209), the device controller 106 controls the device 200 that is the operation target (S3211). Subsequently, the communication controller 104 transmits information indicating a successful process to the server 300 upon receiving a request from the device controller 106 (S3212).

Upon receiving the transmission of S3210 or S3212, the device controller 312 of the server 300 determines whether or not the process has succeeded (S3213). If the process has not succeeded (NO in S3213), the process shown in FIG. 32 is ended after advancing to S3203. On the other hand, if the process has succeeded (YES in S3213), the device controller 312 creates a control result screen (as described earlier, for example, a popup screen that is displayed on the device operation screen 1305 shown in FIG. 13E). The communication controller 314 transmits the control result screen to the mobile terminal 400 upon receiving a request from the device controller 312 (S3214) to end the process shown in FIG. 32.

Figure 33:
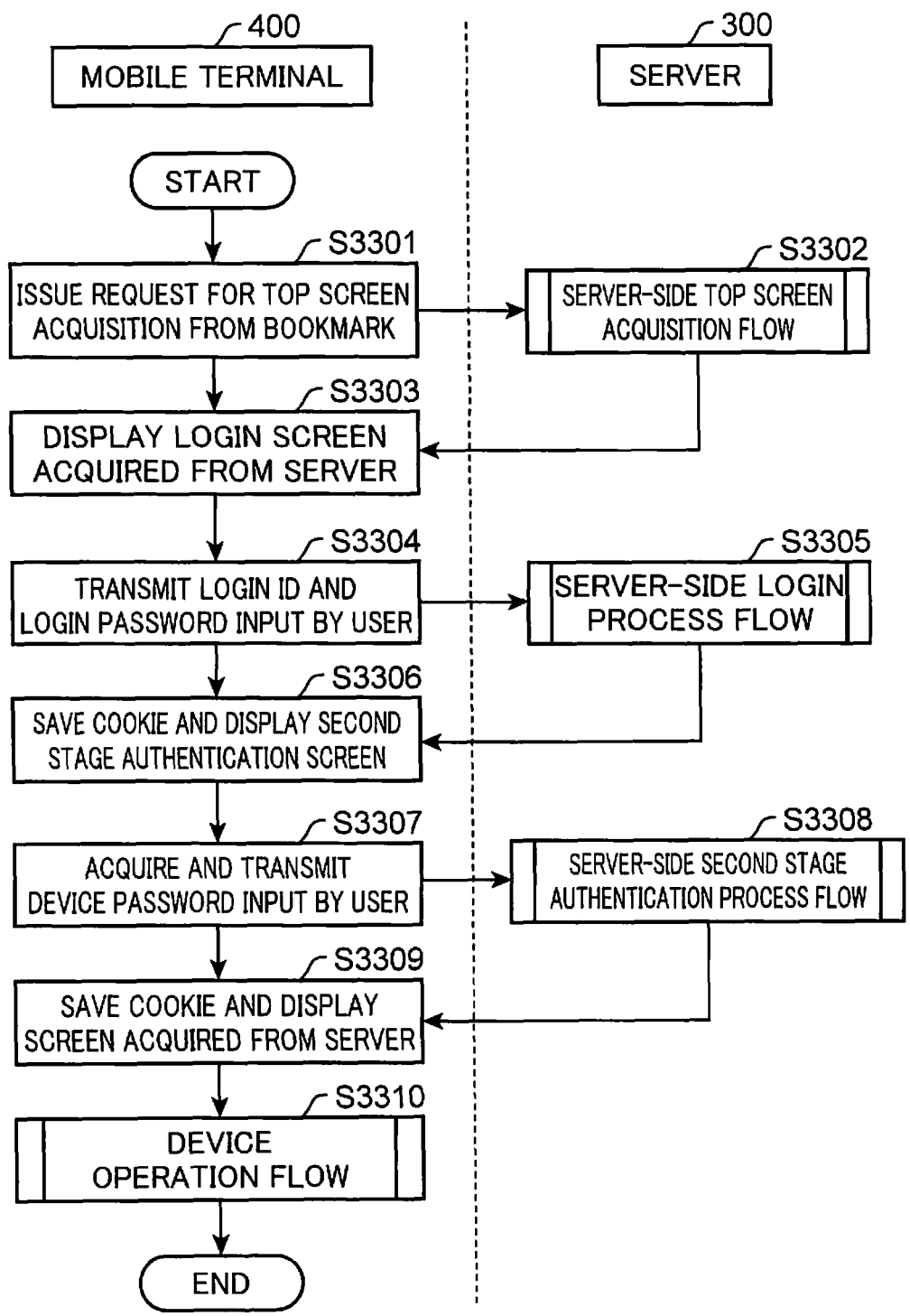
FIG. 33 is a flow chart schematically showing a second stage authentication process flow.

FIG. 33 is a flow chart schematically showing a second stage authentication process flow.

First, the communication controller 415 of the mobile terminal 400 issues a request to acquire a top screen from a bookmark to the server 300 (S3301). In response to the screen acquisition request, the subroutine of the server-side top screen acquisition flow (FIG. 23 described earlier) is executed by the server 300 (S3302). Subsequently, at the mobile terminal 400, the display controller 412 displays the top screen acquired from the server 300 on the display 411 (S3303).

Moreover, as described earlier with reference to FIG. 23, while various screens may be transmitted from the server 300 depending on the circumstances as a result of the subroutine of the server-side top screen acquisition flow, it is assumed that a login screen is transmitted in this case. Therefore, in S3303, the login screen 1401 (FIG. 14A) is displayed on the display 411 of the mobile terminal 400.

Subsequently, the communication controller 415 transmits the login ID and the login password which have been input by the user to the login screen 1401 displayed in S3303 to the server 300 (S3304). Moreover, for example, when already logged in, since the login screen is not displayed in S3303, S3304 is not executed.

In response to the transmission in S3304, the subroutine of the server-side login process flow (FIG. 26 described earlier) is executed by the server 300 (S3305). Next, in S3306, at the mobile terminal 400, the communication controller 415 saves a cookie transmitted from the server 300 in the storage 414. In addition, in S3306, the display controller 412 displays a screen acquired from the server 300 (for example, the second stage authentication screen 1402 shown in FIG. 14B) on the display 411.

Subsequently, in S3307, in a state where the second stage authentication screen 1402 (FIG. 14B) is displayed on the display 411, the input controller 413 acquires a device password input by the user. In addition, in S3307, the communication controller 415 transmits the device password input by the user to the server 300 upon receiving a request from the input controller 413.

Upon receiving the transmission, a subroutine of a server-side second stage authentication process flow (FIG. 34 to be described later) is executed by the server 300 (S3308). Next, in S3309, at the mobile terminal 400, the communication controller 415 saves a cookie that has been transmitted from the server 300 in the storage 414. In addition, in S3309, the display controller 412 displays a screen acquired from the server 300 (for example, the device list screen 1304 shown in FIG. 13D) on the display 411. Subsequently, the subroutine of the device operation flow (FIG. 22 described earlier) is executed (S3310) to end the process shown in FIG. 33.

Figure 34:
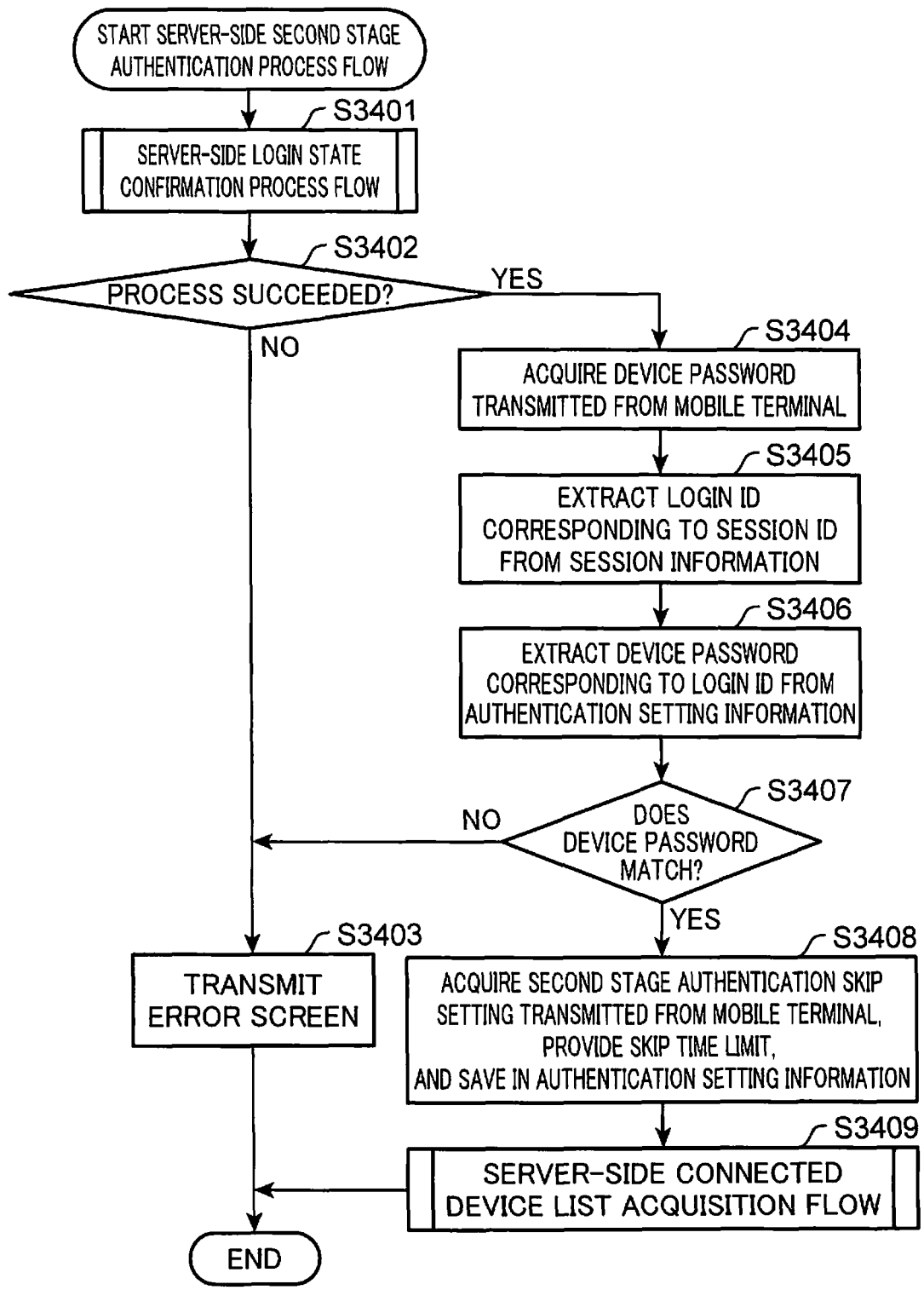
FIG. 34 is a flow chart schematically showing a subroutine of a server-side second stage authentication process flow of S3308 in FIG. 33.

FIG. 34 is a flow chart schematically showing the subroutine of the server-side second stage authentication process flow of S3308 in FIG. 33.

First, the subroutine of the server-side login state confirmation process flow (FIG. 28 described earlier) is executed (S3401). Next, the second stage authenticator 316 of the server 300 determines whether or not the process in the subroutine of the server-side login state confirmation process flow has succeeded based on the flag (S3402). If the process has not succeeded (NO in S3402), the communication controller 314 transmits an error screen (for example, FIG. 15B) to the mobile terminal 400 (S3403) to end the process shown in FIG. 34.

On the other hand, in S3402, if the process has succeeded (YES in S3402), the second stage authenticator 316 of the server 300 acquires a device password that has been transmitted from the mobile terminal 400 (S3404). Next, the session manager 317 extracts a login ID corresponding to the session ID from the session information 800 (FIG. 8) (S3405). The session manager 317 notifies the extracted login ID to the authentication setting manager 313. The authentication setting manager 313 extracts a device password that corresponds to the notified login ID from the authentication setting information 700 (FIG. 7) (S3406). The authentication setting manager 313 notifies the extracted device password to the second stage authenticator 316.

Subsequently, the second stage authenticator 316 determines whether or not the notified device password and the device password acquired in S3404 match each other (S3407). If the notified device password and the device password acquired in S3404 do not match each other (NO in S3407), the process in FIG. 34 advances to S3403 and the communication controller 314 transmits an error screen such as that shown in FIG. 15C to the mobile terminal 400 to end the process.

On the other hand, in S3407, if the notified device password and the device password acquired in S3404 match each other (YES in S3407), in S3408, the authentication setting manager 313 acquires contents of a second stage authentication skip setting that has been transmitted from the mobile terminal 400. In addition, if the second stage authentication skip setting is enabled, the authentication setting manager 313 provides a second stage authentication skip time limit and saves the second stage authentication skip setting in the authentication setting information 700 (FIG. 7).

In other words, when the check box 573 (FIG. 14B) on the second stage authentication screen is checked, the authentication setting manager 313 sets the second stage authentication skip setting in the authentication setting information 700 to "enabled" and provides a second stage authentication skip time limit. On the other hand, when the check box 573 (FIG. 14B) is not checked, the authentication setting manager 313 sets the second stage authentication skip setting in the authentication setting information 700 to "disabled" and does not provide a second stage authentication skip time limit.

Following S3408, the subroutine of the server-side connected device list acquisition flow (FIG. 30 described earlier) is executed (S3409) to end the process shown in FIG. 34.

Figure 35:
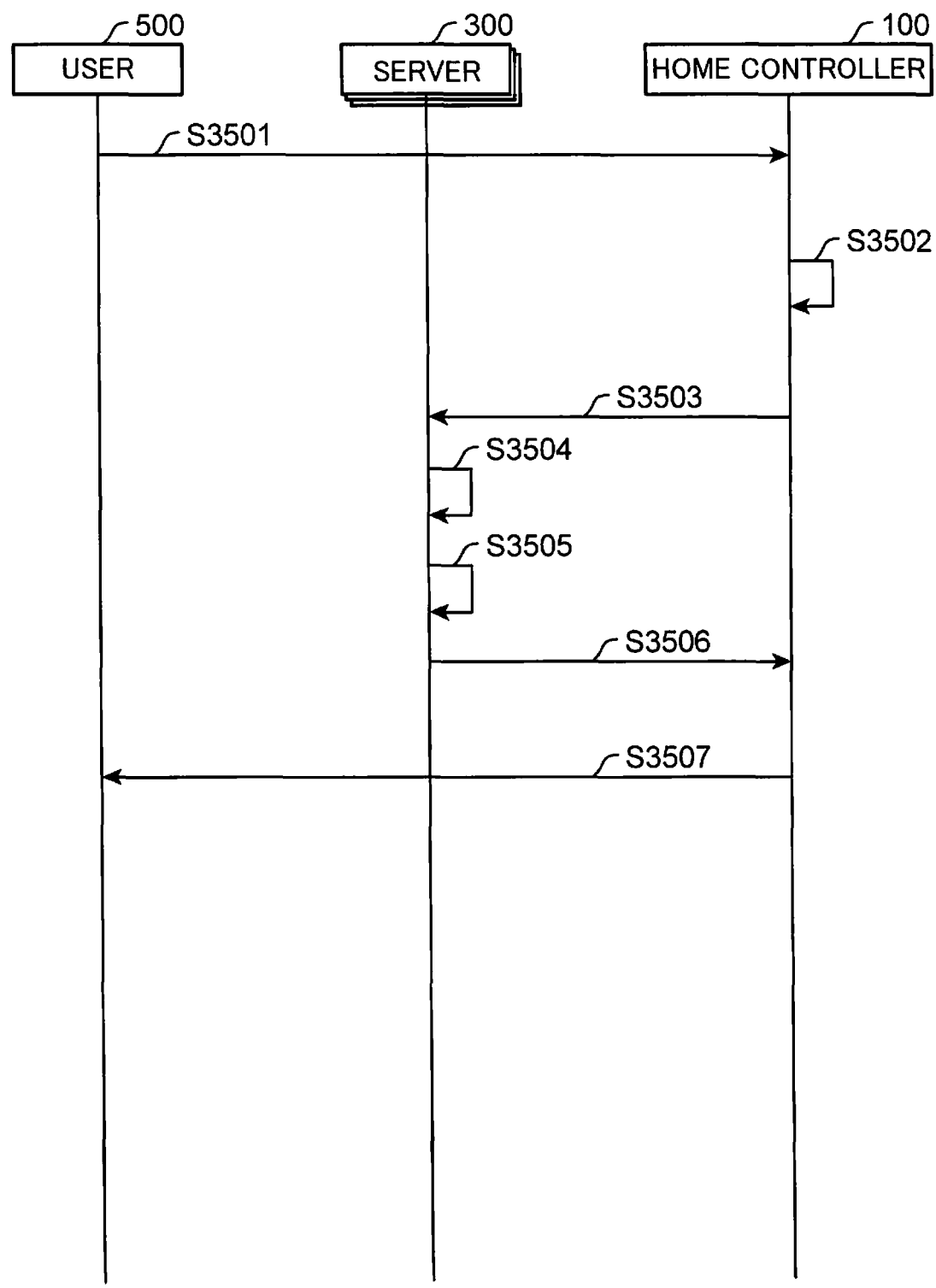
FIG. 35 is a sequence diagram schematically showing an example of a flow of an initialization process of a device password in a device management system according to the present embodiment.

FIG. 35 is a sequence diagram schematically showing an example of a flow of an initialization process of a device password in the device management system according to the present embodiment.

First, the user 500 performs an initialization process of a device password on the home controller 100 (S3501). As a result, the device password controller 107 of the home controller 100 rewrites the item of the device password 1002 in the device authentication information 1000 (for example, FIG. 10A) to "unset" and initializes the device password (S3502).

Subsequently, upon receiving a request from the device password controller 107, the communication controller 104 of the home controller 100 transmits an initialization request of the device password to the server 300 (S3503).

Upon receiving the request, the authentication setting manager 313 of the server 300 respectively rewrites the items of the device ID 731 and the device password 732 in the authentication setting information 700 (FIG. 7) to "unset" (S3504). In addition, if the second stage authentication skip setting 722 in the authentication setting information 700 is set to "enabled", the authentication setting manager 313 rewrites the second stage authentication skip setting 722 to "disabled" (S3505). Subsequently, upon receiving a request from the authentication setting manager 313, the communication controller 314 notifies the home controller 100 that the initialization of the device password has been completed (S3506).

Upon receiving the notification, the display controller 102 of the home controller 100 notifies the user 500 that the initialization of the device password has been completed by, for example, displaying a popup screen representing that the initialization of the device password has been completed on the display 101 (S3507).

Figure 36:
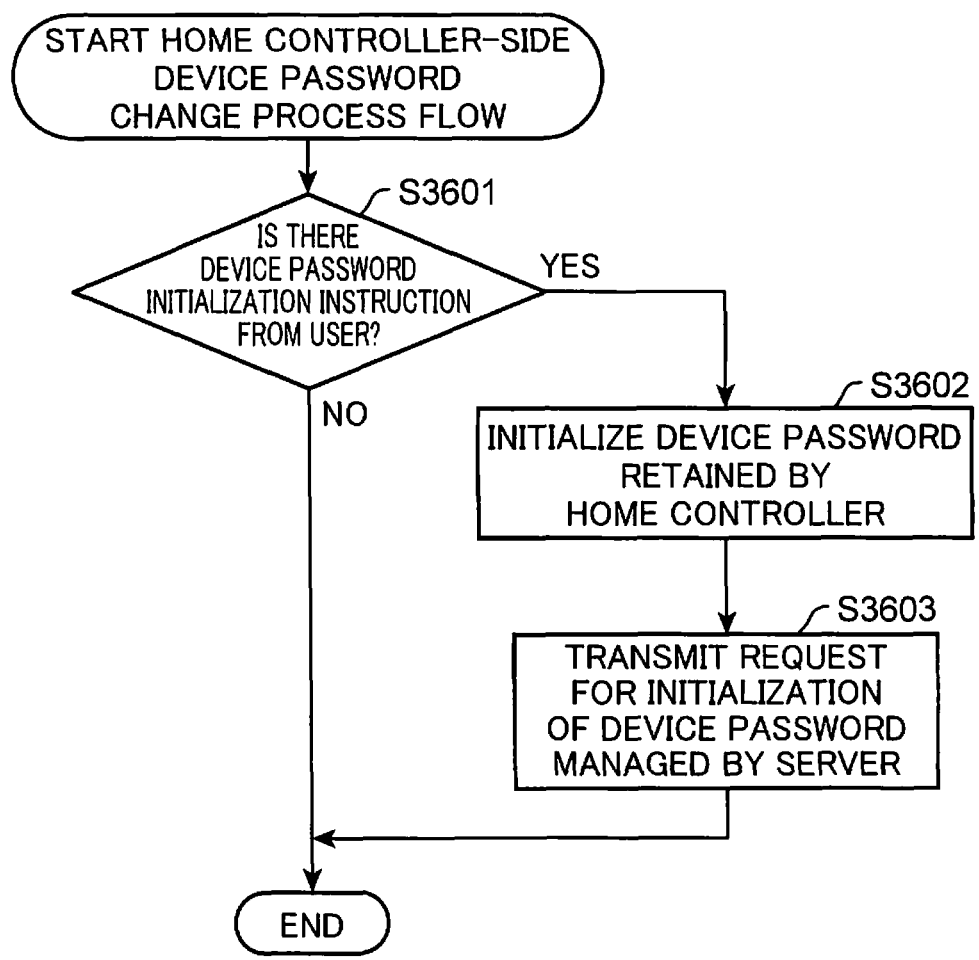
FIG. 36 is a flow chart schematically showing an example of a flow of an initialization process of a device password in a home controller.

FIG. 36 is a flow chart schematically showing an example of a flow of an initialization process of a device password in the home controller 100.

First, the device password controller 107 of the home controller 100 determines whether or not there is a device password initialization instruction from the user (S3601). If there is no device password initialization instruction from the user (NO in S3601), the process of FIG. 36 is ended.

On the other hand, if there is a device password initialization instruction from the user (YES in S3601), the device password controller 107 rewrites the item of the device password 1002 in the device authentication information 1000 (for example, FIG. 10A) to "unset" and initializes the device password that is retained by the home controller 100 (S3602).

Next, upon receiving a request from the device password controller 107, the communication controller 104 of the home controller 100 transmits an initialization request of the device password to the server 300 (S3603) to end the process shown in FIG. 36.

Moreover, an instruction for initializing a device password that is issued by the user is not limited to an instruction for directly controlling the display 101 of the home controller 100 such as those shown in FIGS. 16, 35, and 36. Alternatively, the user may operate the mobile terminal 400 and cause an initialization instruction of a device password to be transmitted from the mobile terminal 400 to the home controller 100.

In addition to the initialization of a device password, for example, even when a new device password is registered by directly controlling the display 101 of the home controller 100, registration of a device password may be instructed from the home controller 100 to the server 300 to update a device password that is retained by the server 300.

In this manner, when the device password of the home controller 100 is changed, by notifying the changed device password to the server 300, the fact that the user owns the home controller 100 can be confirmed upon performing second stage authentication.

Figure 37:
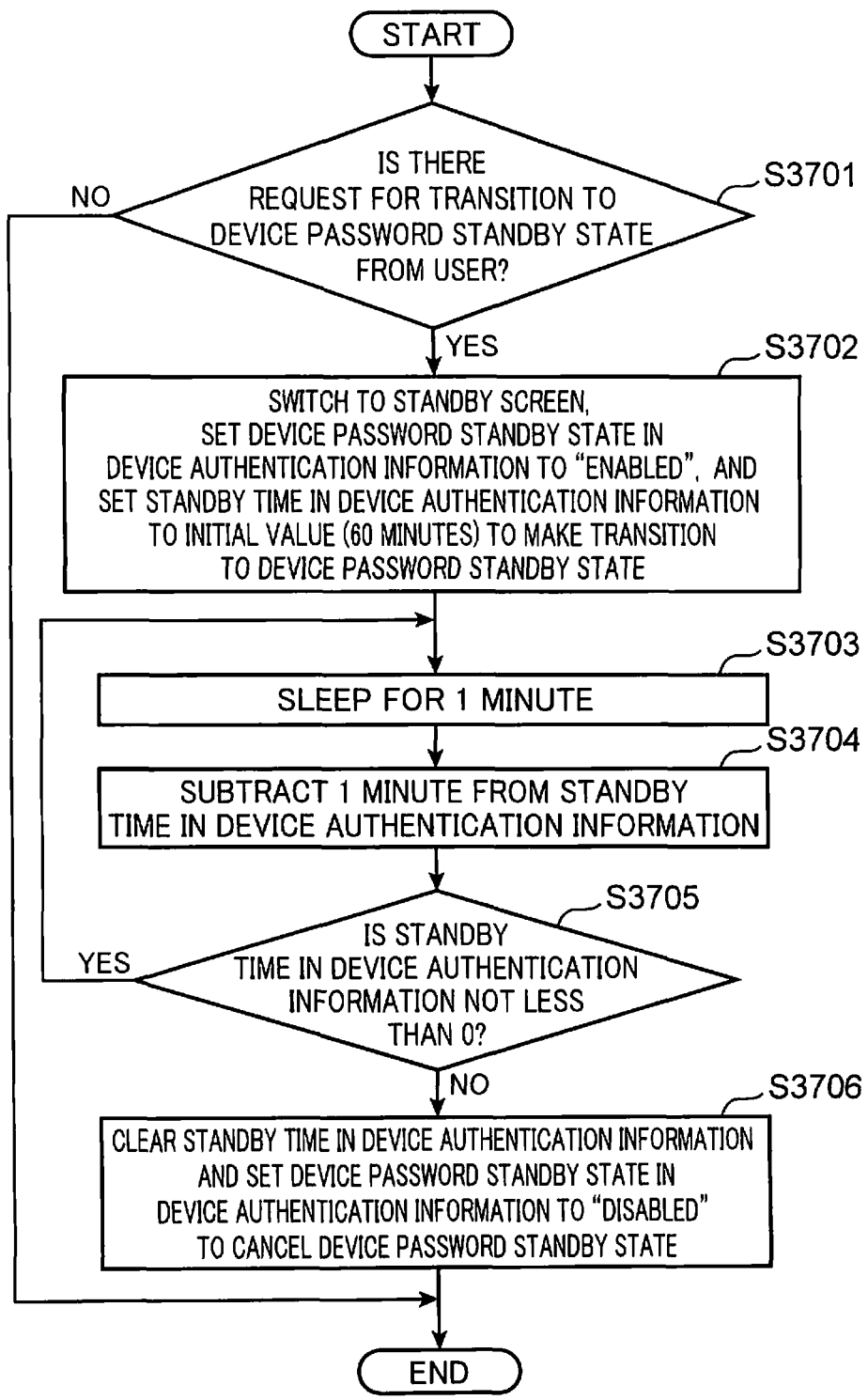
FIG. 37 is a flow chart schematically showing an example of a flow of control of a device password standby state in a home controller.

FIG. 37 is a flow chart schematically showing an example of a flow of control of a device password standby state in the home controller 100.

First, the device password controller 107 of the home controller 100 determines whether or not there is a request for a transition to the device password standby state from the user (S3701). Specifically, the device password controller 107 determines whether or not the touch panel controller 103 has detected selection by the user of the "next" button 511 (FIG. 12B) that is displayed on the display 101. When a request for a transition to the device password standby state has not been made by the user (NO in S3701), the process shown in FIG. 37 is ended.

On the other hand, when a request for a transition to the device password standby state has been made by the user (YES in S3701), the display controller 102 switches the display screen on the display 101 to the standby screen 1203 (FIG. 12C), and the device password controller 107 sets the device password standby state 1003 in the device authentication information 1000 (for example, FIG. 10A) to "enabled" and sets the standby time 1004 to an initial value (in the present embodiment, 60 minutes) (S3702). Accordingly, the home controller 100 makes a transition to the device password standby state.

Next, the home controller 100 places the process on standby for one minute (S3703). After one minute lapses, the device password controller 107 subtracts one minute from the standby time 1004 in the device authentication information 1000 (S3704). Next, the device password controller 107 determines whether or not the standby time 1004 in the device authentication information 1000 is not less than 0 (S3705). When the standby time 1004 in the device authentication information 1000 is not less than 0 (YES in S3705), the process returns to S3703.

On the other hand, when the standby time 1004 in the device authentication information 1000 is less than 0 (NO in S3705), the device password controller 107 clears and sets the standby time 1004 in the device authentication information 1000 to "unset" and sets the device password standby state 1003 to "disabled" (S3706) to end the process shown in FIG. 37. Accordingly, the device password standby state of the home controller 100 is canceled.

Moreover, while it is described that the process is placed on standby for one minute in S3703 in order to simplify illustration, in reality, the process is not stopped for one minute in S3703.

INDUSTRIAL APPLICABILITY

The present disclosure provides a device control method, a device management system, and an in-house server apparatus that is connected to the device management system which are useful in a device management system that includes: an in-house server apparatus which manages a target device that is an operation target; an information device which outputs an instruction command to operate the target device; and an out-of-house server apparatus which receives the instruction command from the information device and which transmits the instruction command to the in-house server apparatus to control the target device.

What is claimed is:

1. A method for controlling a target device in a device management system including i) an in-house server apparatus connectable to the target device, ii) an information device which outputs an instruction command to control the target device, and iii) an out-of-house server apparatus which receives the instruction command from the information device and which transmits the instruction command to the in-house server apparatus to control the target device, the method comprising: receiving, from the information device via an out-of-house network, a first request for providing the information device with a setting screen for a communication using the in-house server apparatus, by using access information which is provided by the in-house server apparatus and which includes a device ID of the in-house server apparatus; receiving, from the information device via the out-of-house network, a user ID and a user password which are input at the information device using the setting screen; receiving, from the information device via the out-of-house network, a device password which is used for controlling the target device via the in-house server apparatus and which is input at the information device using the setting screen; managing the device ID, the user ID, and the device password in association with one another; transmitting the device password to the in-house server apparatus to cause the in-house server apparatus to manage the device password and the device ID of the in-house server apparatus in association with each other, whereafter a communication corresponding to the first request is completed; receiving, from the information device via the out-of-house network, a second request for logging in the out-of-house server with the user ID and the user password, using a login screen for controlling the target device at the information device; transmitting, when the login is authenticated in the device management system, an authentication screen to the information device via the out-of-house network; receiving, from the information device via the out-of-house network, an input password which is input at the information device using the authentication screen; approving a control of the target device by the information device and transmitting an operation screen for controlling the target device to the information device, when the received input password is identical to the device password associated with the user ID; receiving from the information device the instruction command to the target device, via the operation screen for controlling the target device; and transmitting the instruction command to the in-house server apparatus to control the target device via the in-house server apparatus wherein the control of the target device by the information device is approved for a session time limit.

2. The method according to claim 1, wherein an input of the device ID of the in-house sever apparatus is not required at the authentication screen.

3. The method according to claim 1, wherein the in-house server apparatus includes a display that displays the access information including the device ID of the in-house sever apparatus, and the information device reads the access information from the display of the in-house server apparatus to obtain the access information.

4. The method according to claim 3, wherein only when the in-house server apparatus receives the device password before a predetermined period elapses after the access information is displayed on the display of the in-house server apparatus, the device password is managed by the in-house server apparatus in association with the device ID of the in-house server apparatus.

5. The method according to claim 3, wherein the access information is displayed on the display of the in-house server apparatus in a format of a one-dimensional or two-dimensional code.

6. A device management system including: an in-house server apparatus which is connectable to a target device; an information device which outputs an instruction command to control the target device, and an out-of-house server apparatus which receives the instruction command from the information device and which transmits the instruction command to the in-house server apparatus to control the target device, wherein the out-of-house server apparatus: receives, from the information device via an out-of-house network, a first request for providing the information device with a setting screen for using the in-house server apparatus, by using access information which is provided by the in-house server apparatus and which includes a device ID of the in-house server apparatus; receives, from the information device via the out-of-house network, a user ID and a user password which are input at the information device using the setting screen; receives, from the information device via the out-of-house network, a device password which is used for controlling the target device via the in-house server apparatus and which is input at the information device using the setting screen; manages the device ID, the user ID, and the device password in association with one another; transmits the device password to the in-house server apparatus to cause the in-house server apparatus to manage the device password and the device ID of the in-house server apparatus in association with each other, whereafter a communication corresponding to the first request is completed; receives, from the information device via the out-of-house network, a second request for logging in the out-of-house server apparatus with the user ID and the user password, using a login screen for controlling the target device at the information device; transmits, when the login is authenticated in the device management system, an authentication screen to the information device via the out-of-house network; receives, from the information device via the out-of-house network, an input password which is input at the information device using the authentication screen; approves a control of the target device by the information device and transmits an operation screen for controlling the target device to the information device, when the received input password is identical to the device password which is associated with the user ID; receives from the information device the instruction command to the target device via the operation screen for controlling the target device, and transmits the instruction command to the in-house server apparatus to control the target device via the in-house server apparatus, and wherein the in-house server apparatus: receives the device password from the out-of-house server apparatus to manage the device ID and the device password in association with each other and wherein the control of the target device by the information device is approved for a session time limit.

7. The device management system according to claim 6, wherein an input of the device ID of the in-house sever apparatus is not required at the authentication screen.

8. An in-house server apparatus which is connected to the device management system according to claim 6.

9. The in-house server according to claim 8, further comprising a display configured to display the access information including the device ID of the in-house sever apparatus, wherein the access information is read by the information device from the display of the in-house server apparatus.

10. The in-house server apparatus according to claim 9, wherein only when the in-house server apparatus receives the device password before a predetermined period elapses after the access information including the device ID is displayed on the display of the in-house server apparatus, the device password is managed by the in-house server apparatus in association with the device ID of the in-house server apparatus.

11. The in-house server apparatus according to claim 9, wherein the in-house server apparatus displays the access information on the display of the in-house server apparatus in a format of a one-dimensional or two-dimensional code.

* * * * *